United States Patent
Kim et al.

(10) Patent No.: US 10,871,322 B2
(45) Date of Patent: Dec. 22, 2020

(54) EXTERIOR MEMBER FOR HOME APPLIANCE AND MANUFACTURE METHOD THEREOF

(71) Applicant: LG Electronics Inc., Seoul (KR)

(72) Inventors: Sunggab Kim, Seoul (KR); Byungchun Moon, Seoul (KR); Pojin Kim, Seoul (KR); Jahun Koo, Seoul (KR); Youngwoo Kim, Seoul (KR); Kuhyeong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/712,171

(22) Filed: Dec. 12, 2019

(65) Prior Publication Data

US 2020/0116420 A1 Apr. 16, 2020

Related U.S. Application Data

(63) Continuation of application No. 15/999,558, filed on Aug. 20, 2018, now Pat. No. 10,520,243, which is a
(Continued)

(30) Foreign Application Priority Data

| Sep. 25, 2015 | (KR) | ......................... | 10-2015-0137132 |
| Oct. 5, 2015 | (KR) | ......................... | 10-2015-0140035 |
| Oct. 16, 2015 | (KR) | ......................... | 10-2015-0144990 |

(51) Int. Cl.
*G06F 3/041* (2006.01)
*F25D 23/02* (2006.01)
(Continued)

(52) U.S. Cl.
CPC ........ *F25D 23/028* (2013.01); *A47L 15/4293* (2013.01); *D06F 34/28* (2020.02);
(Continued)

(58) Field of Classification Search
CPC .................. G06F 3/041; G06F 3/0412; G06F 2203/04103; F25D 23/02; F25D 23/028;
(Continued)

(56) References Cited

U.S. PATENT DOCUMENTS

| 7,942,013 B2 * | 5/2011 | Kim ...................... F25D 29/005 62/125 |
| 8,960,934 B2 * | 2/2015 | Sung ..................... F25D 23/065 362/92 |

(Continued)

*Primary Examiner* — Joe H Cheng
(74) *Attorney, Agent, or Firm* — Fish & Richardson P.C.

(57) ABSTRACT

An exterior member for a home appliance includes a front panel that defines an exterior of the home appliance, that is configured to cover a display assembly that includes a plurality of LEDs, and that includes a displaying part that defines a plurality of first through-holes at positions corresponding to the plurality of LEDs, the displaying part being configured to display operating information of the home appliance by transmitting light from the plurality of LEDs through at least a portion of the plurality of first through-holes. The exterior member further includes a front surface coating layer that is located on a front surface of the front panel and that is configured to shield the plurality of first through-holes. The exterior member further includes a hole-filling member that is configured to fill the plurality of first through-holes by coating a rear surface of the displaying part with a material.

20 Claims, 39 Drawing Sheets

Related U.S. Application Data continuation of application No. 15/274,731, filed on Sep. 23, 2016, now Pat. No. 10,054,361.

(51) Int. Cl.
  *F25D 29/00* (2006.01)
  *D06F 34/28* (2020.01)
  *A47L 15/42* (2006.01)

(52) U.S. Cl.
  CPC ......... *F25D 29/005* (2013.01); *G06F 3/0412* (2013.01); *F25D 23/02* (2013.01); *F25D 2323/021* (2013.01); *F25D 2400/361* (2013.01); *F25D 2400/40* (2013.01); *G06F 2203/04103* (2013.01)

(58) Field of Classification Search
  CPC ...... F25D 23/065; F25D 27/005; F25D 29/00; F25D 2323/021; F25D 2400/00; F25D 2400/361; F25D 2400/40; A47L 15/42; A47L 15/4293; Y10T 29/49359
  See application file for complete search history.

(56) References Cited

U.S. PATENT DOCUMENTS

| | | | | |
|---|---|---|---|---|
| 9,791,204 B2* | 10/2017 | Kim | ...................... | F25D 29/005 |
| 10,006,625 B2* | 6/2018 | Kim | ...................... | F25D 29/005 |
| 10,054,361 B2* | 8/2018 | Kim | ...................... | F25D 23/028 |
| 10,641,542 B2* | 5/2020 | Kim | ...................... | F25D 23/028 |
| 2004/0177624 A1* | 9/2004 | Wo | ...................... | F28F 13/00 |
| | | | | 62/125 |
| 2005/0097912 A1* | 5/2005 | Nam | ...................... | F25D 29/005 |
| | | | | 62/331 |
| 2007/0056303 A1* | 3/2007 | Choi | ...................... | F25D 23/028 |
| | | | | 62/259.2 |
| 2008/0164796 A1* | 7/2008 | McCoy | ...................... | F25C 5/22 |
| | | | | 312/405 |
| 2008/0165998 A1* | 7/2008 | LeClear | ...................... | H04R 1/026 |
| | | | | 381/345 |
| 2008/0231159 A1* | 9/2008 | Lee | ...................... | F25D 23/02 |
| | | | | 312/405 |
| 2009/0202949 A1* | 8/2009 | Takemura | ...................... | H05K 3/108 |
| | | | | 430/314 |
| 2010/0024466 A1* | 2/2010 | Kwon | ...................... | F25D 11/02 |
| | | | | 62/449 |
| 2010/0107679 A1* | 5/2010 | Park | ...................... | F25D 29/00 |
| | | | | 62/441 |
| 2011/0048047 A1* | 3/2011 | Kim | ...................... | F25D 29/005 |
| | | | | 62/246 |
| 2013/0082948 A1* | 4/2013 | Ok | ...................... | F25D 29/00 |
| | | | | 345/173 |
| 2015/0122825 A1* | 5/2015 | Sung | ...................... | F25D 23/02 |
| | | | | 220/592.1 |
| 2015/0192352 A1* | 7/2015 | Sung | ...................... | F25D 23/028 |
| | | | | 62/125 |
| 2015/0276302 A1* | 10/2015 | Roh | ...................... | F25D 29/00 |
| | | | | 62/56 |
| 2016/0003519 A1* | 1/2016 | Kim | ...................... | F25D 23/02 |
| | | | | 362/307 |
| 2016/0117022 A1* | 4/2016 | Kim | ...................... | F25D 23/028 |
| | | | | 345/174 |
| 2016/0131420 A1* | 5/2016 | Park | ...................... | G06F 3/0412 |
| | | | | 62/56 |
| 2016/0178276 A1* | 6/2016 | Park | ...................... | H03K 17/962 |
| | | | | 345/173 |
| 2016/0178277 A1* | 6/2016 | Park | ...................... | G06F 3/0416 |
| | | | | 345/173 |
| 2016/0186985 A1* | 6/2016 | Kim | ...................... | H03K 17/962 |
| | | | | 362/23.12 |
| 2016/0188025 A1* | 6/2016 | Park | ...................... | F25D 23/02 |
| | | | | 52/784.15 |
| 2016/0188093 A1* | 6/2016 | Kim | ...................... | G06F 3/0416 |
| | | | | 345/173 |
| 2016/0327332 A1* | 11/2016 | Kim | ...................... | F25D 23/028 |
| 2017/0234609 A1* | 8/2017 | Park | ...................... | G06F 3/0416 |
| | | | | 345/174 |
| 2019/0056169 A1* | 2/2019 | Hong | ...................... | F25D 23/06 |
| 2019/0107913 A1* | 4/2019 | Kim | ...................... | H03K 17/962 |
| 2019/0170434 A1* | 6/2019 | Kim | ...................... | F25D 23/028 |
| 2020/0240703 A1* | 7/2020 | Kim | ...................... | F25D 23/00 |

* cited by examiner

EXTERIOR MEMBER FOR HOME APPLIANCE AND MANUFACTURE METHOD THEREOF

CROSS-REFERENCE TO RELATED APPLICATION(S)

This application is a continuation application of U.S. application Ser. No. 15/999,558, filed on Aug. 20, 2018, now U.S. Pat. No. 10,520,243 B2, which is a continuation of U.S. application Ser. No. 15/274,731, filed on Sep. 23, 2016, now U.S. Pat. No. 10,054,361 B2, which claims priority under 35 U.S.C. § 119 and 35 U.S.C. § 365 to Korean Patent Applications No. 10-2015-0137132 filed in Korea on Sep. 25, 2015, 10-2015-0140035 filed in Korea on Oct. 5, 2015, and 10-2015-0144990 filed in Korea on Oct. 16, 2015 whose entire disclosures are hereby incorporated by reference.

FIELD

This application relates to an exterior member for a home appliance.

BACKGROUND

Generally, a home appliance has a display assembly for displaying an operation state of the home appliance. The display assembly may display a variety of information according to an operation of the home appliance in the form of a number, a character, a symbol or a figure.

Therefore, a user may check the information output through the display assembly, may determine the operation state of the home appliance and may perform an operation for operating the home appliance.

In the home appliance, recently, an exterior member thereof may be formed of a metallic material to provide a more luxurious exterior, or an exterior member formed of a material coated to provide a texture of steel may be used. The above-described display may be provided at such an exterior member to display the operation of the home appliance.

SUMMARY

An exterior member for a home appliance, including a front panel (i) that defines an exterior of the home appliance, (ii) that is configured to cover a display assembly that includes a plurality of LEDs, and (iii) that includes a displaying part that defines a plurality of first through-holes at positions corresponding to the plurality of LEDs, the displaying part being configured to display operating information of the home appliance by transmitting light from the plurality of LEDs through at least a portion of the plurality of first through-holes; a front surface coating layer that is located on a front surface of the front panel and that is configured to shield the plurality of first through-holes; and a hole-filling member that is configured to fill the plurality of first through-holes by coating a rear surface of the displaying part with a material that is configured to transmit light and that is configured to connect the plurality of first through-holes, where a rear cross-sectional area of a respective first through-hole at a rear surface of the front panel is greater than a front cross-sectional area of the respective first-through hole at the front surface of the front panel.

This and other implementations may include one or more of the following optional features. The exterior member further includes a rear surface coating layer that is located at the rear surface of the front panel and that is configured to shield the plurality of first through-holes. Each of the plurality of first through-holes defines a front surface groove that is defined by an etching process through the front surface coating layer and that defines a front surface groove inner diameter that narrows towards the rear surface of the front panel; and a rear surface groove that is defined by the etching process through the rear surface coating layer and that defines a rear surface groove inner diameter (i) that narrows towards the front surface of the front panel and (ii) that is larger than the front surface groove inner diameter. The plurality of first through-holes are defined by a laser before the etching process and are defined by the front surface coating layer and the rear surface coating layer. The front panel includes a stainless material. The front surface coating layer and the rear surface coating layer include a resin material.

The etching process includes etching the front panel and not etching the front surface coating layer or the rear surface coating layer by using ferric chloride (FeCl2) as an etching solution. An inner diameter of the first through-hole between the front surface groove and the rear surface groove is smaller than the front surface groove inner diameter. A front surface groove depth is smaller than a rear surface groove depth. The front surface groove inner diameter is predetermined. The rear surface groove diameter is proportional to a thickness of the front panel. The front surface groove and the rear surface groove are simultaneously etched during the etching process and etched from at the front surface of the front panel and the rear surface of the front panel, respectively. A cross-sectional area of each of the plurality of first through-holes continuously increases from the rear surface of the front panel to the front surface of the front panel. At least a portion of each of the plurality of first through-holes is circular and increases in diameter from the rear surface of the front panel to the front surface of the front panel. The exterior member further includes a colored coating layer that is located on the front surface coating layer and that is configured to cover the plurality of first through-holes.

According to another innovative aspect of the subject matter described in this application, a refrigerator includes a front panel that defines an exterior of a front surface of a door and that defines a plurality of first through-holes that are each larger at a rear surface of the front panel than at a front surface of the front panel; a displaying part that is configured to display operating information of the refrigerator by transmitting light through a least a portion of the plurality of first through-holes; a front surface coating layer that is located on the front surface of the front panel and that is configured to shield the plurality of first through-holes; a hole-filling member that is configured to fill the plurality of first through-holes by coating a rear surface of the displaying part with a material that is configured to transmit light and that is configured to connect the plurality of first through-holes; a door liner that is connected to the front panel, that defines a rear surface of the door, and that defines a space that is configured to receive insulation; a display assembly that is located inside the door and that includes a plurality of LEDs; and a display cover that is configured to contact the rear surface of the front panel, defines a plurality of second through-holes that are located at positions that correspond to the first through-holes, and is configured to align the plurality of first through-holes with the plurality of second through-holes by guiding installation of the display assembly.

This and other implementations may include one or more of the following optional features. The refrigerator further includes a diffusion sheet that is located at a rear surface of the front panel, that is configured to shield the displaying part, and that is configured to diffuse light transmitted through the diffusion sheet. Each of the plurality of first through-holes defines a front surface groove that is recessed from the front surface of the front panel, and a rear surface groove that is recessed from a rear surface of the front panel. The front surface groove is a same size as the rear surface groove at a location where the front surface groove connects with the rear surface groove. The refrigerator further includes an accommodation portion that is located on the display cover and that includes a touch sensor assembly that includes a touch sensor that is configured to detect a touch operation at the rear surface of the front panel at the display cover. The touch sensor assembly is configured to contact the front panel during installation on the display cover.

The refrigerator further includes a door cap decoration member that is coupled to the front panel and an end of the door liner and that defines an insertion hole that is configured to receive the display assembly; and a frame that is connected to the rear surface of the front panel, that is configured to receive the display cover, and that defines a space with the insertion hole that does not receive insulation. The refrigerator further includes a support plate that is configured to support a rear of the front panel and that is located at the frame above the display cover. The refrigerator further includes a cover supporting portion that is located at the frame, that is configured to compress and support a rear of the display cover, and that is configured to maintain a connection between the display cover and the front panel. The display assembly and the touch sensor assembly are separably connected with each other by a cable connector. The refrigerator further includes a frame display that is configured to receive the display assembly and that is connected to the display cover. The insertion hole is configured to receive the frame display during installation of the display assembly.

The present disclosure is directed to providing an exterior member for a home appliance, which enables through-holes to have fine sizes by etching-processing both sides of the exterior member formed of a stainless steel plate in groove shapes in communication with each other and also allows the exterior member to have a thickness for ensuring a strength thereof, and a manufacture method thereof.

Also, the present disclosure is directed to providing an exterior member for a home appliance, which allows an inside of each of through-holes to be filled with a hole-filling member for transmitting light but keeping out foreign substances in a screen printing method, thereby enhancing productivity and preventing contamination due to the foreign substances, and a manufacture method thereof.

Also, the present disclosure is directed to providing an exterior member for a home appliance, which is able to transmit light but keep out foreign substances by forming a hole-filling member through a heat drying after filling an inside of each of through-holes with acrylic resin ink, and a manufacture method thereof.

Also, the present disclosure is directed to providing an exterior member for a home appliance, which can be manufactured such that a first through-hole with a minimum number of processes is formed by providing a metal plate in which a coating layer having a component which does not react with an etching solution is formed at both surfaces, removing only the coating layer formed at a portion at which the first through-hole is formed and then performing an etching operation, and a manufacture method thereof.

Also, the present disclosure is directed to providing an exterior member for a home appliance, which is able to satisfy a sense of beauty of an exterior due to colors and to allow light to be transmitted through a first through-hole by using a metal plate in which a colored coating layer is formed at a front surface thereof, removing the coating layer formed at a portion at which the first through-hole is formed and forming the first through-hole, and a manufacture method thereof.

Also, the present disclosure is directed to providing an exterior member for a home appliance, which enables a damage of a coating layer to be minimized by providing a metal plate on which a coating layer is formed at both sides, forming a first through-hole by a laser processing and minimizing energy of laser used in the laser processing, and a manufacture method thereof.

Also, the present disclosure is directed to providing an exterior member for a home appliance, in which a plurality of through-holes passing through a remaining portion of the exterior member except a colored layer are formed at the exterior member formed of a colored steel plate so that light is transmitted therethrough to show a displaying part to an outside when an LED is turned on and the displaying part is shielded by the color layer when the LED is turned off and thus the displaying part and the plurality of through-holes forming the displaying part are not visible, and a manufacture method thereof.

Also, the present disclosure is directed to providing an exterior member for a home appliance, which is able to enhance productivity by removing only a portion of a back coating layer of a colored steel plate corresponding to a through-hole, etching a removed area and forming the through-hole, and a manufacture method thereof.

DETAILED DESCRIPTION

For convenience of explanation and understanding, this application will describe an example in which a display assembly is installed at a door of a refrigerator. The subject matter described in this application may be applied to all types of home appliances including a refrigerator in which a plurality of fine through-holes are formed at an exterior member and which may display an operation state by a combination of the through-holes through which light passes.

Figure 1:
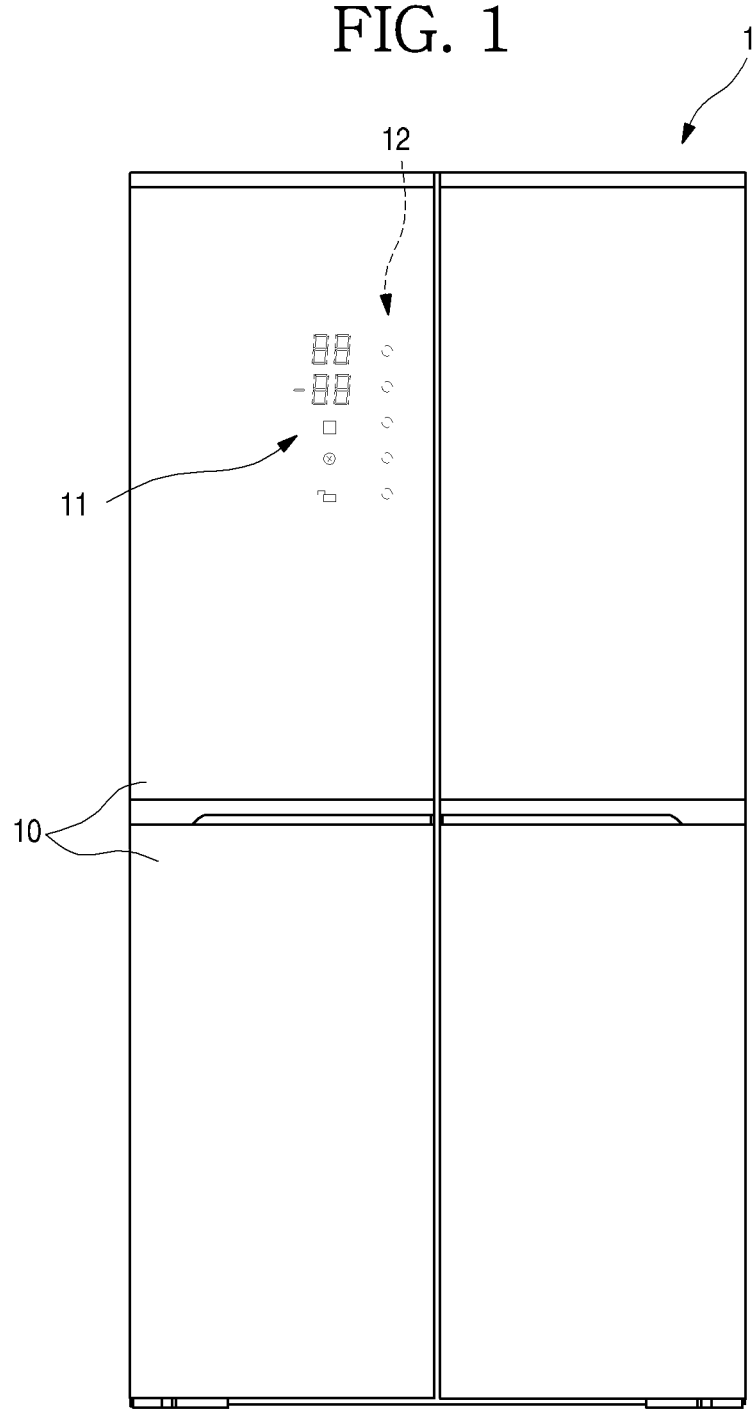
FIG. 1 is a front view of an example refrigerator.

FIG. 1 illustrates an example refrigerator.

As illustrated in the drawing, an exterior of a refrigerator 1 may be formed by a cabinet which forms a storage space and a refrigerator door 10 which is installed at the cabinet to open and close the storage space.

The storage space may be partitioned into both of left and right sides or both of upper and lower portions, and a plurality of refrigerator doors 10 for opening and closing each of spaces may be provided at an opened front surface of the storage space. The refrigerator door 10 is configured to open and close the storage space in a sliding or rotating method and also configured to form an exterior of a front surface of the refrigerator 1 when being in a closed state.

And a displaying part 11 and a touch operation part 12 are provided at one of the plurality of refrigerator doors 10 in a height which may be operated and recognized by a user.

The displaying part 11 serves to display an operation state of the refrigerator 1 to an outside and may be formed to display the operation state in the form of a symbol, a number or the like while light emitted from an inside of the refrigerator door 10 is transmitted therethrough. Therefore, the user may check operation information of the refrigerator 1 through the displaying part 11.

The touch operation part 12 is a part which is touch-operated by the user to operate the refrigerator 1, and is provided at a partial area of a front surface of the refrigerator door 10. A portion thereof at which a pushing operation is detected may be printed or may be indicated by a surface processing such as an etching process.

In some implementations, the touch operation part 12 may be provided at another refrigerator door 10 rather than the refrigerator door 10 at which the displaying part 11 is provided and may be provided at one side of the cabinet rather than the refrigerator door 10. In some implementations, the touch operation part 12 may be formed in a switch or button type rather than a touch type.

Figure 2:
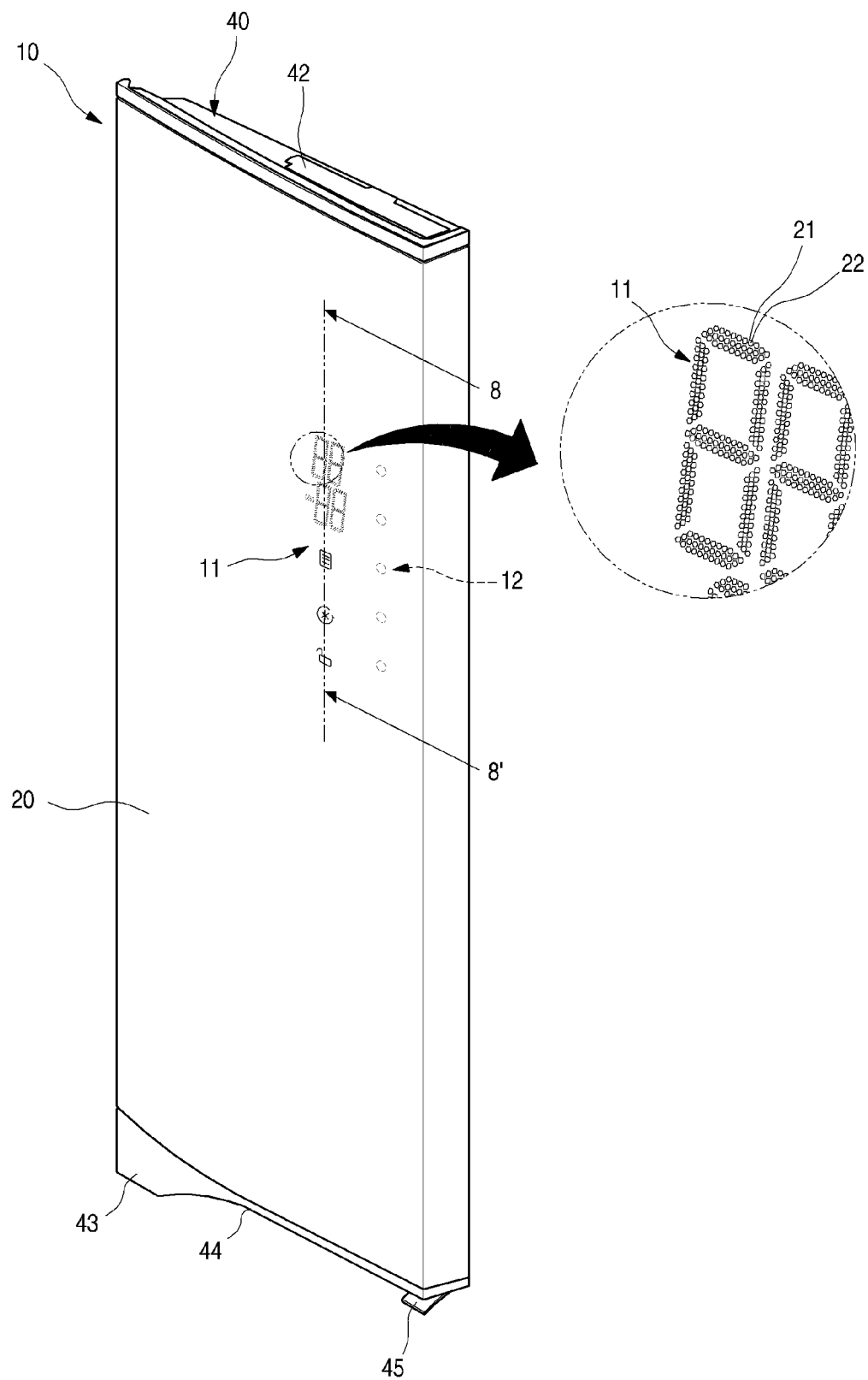
FIG. 2 is a perspective view of an example refrigerator door.

FIG. 2 illustrates an example refrigerator door.

As illustrated in the drawing, an exterior of the front surface of the refrigerator door 10 is formed by a front panel 20. In some implementations, the front panel 20 is an identical concept with an exterior member, is just a name for convenience of explanation and may be the same as the exterior member in other implementations.

The entire exterior of the refrigerator door 10 may be formed by coupling the front panel 20 which forms an exterior of the front surface thereof, a door liner 30 (in FIG. 6) which forms an exterior of a rear surface thereof and decoration members 40 and 43 which are provided at upper and lower ends of the refrigerator door 10.

In some implementations, the front panel 20 which forms the exterior of the front surface of the refrigerator door 10 may be formed of a plate-shaped stainless steel material. And the front panel 20 may include not only the entire front surface of the refrigerator door 10 but also a part of a side surface of the refrigerator door 10. And an anti-fingerprint treatment or a specific pattern or design may be applied to a surface of the front panel 20, and hairlines may also be formed thereon to provide a texture of metal.

The displaying part 11 may be defined by a plurality of first through-holes 21 formed at a partial area of the front panel 20. The displaying part 11 may be configured by a collection of the plurality of first through-holes 21 which are punched to have a predetermined arrangement, thereby displaying a number or a symbol. For example, the collection of the first through-holes 21 may be disposed in a seven-segment shape and may be disposed to indicate a specific symbol, design or character.

The displaying part 11 is formed to correspond to an arrangement of a plurality of second through-holes 220 and third through-holes 321 which will be described below, and configured so that light emitted from an LED 313 of a display assembly 300 may be transmitted.

In some implementations, the light may be emitted and transmitted through at least a part of the first through-holes 21 formed at a position corresponding to that of the LED 313 emitting the light, and the first through-holes 21 on which the light is radiated may display a specific number, character, design or the like and may transmit information to the user.

The first through-holes 21 may be formed in fine hole shapes by an etching process so that a front surface of the front panel 20 is in communication with a rear surface thereof. Shapes and a forming process of the first through-holes 21 will be described below in detail.

Figure 3:
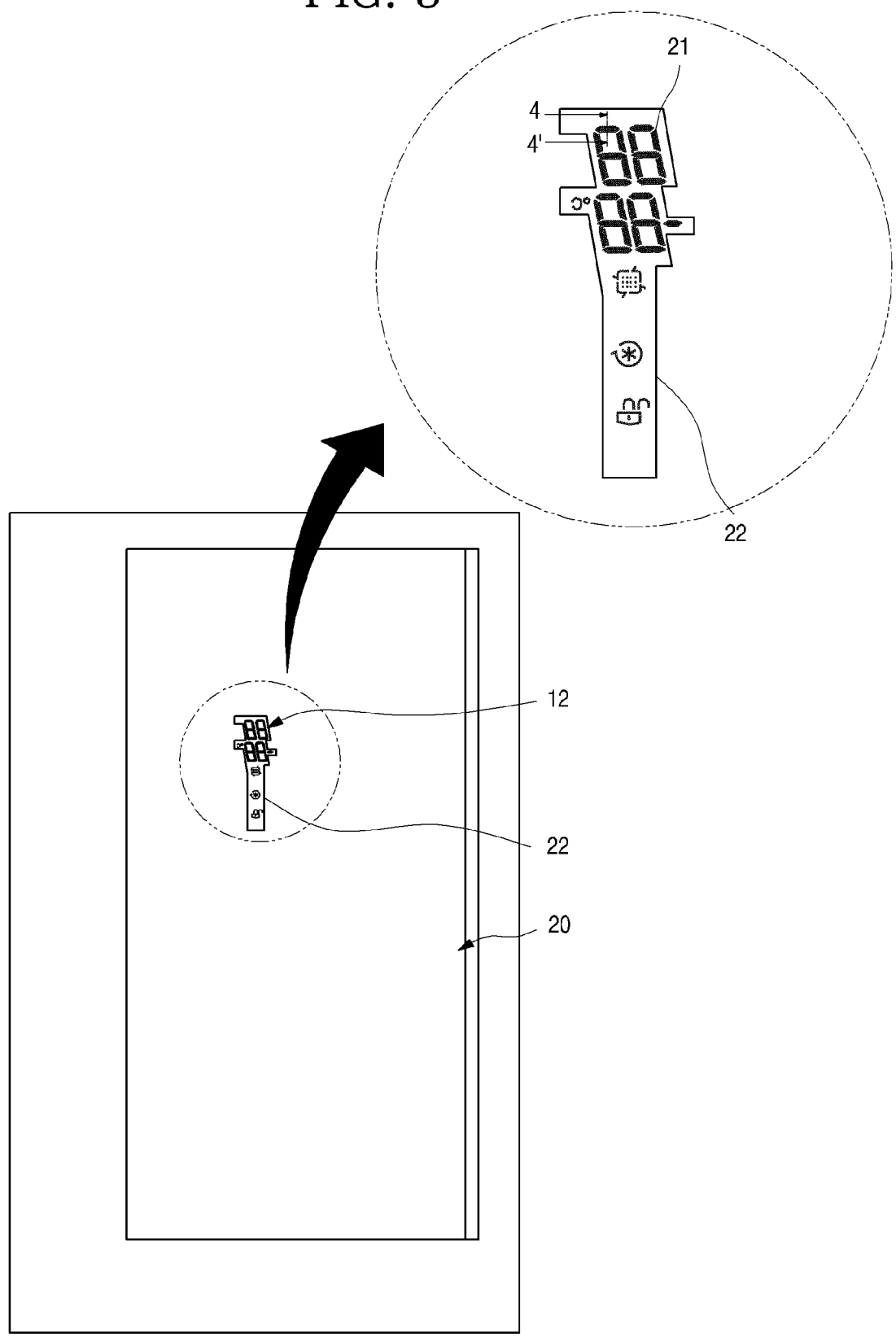
FIG. 3 is a rear view of an example refrigerator door.
Figure 4:
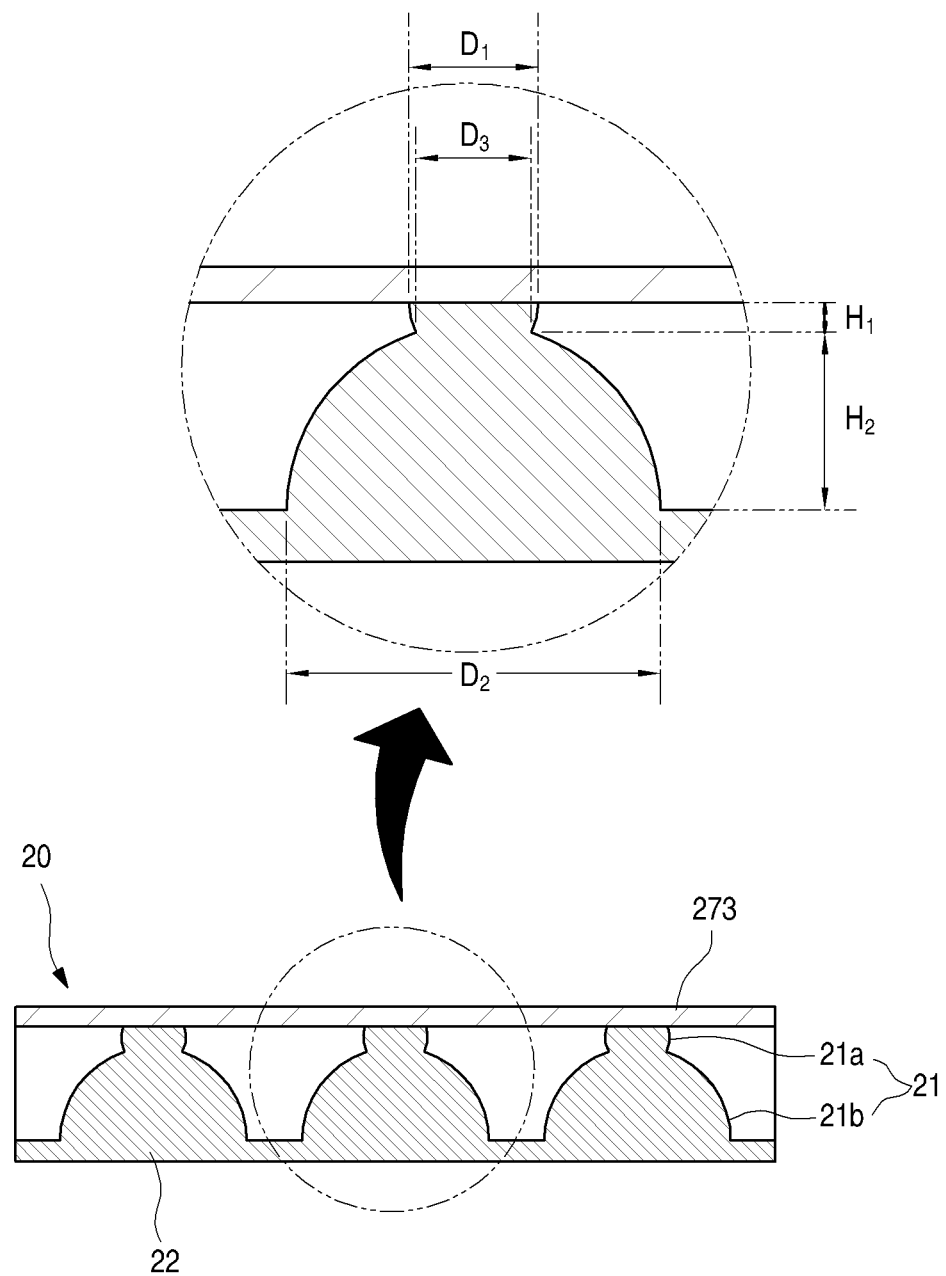
FIG. 4 is a cross-sectional view of an example display on a refrigerator door taken along line 4-4' of FIG. 3.

FIG. 3 illustrates an example refrigerator door. FIG. 4 is a cross-sectional view taken along line 4-4' of FIG. 3.

As illustrated in the drawings, the front panel 20 may be formed in a plate shape and may be formed to be bent and thus to form at least a part of the side surface of the refrigerator door 10. And the front panel 20 forms the exterior of the refrigerator door 10 and thus may be formed to have a thickness which ensures a sufficient strength.

And the plurality of first through-holes 21 may be formed at an area of the displaying part 11 of the front panel 20. The first through-holes 21 may be formed to pass through the front panel 20. Each of the first through-holes 21 may be formed to have a fine size of 0.15 to 0.3 mm when being seen from a front thereof.

When the user sees the refrigerator door 10 from a position distant from the refrigerator 1 in a state in which the LED 313 of the display assembly 300 is not turned on, the first through-holes 21 is not clearly seen due to the fine sizes thereof. Therefore, the refrigerator door 10 may look as if the displaying part 11 is not formed at the front surface thereof, and the user may recognize as if the entire front surface of the refrigerator door 10 is formed of only a smooth stainless plate without other configurations.

And the plurality of the first through-holes 21 may be arranged to transmit the information in the form of the specific character or symbol when the LED 313 is turned on and may form the displaying part 11.

The first through-holes 21 may be formed by etching both of the front surface and the rear surface of the front panel 20. In some implementations, each of the first through-holes 21 may be formed in a groove shape by etching both surfaces of the front panel 20 to have a fine-sized hole shape and also to ensure the thickness of the front panel 20 having the sufficient strength.

In some implementations, with reference to FIG. 4, each of the first through-holes 21 may be formed by a front surface groove 21a formed at the front surface by the etching process and a rear surface groove 21b formed at the rear surface by the etching process, and the front surface groove 21a and the rear surface groove 21b may be in communication with each other, and thus the first through-holes 21 may be formed. That is, the front surface groove 21a and the rear surface groove 21b may be matched one-to-one with each other and may be in communication with each other in a hole-to-hole method, and thus the first through-holes 21 are formed.

Each of the first through-holes 21 exposed to the front surface of the refrigerator door 10 by the front surface groove 21a may be finely formed to have a diameter of 0.15 to 0.3 mm. And the rear surface groove 21b is not exposed to the outside and thus may be formed to have a diameter of 0.8 to 1.5 mm larger than that of the front surface groove 21a. Therefore, even when the thickness of the front panel 20 is slightly thick, the rear surface groove 21b may be formed deeper and may be in contact with an end of the front surface groove 21a to be in communication with each other, and thus the thickness of the front panel 20 may be ensured.

In some implementations, as illustrated in the drawing, in a cross-sectional structure of the first through-hole 21, an opening diameter D1 of the front surface groove 21a exposed to the outside may be formed to have a preset size, and the rear surface groove 21b is formed to have a size and a depth which are in contact with the front surface groove 21a. Therefore, to penetrate the stainless steel plate used as a material of the front panel 20, an opening diameter D2 of the rear surface groove 21b may be formed much larger than the opening diameter D1 of the front surface groove 21a. A diameter D3 of a portion at which the front surface groove 21a and the rear surface groove 21b are in contact and communication with each other by the etching may be formed smaller than the opening diameter D1 of the front surface groove 21a.

Due to a difference between the diameters of the front surface groove 21a and the rear surface groove 21b, a difference between depths of the front surface groove 21a and the rear surface groove 21b also occurs. A depth H1 of the front surface groove 21a is remarkably smaller than a depth H2 of the rear surface groove 21b, and the depth H1 of the front surface groove 21a is determined by the diameter D1 of the front surface groove 21a. Accordingly, the rear surface groove 21b is machined to have the depth H2 which allows the rear surface groove 21b to be in contact with the front surface groove 21a. In some implementations, the diameter D2 of the rear surface groove 21b may be defined.

As described above, each of the front surface groove 21a and the rear surface groove 21b may be formed to have a predetermined curvature while inner diameters thereof become narrower in recessed directions. Therefore, a large amount of light emitted from a rear of the rear surface groove 21b by the LED 313 may be incident to a wide inside of the rear surface groove 21b and may be concentrated while passing through a rounded portion of an inner side surface of the rear surface groove 21b. Therefore, the light passing through the first through-hole 21 may be concentrated, and the light transmitted through the first through-hole 21 may look brighter when being seen from an outside, and thus visibility of the displaying part 11 may be enhanced.

In some implementations, a portion at which the front surface groove 21a and the rear surface groove 21b are in contact with each other may be formed to be inclined, or may not be formed to be inclined or rounded but may be formed to be in communication with each other while a predetermined diameter is maintained.

A hole-filling member 22 is formed at the rear surface of the front panel 20. The hole-filling member 22 may be formed at a portion of the rear surface of the front panel 20, at which the displaying part 11 is formed, in a printing method.

In some implementations, the hole-filling member 22 is formed at the rear surface of the front panel 20 in the printing method and also formed to cover the entire displaying part 11 formed by the plurality of first through-holes 21. Therefore, the first through-holes 21 are filled with the hole-filling member 22, and thus a printed layer having a thickness of about 35 to 55 μm is formed at the rear surface of the front panel 20 corresponding to an area of the displaying part 11.

In some implementations, the hole-filling member 22 may be formed in a screen-printing method, and may completely fill the first through-holes 21 and form the printed layer having a predetermined thickness at a partial area of the stainless steel plate corresponding to the displaying part 11. When a thickness of the hole-filling member 22 is too thin, a diffusion degree of the transmitted light is degraded, and when the thickness of the hole-filling member 22 is too thick, a curve formed by the hole-filling member 22 is exposed to the front surface of the front panel 20 upon a sheet metal forming process of the front panel 20.

A heat drying type printing ink, e.g., an acrylic resin ink may be used to form the hole-filling member 22. The printing ink may have a viscosity of 20,000 cps to 40,000 cps. In some implementations, when the viscosity of the printing ink is lower than 20,000 cps, the ink may leak even after the ink is dried, and when the viscosity of the printing ink is higher than 40,000 cps, an inside of each of the first through-holes 21 having the fine sizes may not be completely filled with the printing ink, and thus a defect may occur.

Therefore, the printing ink has a proper viscosity to effectively fill the first through-holes 21. And due to a component characteristic of the printing ink, the printing ink may have an excellent kinematic viscosity and thus may evenly fill the first through-holes 21 having the fine sizes through a screen-printing operation which will be described below.

In main components of the acrylic resin ink forming the hole-filling member 22, when it is assumed that a weight of an entire coating solution is 100%, 33 w % of silicon acryl polyol and 34 w % of acryl polyol are mixed and used. By mixing of a main resin, the screen-printing method may be realized and a physical property such as transparency and thermal stability may be satisfied.

And about 15 w % of an epoxy resin and a melamine resin as a thermosetting agent is mixed, and 8 w % of a solvent, 2 w % to 3 w % of fumed silica as a viscosity agent for adjusting the kinematic viscosity, 1 w % of a setting agent and the remaining residual amount including a defoaming agent, a leveling agent and an adhesion enhancer may be included.

A composition of some of components forming the hole-filing member 22 may be changed depending on a situation. However, fumed silica may be determined between 2 to 3 w % to keep a set viscosity.

Due to adjusting of the kinematic viscosity by fumed silica, the acrylic resin ink may more effectively fill the first through-holes 21 when the screen-printing operation is performed, and thus the hole-filing member 22 may be formed. In some implementations, the acrylic resin ink may be introduced to the inside of each of the first through-holes 21 while the viscosity of the acrylic resin ink is lowered by an external force applied when the screen-printing operation is performed and then may be maintained in an attached state to the inside of each of the first through-holes 21 due to the viscosity when the external force is removed. The acrylic resin ink is dried in this state, forms the hole-filing member 22 and may effectively fill the inside of each of the first through-holes 21.

As described above, the inside of each of the first through-holes 21 may be filled with the hole-filing member 22, and the hole-filing member 22 prevents the first through-holes 21 from being blocked by a foreign substance. Also, since the inside of each of the first through-holes 21 is filled with the hole-filing member 22, a machined surface of each of the first through-holes 21 may be prevented from being corroded.

After the hole-filing member 22 is formed, an anti-fingerprint coating layer 26 may be formed at the front surface of the front panel 20. Since the front panel 20 is formed of the stainless steel, a contaminant such as a fingerprint may be attached on the surface of the front panel 20 by a user's operation. The anti-fingerprint coating layer 26 may be generally formed by coating a metallic surface with a resin coating film.

Figure 5:
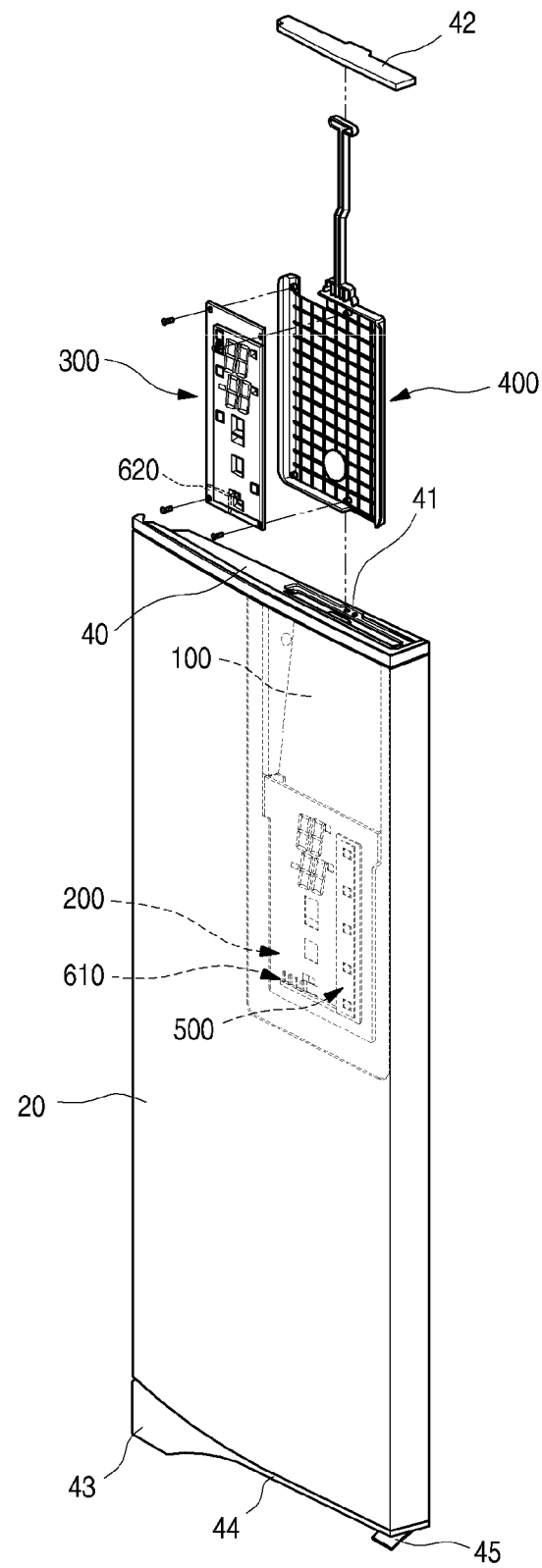
FIG. 5 is an exploded perspective view of an example installation structure of a display assembly of a refrigerator door.
Figure 6:
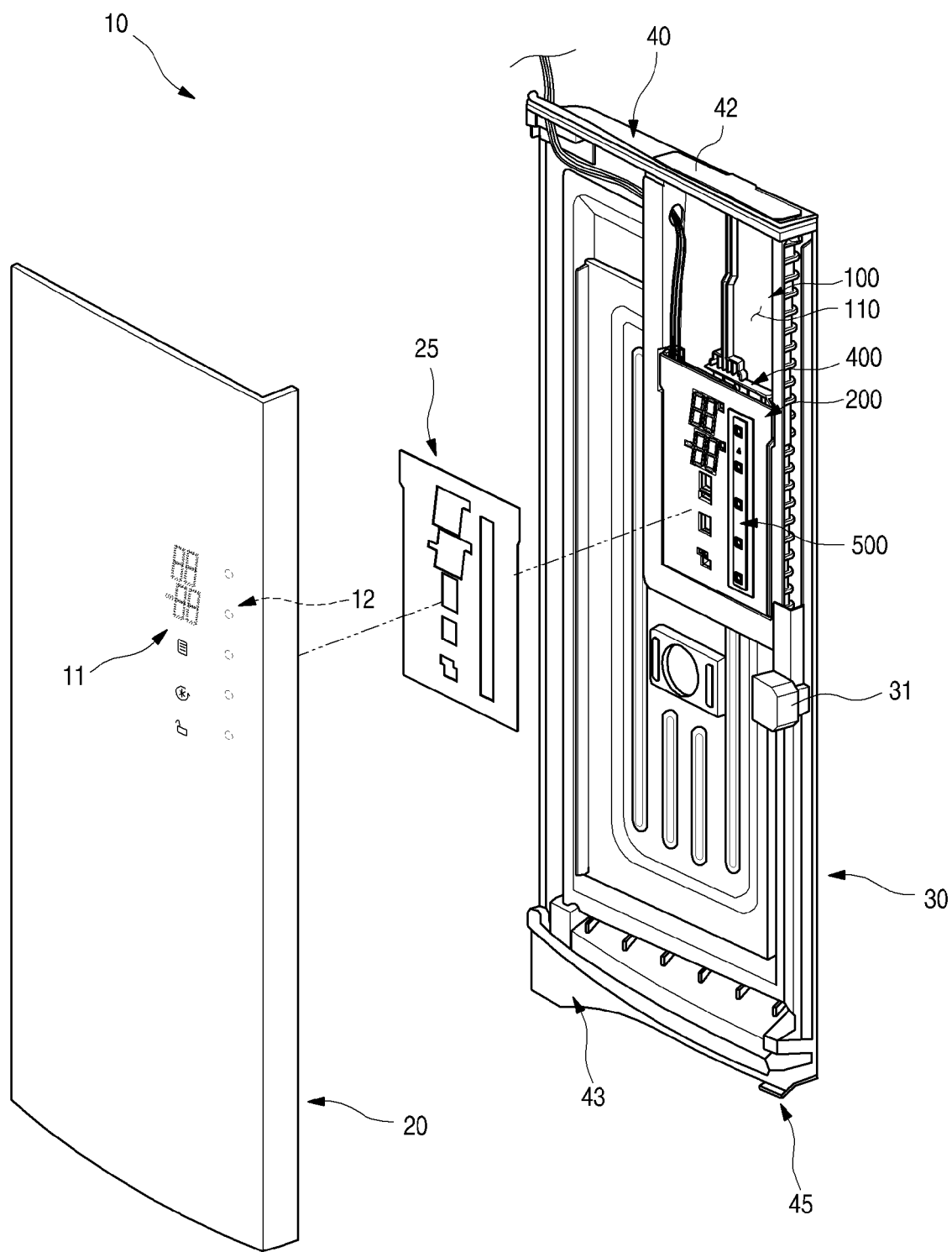
FIG. 6 is an exploded perspective view of an example refrigerator door with a separated front panel.

FIG. 5 illustrates an example installation structure of a display assembly of a refrigerator door. FIG. 6 illustrates an example refrigerator door from which a front panel is separated.

As illustrated in the drawings, the door liner 30 forming the rear surface of the refrigerator door 10 is coupled to the front panel 20 and forms a surface which is directed toward an inside of the storage space. The door liner 30 may be injection-molded with a plastic material and may provide a structure in which a gasket may be disposed along a perimeter thereof or a basket or the like may be installed. And the door liner 30 forms a space between the door liner 30 and the front panel 20 when being coupled to the front panel 20, and the space may be filled with a foam solution forming an insulator 24.

A frame 100 may be attached to the rear surface of the front panel 20. The frame 100 is formed to provide a separate space, which is not filled with the foam solution, inside the refrigerator door 10, and provides a space in which a display cover 200, the display assembly 300, a touch sensor assembly 500, a frame display 400 and so on are accommodated.

The decoration members 40 and 43 form an exterior of each of upper and lower portions of the refrigerator door 10, and are formed to shield the opened upper and lower ends of the refrigerator door 10 which are formed by coupling the front panel 20 and the door liner 30.

An insertion hole 41 and an insertion hole cover 42 for opening and closing the insertion hole 41 are provided at the decoration member 40 located at the upper portion of the refrigerator door 10. The insertion hole 41 passes through the decoration member 40 and is in communication with a space formed by the frame 100. When the refrigerator door 10 is assembled, the display assembly 300 may be inserted into the frame 100 through the insertion hole 41 while being coupled to the frame display 400. To this end, the insertion hole 41 may be formed to have a size into which the frame display 400 is insertable and may be located right above the display cover 200.

A hinge hole in which a hinge serving as a rotating shaft of the refrigerator door 10 is installed is formed at one side of the decoration member 40. And an electric wire guided inside the frame 100 is inserted and withdrawn through the hinge hole to supply electric power to a front component inside the frame 100 and to transmit and receive an operation signal.

A door handle 44 may be provided at the decoration member 43 located at the lower portion of the refrigerator door 10. The door handle 44 is formed to be recessed in a pocket shape, such that the refrigerator door 10 is rotatably operated. And a lever 45 for an opening and closing operation of the refrigerator door 10 may be further provided at the decoration member 43 located at the lower portion of the refrigerator door 10. A latch assembly 31 may be driven by an operation of the lever 45 to selectively keep an opening or closing state of the refrigerator door 10.

The display cover 200 is attached to the rear surface of the front panel 20. The display cover 200 serves to guide an installation of the display assembly 300 on which the LED 313 is mounted, and is formed to be attached to the rear surface of the front panel 20 by an adhesive member 25 formed by coating a double-sided tape or a primer.

The touch sensor assembly 500 which detects a pushing operation of the front panel 20 by the user is installed at one side of the display cover 200. The display cover 200 has a structure which is attached to the front panel 20 while being coupled to the touch sensor assembly 500.

And the display assembly 300 is inserted into an internal space of the frame 100 through the insertion hole 41 while being installed at the frame display 400. When the frame display 400 is completely inserted, the display assembly 300 is located inside the display cover 200, and the light emitted from the LED 313 may pass through the display cover 200 and the displaying part 11 and may be radiated to the outside.

Figure 7:
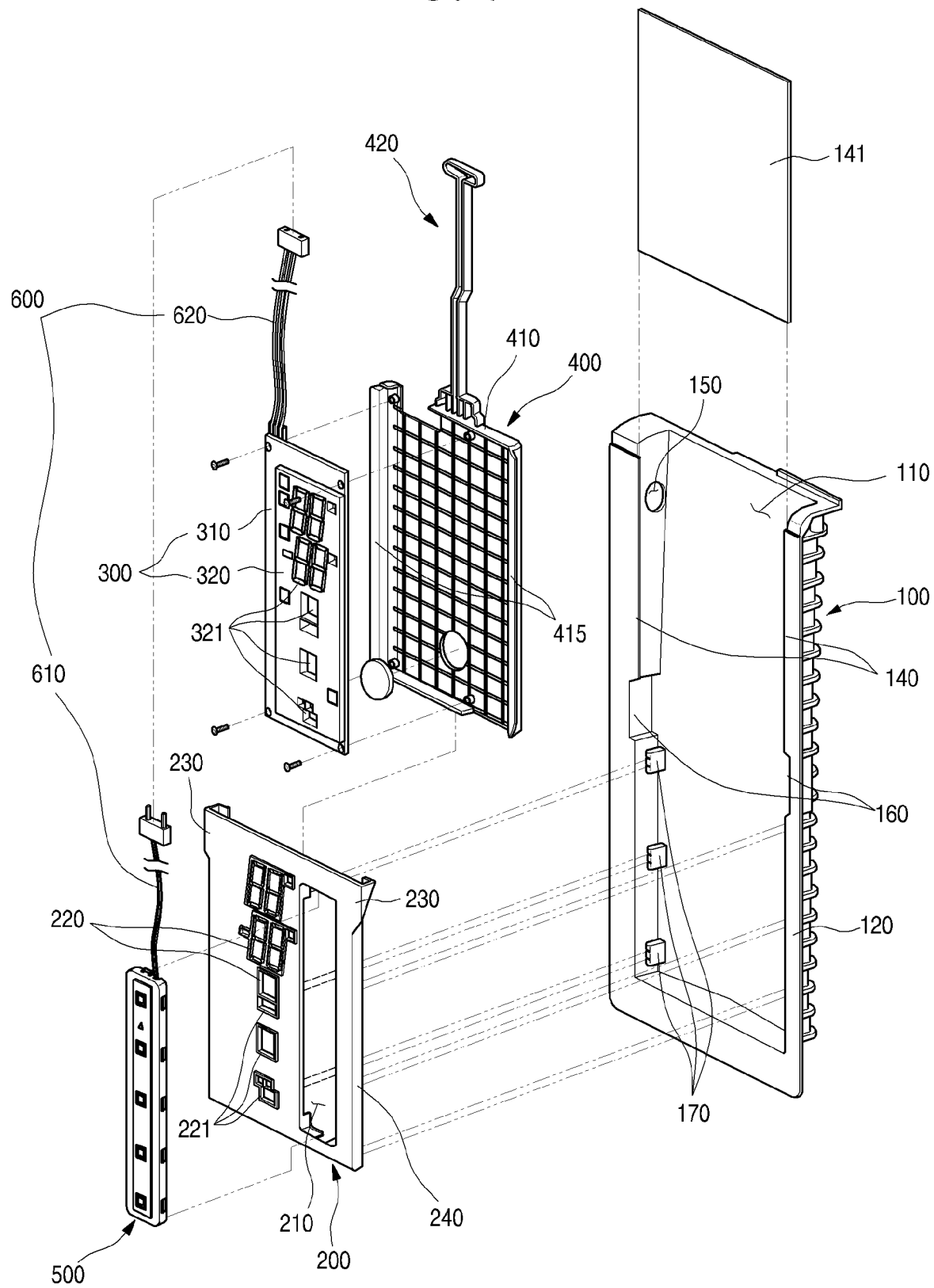
FIG. 7 is an exploded perspective view of an example coupling structure among a touch sensor assembly, a display cover, a display assembly, a frame display and a frame.

FIG. 7 illustrates an example coupling structure among a touch sensor assembly, a display cover, a display assembly, a frame display, and a frame.

As illustrated in the drawing, the frame 100 is formed so that a front surface and an upper surface thereof are opened, and also formed so that a space 110 of which an upper surface is opened is formed when being attached to the front panel 20. To this end, a perimeter of the frame 100 except an upper end thereof is bent toward the front panel 20, and an end thereof is bent again outward to form a frame adhesion portion 120. A double-sided tape or an adhesive is provided at the frame adhesion portion 120 so that the frame 100 is attached to the rear surface of the front panel 20.

The upper end of the frame 100 is in contact with a lower surface of the decoration member 40 while the frame 100 is attached to the front panel 20. And the opened upper surface of the frame 100 may be in communication with the insertion hole 41 and may form an independent space at the inside of the refrigerator door 10.

Therefore, when the foam solution for forming the insulator 24 is injected into the refrigerator door 10, the foam solution is prevented from being introduced into the internal space of the frame 100.

And a plate supporting portion 140 on which a support plate 141 is seated is formed at each of left and right ends of an upper portion of the frame 100. The support plate 141 is installed at an area of an upper space of the frame 100 corresponding to an upper side of the display cover 200 while the display cover 200 is installed thereat, and formed to support the front panel 20 at a rear thereof. Therefore, a corresponding portion of the front panel 20 may be prevented from being rolled, and also the front panel 20 may be prevented from being deformed by an external impact.

A wire entrance hole 150 is formed at an upper portion of a side surface of the frame 100. The wire entrance hole 150 forms a passage through which an electric wire for connecting electronic parts provided inside the frame 100 with a power source provided on the cabinet is inserted and withdrawn. The wire entrance hole 150 may be formed at the upper portion of the side surface thereof close to the hinge of the refrigerator door 10 and may be disposed close to the hinge hole of the refrigerator door 10. And when the foam solution is injected into the refrigerator door 10, the wire entrance hole 150 is finished to prevent the foam solution from being introduced into the frame 100.

And a restriction groove 160 is formed at each of left and right sides of the frame 100. The restriction groove 160 is formed so that a restriction portion 230 laterally protruding from each of left and right ends of the display cover 200 is inserted thereinto.

A cover supporting portion 170 for supporting the display cover 200 is formed at a portion thereof under the restriction groove 160 at which the display cover 200 is located. The cover supporting portion 170 protrudes from each of left and right side surfaces of the frame 100 and pushes and supports each of the left and right ends of the display cover 200 at a rear thereof.

The display cover 200 is formed of a plate-shaped plastic material and formed to be accommodated inside the frame 100 while being attached to the front panel 20. And the restriction portion 230 which protrudes outward and is inserted into the restriction groove 160 is formed at each of the left and right ends of the display cover 200.

An accommodation portion 210 in which the touch sensor assembly 500 is installed is formed at the display cover 200. And the plurality of second through-holes 220 are formed at positions of the display cover 200 corresponding to the displaying part 11.

The second through-holes 220 are formed at positions corresponding to the first through-holes 21 when the display cover 200 is attached to the rear surface of the front panel 20. The second through-holes 220 may be formed to be opened in shapes corresponding to the seven segments and may be formed in various hole shapes for displaying other information.

A shielding portion 221 is formed at a circumference of each of the second through-holes 220. The shielding portion 221 is formed at an outside of each of the second through-holes 220 to surround each of the second through-holes 220 and formed in a shape which protrudes forward.

And the adhesive member 25 for bonding the display cover 200 is provided at only an outer area of the shielding portion 221. Therefore, when the display cover 200 is attached, a gap between the first through-hole 21 and the second through-hole 220 which is generated by a thickness of the adhesive member 25 may be minimized, and the light may be prevented from leaking through the gap. A protruding height of the shielding portion 221 is formed to shield a leakage of the light, and may be formed lower than an entire height of the adhesive member 25 before the adhesive member 25 is compressed in consideration of a fact that the adhesive member 25 provided at a front surface of the display cover 200 is compressed.

The display assembly 300 may include a display PCB 310 on which the LED 313 is mounted, and a reflector 320 which is disposed at a front surface of the display PCB 310.

The display PCB 310 includes a controller for driving the LED 313, and a sensor controller 330 for driving the touch sensor assembly 500 is mounted thereon. In some implementations, the sensor controller 330 serves to process an operation signal of the front panel 20 detected through the touch sensor assembly 500 on the display PCB 310. To this end, a sensor PCB inside the touch sensor assembly 500 and the display PCB 310 may be connected by a cable connector 600.

The cable connector 600 includes a first cable connector 610 which is connected to the sensor PCB inside the touch sensor assembly 500, and a second cable connector 620 which is connected to the display PCB 310, and the first cable connector 610 and the second cable connector 620 may be connected to each other. And while the display assembly 300 is installed at the refrigerator door 10, the first cable connector 610 and the second cable connector 620 may be connected to each other at an outside of the refrigerator door 10.

In some implementations, an entire length of the cable connector 600 is formed longer than a distance from the touch sensor assembly 500 to the insertion hole 41, and the first and second cables connectors 610 and 620 are connected to each other at an outside of the insertion hole 41 while the touch sensor assembly 500 is installed at the display cover 200, and then the display assembly 300 may be installed.

The reflector 320 which guides the light of the LED 313 toward the first through-holes 21 is provided at the front surface of the display PCB 310. The reflector 320 serves not only to guide the light of the LED 313 but also to enable the display PCB 310 and a display terminal 311 to be spaced apart from the front panel 20 at a thickness of the reflector 320, thereby protecting the display PCB 310 from static electricity.

In particular, due to a structural characteristic in which the front panel 20 is formed of the stainless steel material and the display assembly 300 is disposed adjacent to the displaying part 11, the display PCB 310 may be vulnerable to the static electricity generated in use. However, due to the reflector 320, the display PCB 310 may allow the light to be smoothly transmitted while being structurally spaced apart from the front panel 20 and may protect the display PCB 310 itself from the static electricity.

The third through-holes 321 which correspond to an arrangement of the LED 313 mounted on the display PCB 310 and are in communication with the second through-holes 220 and the first through-holes 21 are formed at the reflector 320. In a state in which the display assembly 300 is installed, the frame display 400 is installed at the display cover 200, and all of the first through-holes 21, the second through-holes 220 and the third through-holes 321 are in close contact and communication with each other, and the light emitted from the LED 313 may be radiated to the outside through the displaying part 11.

The frame display 400 at which the display PCB 310 is installed is formed in a plate shape on which the display PCB 310 may be seated. And a flange 410 which is bent forward along a perimeter of the frame display 400 is formed, and a space in which the display PCB 310 is accommodated is formed. And a sliding insertion portion 415 which is bent toward each of left and right sides is formed at each of left and right ends of the frame display 400. The sliding insertion portion 415 is formed to be inserted into a guide rail 240 formed at the display cover 200. Therefore, the frame display 400 may be installed at the display cover 200 by the sliding insertion portion 415.

And a frame handle 420 formed to extend upward is provided at a center portion of an upper end of the frame display 400. The frame handle 420 is operated in a gripped state by the user when the frame display 400 is coupled to the display cover 200, and formed to have a predetermined length.

When the insertion hole cover 42 is closed in a state in which the frame display 400 is completely inserted, the insertion hole cover 42 is in contact with the frame handle 420.

Figure 8:
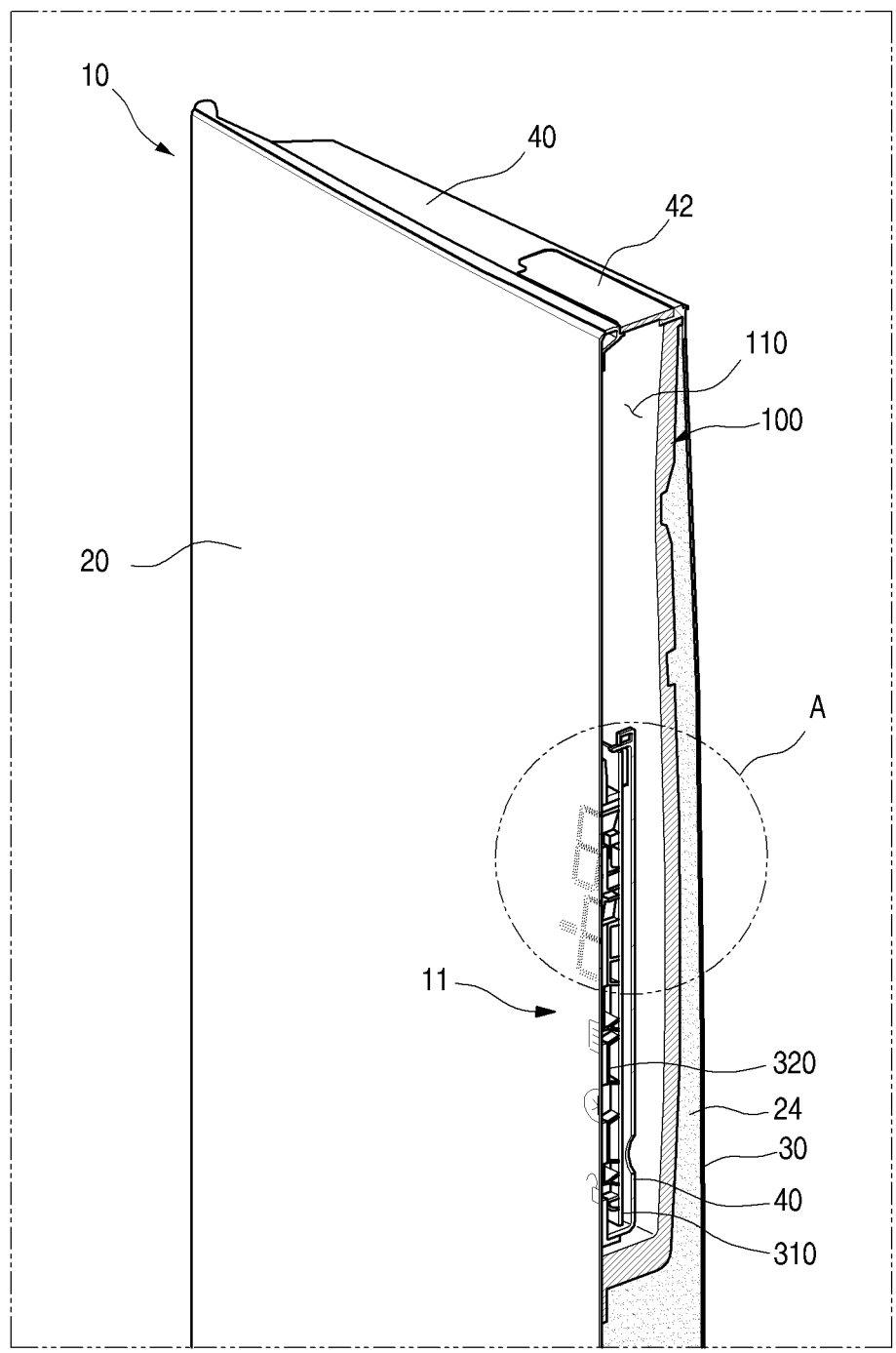
FIG. 8 is a cross-sectional view of an example refrigerator door taken along line 8-8' of FIG. 2.
Figure 9:
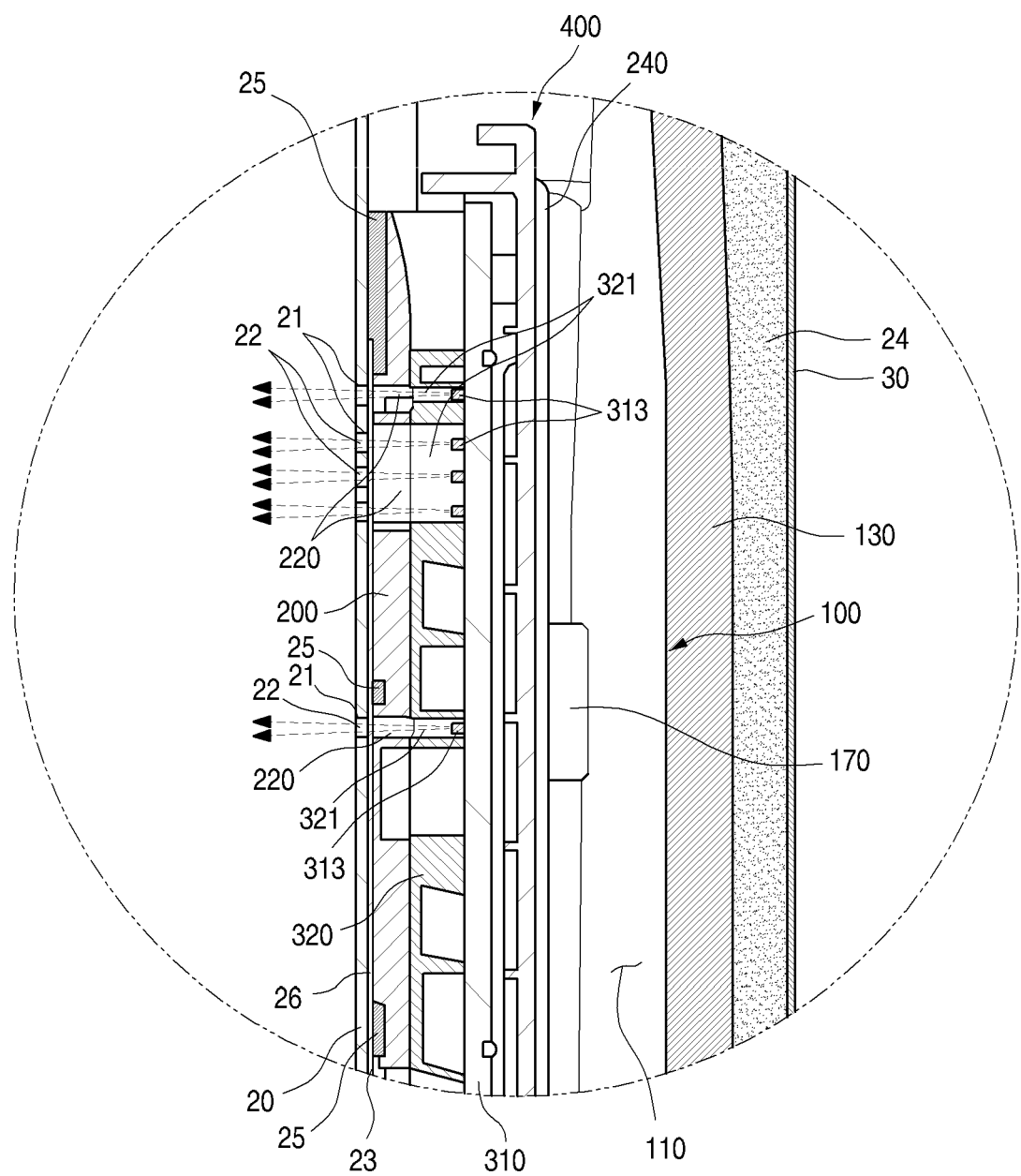
FIG. 9 is an enlarged view of an A portion of FIG. 8.

FIG. 8 is a cross-sectional view taken along line 8-8' of FIG. 2. FIG. 9 is an enlarged view of an A portion of FIG. 8.

Referring to the drawings, while the display cover 200 is attached to the rear surface of the front panel 20 by the adhesive member 25, the first through-holes 21 and the second through-holes 220 are in communication with each other. In some implementations, the size of each of the first through-holes 21 is formed to be very small and much smaller than a size of each of the second through-holes 220, and the plurality of first through-holes 21 may be disposed at an inner area of one of the second through-holes 220.

And while the frame display 400 is completely inserted and the display assembly 300 is located inside the display cover 200, the third through-holes 321 are connected to coincide with the second through-holes 220. The second through-holes 220 and the third through-holes 321 have the same sizes. When the reflector 320 is in close contact with a rear surface of the display cover 200, the second through-holes 220 and the third through-holes 321 may be completely overlapped with each other.

Therefore, all of the third through-holes 321, the second through-holes 220 and the first through-holes 21 may be in communication with each other, and the light emitted from the LED 313 may pass in turn through the third through-holes 321, the second through-holes 220 and the first through-holes 21 and may be radiated to the outside of the refrigerator door 10.

A diffusion sheet 250 may be attached to the rear surface of the front panel 20 in which the first through-holes 21 are formed. The diffusion sheet 250 serves to diffuse the light emitted from the LED 313 such that the light passing through the first through-holes 21 is evenly distributed, and thus the light emitted through the displaying part 11 may be evenly bright, and the character, the number or the symbol displayed through the displaying part 11 may be clearly recognized.

Figure 10:
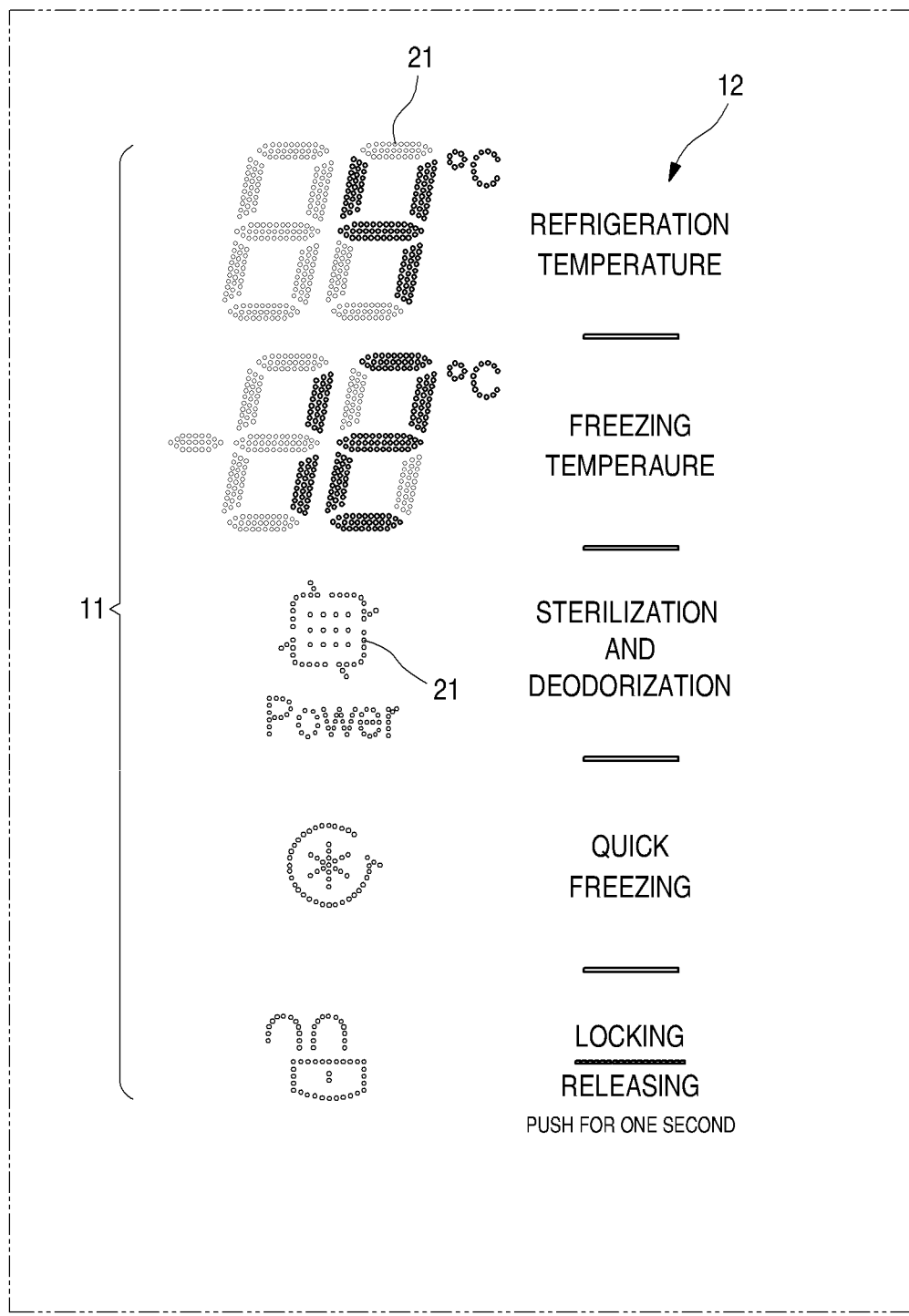
FIG. 10 is a view of a turned-on state of an example displaying part.

FIG. 10 illustrates an example displaying part.

As illustrated in the drawing, the displaying part 11 may be formed by the plurality of first through-holes 21 and may be expressed in the seven-segment shape or a symbol shape. The displaying part 11 has a fine hole shape which is difficult to be recognized from the outside when the LED 313 of the display assembly 300 is not turned on, and the front surface of the refrigerator door 10 may look like an iron plate without the displaying part 11 when being seen from a slightly distant position.

In this state, when the user touches the touch operation part 12 or the LED 313 is turned on by an internal setting, the light emitted from the LED 313 may pass in turn through the third through-holes 321, the second through-holes 220 and the first through-holes 21 and may be emitted to the outside.

In some implementations, the light is emitted from some of the plurality of first through-holes 21 according to a turned-on state of the LED 313, and the remaining first through-holes 21 do not emit the light and thus are not visible to the user. The first through-holes 21 which emit the light by passing the light of the LED 313 may be combined and may form a specific number, character or symbol shape.

For example, as illustrated in FIG. 10, the light is emitted from a part of the plurality of first through-holes 21 and may display information such as 4° C. and −12° C. in the form of a number. In some implementations, the information may be displayed through the front surface of the refrigerator door 10 in various forms by the combination of the first through-holes 21 which are turned on in a state in which a separate display is not visible on the front surface of the refrigerator door 10.

A manufacture method of the exterior member having the above-described structure will be described.

Figure 11:
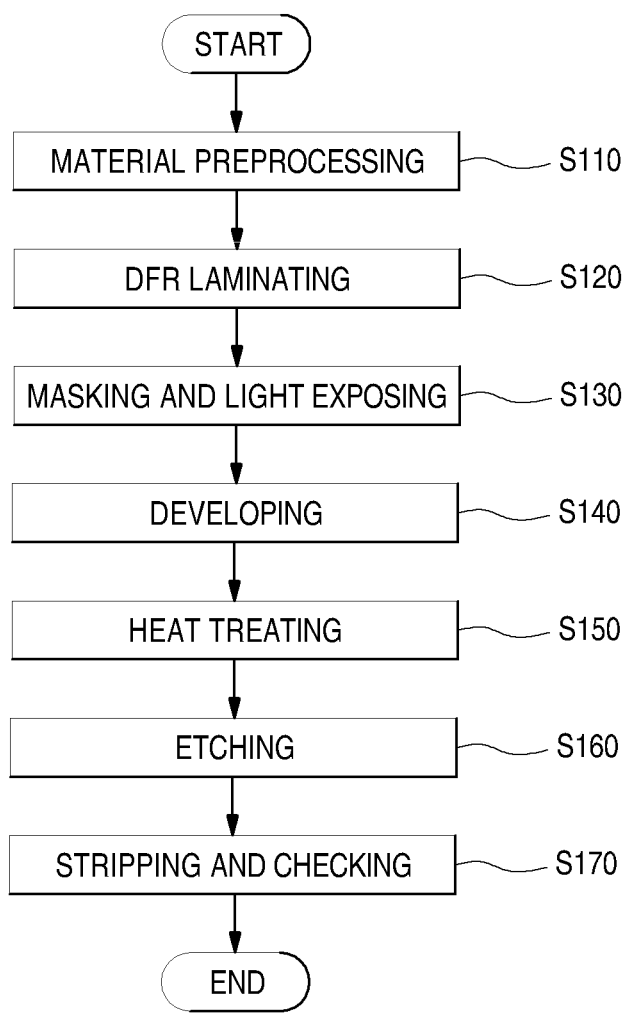
FIG. 11 is a flowchart of an example manufacture method of an exterior member.

FIG. 11 illustrates an example manufacture method of an exterior member.

Figure 12:
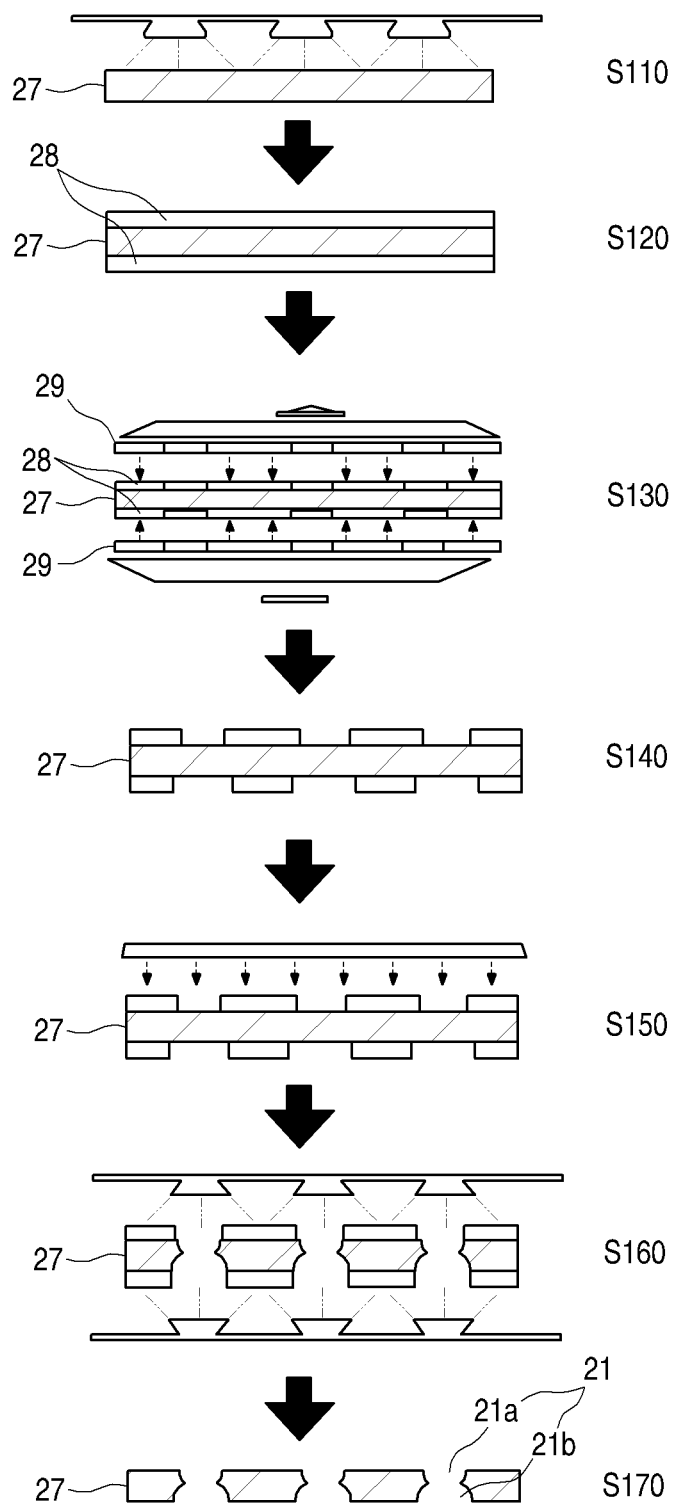
FIG. 12 is an overview schematic of an example forming process of first through-holes of an exterior member.

FIG. 12 illustrates an example forming process of a first through-holes of an exterior member.

First, a forming process of the first through-holes 21 will be sequentially described with reference to FIGS. 11 and 12. As illustrated in the drawings, to mold the exterior member, e.g., the front panel 20, first, a stainless steel plate 27 used as the material of the front panel 20 is cut and stored in a proper length.

And the stored stainless steel plate 27 is washed using a solution containing sulfuric acid and caustic soda to remove a foreign substance on a surface thereof. The foreign substance on the surface of the stainless steel plate 27 may be completely removed by the washing, and then the stainless steel plate 27 may be moved to a next process after the washing and drying process is completed [a preprocessing operation, S110].

A dry film photoresist (DFR) 28 is attached to both of front and rear surfaces of the stainless steel plate 27, in which the preprocessing operation of the surface thereof is completed, by a laminating process. In some implementations, the stainless steel plate 27 is pressed while passing through a roller so that the DFR 28 is attached to the entire stainless steel plate 27 [a DFR laminating operation, S120].

And a masking film 29 is attached to each of the both surfaces on which the DFR 28 is laminated. In some implementations, the masking film 29 may be aligned and attached to an exact position by automation equipment so that the holes are formed at the same positions of the front and rear surfaces of the stainless steel plate 27. And the masking film 29 designed according to a size may be attached to each of the front and rear surfaces of the stainless steel plate 27 so that the front surface groove 21a and the rear surface groove 21b having the different sizes from each other are formed. And while the masking film 29 is attached, ultraviolet light is radiated on both surfaces of the masking film 29 in a vacuum environment, and thus the DFR 28 is hardened [a light exposure operation, S130].

And in a state in which the DFR 28 is completely hardened by the light exposure operation, the stainless steel plate 27 in which the light exposure operation is completed is put in a developing solution, and the remaining portion except a hardened portion, e.g., a masked portion which does not receive the light is dissolved and removed in the developing solution. Therefore, the remaining portion except the hardened portion may be removed, and the stainless steel plate 27 may be washed and then may be moved to a next process [a developing operation, S140].

And the both surfaces of the stainless steel plate 27 in which the developing operation is completed are heat-dried to remove microbubbles on the DFR 28 and to enhance an adhesive property of the DFR 28. In some implementations, the heat-drying may be performed at a temperature of about 180 to 200° C. for about 10 minutes. The DFR 28 attached to the entire stainless steel plate 27 from which the microbubbles are removed by such a heat treatment may be in completely close contact with the overall front and rear surfaces of the stainless steel plate 27 [a heat treatment operation, S150].

The stainless steel plate 27 which is completely dried is moved and then etched. In some implementations, ferric chloride ($FeCl_2$) may be used as an etching solution. Therefore, the DFR 28 attached to the surfaces of the stainless steel plate 27 is not corroded, but only a molded portion corresponding to the front surface groove 21a and the rear surface groove 21b from which the DFR 28 is removed may be corroded.

In some implementations, the front surface and the rear surface of the stainless steel plate 27 may be simultaneously etched, and thus the front surface groove 21a and the rear surface groove 21b may also be simultaneously etched. In some implementations, an etching process may be performed twice so that the front surface groove 21a is first etched and then the rear surface groove 21b is etched.

The front surface groove 21a is a hole which is exposed to the front surface of the front panel 20 and machined to have a fine and uniform size. And the rear surface groove 21b is a portion which is formed at the rear surface of the front panel 20 and is not exposed to the outside, and may be etched to be in communication with the front surface groove 21a to form the first through-hole 21.

In some implementations, the front surface groove 21a may be etched in a depth relatively shallower than the rear surface groove 21b to satisfy an opening size of the fine and uniform first through-hole 21 which is exposed to the outside. And the rear surface groove 21b may be etched in a depth which is not exposed to the outside but is in communication with the front surface groove 21a so that the light emitted from the LED 313 passes through the first through-holes 21.

In some implementations, as a size of the rear surface groove 21b is increased, the depth of the rear surface groove 21b is increased, and a depth of the first through-hole 21 is also increased, and thus a thickness of the stainless steel plate 27 may be increased. In some implementations, in order to provide the thickness which satisfies a sufficient strength of the front panel 20, the rear surface groove 21b is formed to have an increased diameter and the rear surface groove 21b is formed to be deep. In some implementations, the rear surface groove 21b may be formed to have a size which is not in contact with or overlapped with adjacent rear surface grooves 21b.

When the etching of the front surface and the rear surface of the stainless steel plate 27 is completed, the front surface groove 21a and the rear surface groove 21b are connected to each other. In some implementations, a diameter of the rear surface groove 21b is larger than that of the front surface groove 21a. And the plurality of first through-holes 21 may be formed by connecting the front surface groove 21a and the rear surface groove 21b in the hole-to-hole method [an etching operation, S160].

In a state in which the etching is completed and the first through-holes 21 are formed, the DFR 28 is removed, and only the stainless steel plate 27 having the first through-holes 21 is remained by removing the DFR 28. After the DFR 28 is completely removed, an inspection process for checking a state of the formed first through-holes 21 may be performed [an exfoliation and inspection operation, S170].

In the stainless steel plate 27 in which the forming of the first through-holes 21 is completed, the first through-holes 21 may be filled with the printing ink by the screen-printing process, and the hole-filling member 22 may be formed.

Hereinafter, a forming process of the hole-filling member 22 will be described in detail with reference to the drawings.

Figure 13:
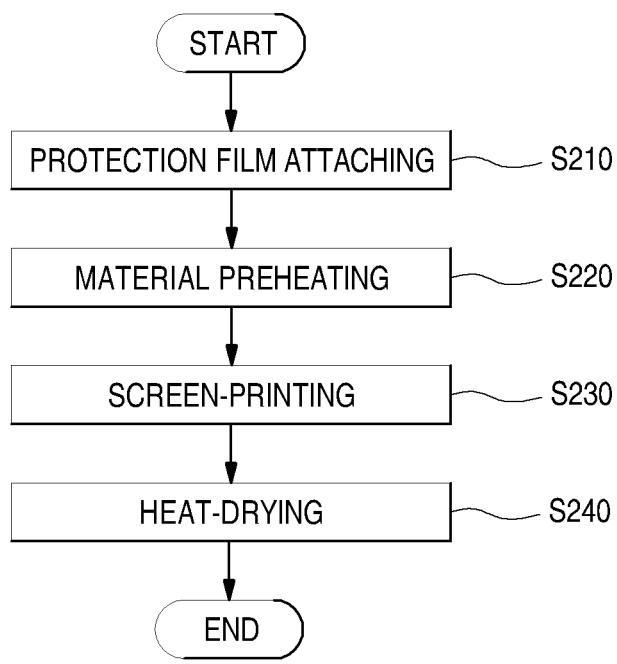
FIG. 13 is a flowchart of an example method for forming a hole-filling member in a first through-hole of an exterior member.
Figure 14:
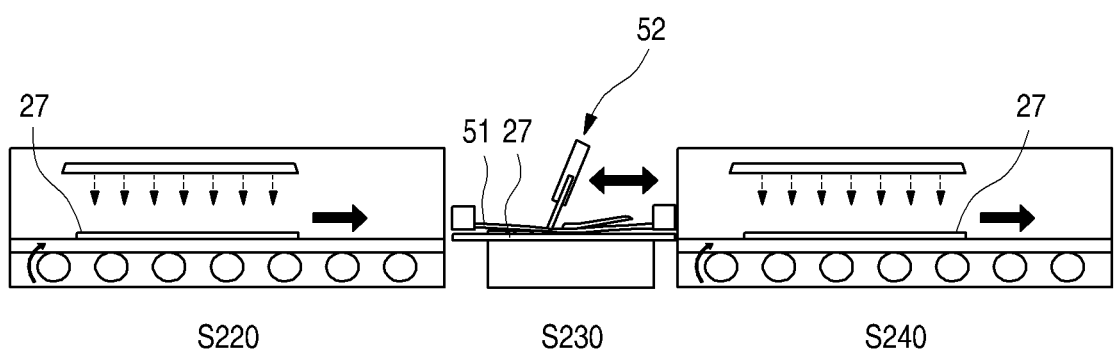
FIG. 14 is an overview schematic of an example print-forming process of a hole-filling member in a first through-hole.

FIG. 13 illustrates an example method of forming a hole-filling member in a first through-hole of an exterior member. FIG. 14 illustrates an example print-forming process of a hole-filling member in a first through-hole.

As illustrated in the drawings, a protection film 274 may be attached to the stainless steel plate 27 in which the forming of the first through-holes 21 are completed. The protection film 274 serves to protect the surface of the stainless steel plate 27 having the first through-holes 21 thereon and may be attached to the entire surfaces of the stainless steel plate 27 to prevent a damage such as a scratch while the stainless steel plate 27 is moved.

And the protection film 274 may block the first through-holes 21 so that the printing ink for forming the hole-filling member 22 is accommodated therein. Also, the protection film 274 may be formed of a heat resistant PET which prevents a deformation or a damage due to heat when the material is preheated or the printing ink is heat-dried. Therefore, even when the entire stainless steel plate 27 is heated, the damage or deformation of the protection film 274 is prevented, and a leakage of the printing ink is prevented, and a defect in the forming of the hole-filling member 22 may also be prevented.

When the protection film 274 is attached, an adhesive may be provided at an attaching surface of the protection film 274. The adhesive is formed of a silicone resin as a main component and thus may be prevented from spreading to the material when the printing ink is dried. Therefore, when an anti-fingerprint coating 273 is performed, a stain may be prevented from being generated on the exterior [a protection film attaching operation, S210].

In a state in which the attaching of the protection film 274 is completed, the stainless steel plate 27 is processed by a preheating process in which the stainless steel plate 27 is heated before the screen-printing. When the printing ink is printed on the surface of the stainless steel plate 27 while the stainless steel plate 27 is in a heated state, energy of the printing ink is reduced, and a surface tension is also lowered, and thus the first through-holes 21 may be effectively filled with the printing ink. In some implementations, a viscosity of the printing ink is temporarily lowered by heat of the heated stainless steel plate 27, and the printing ink may be introduced into the first through-holes 21. When a temperature of the stainless steel plate 27 is lowered, the viscosity of the printing ink is increased again, and the printing ink may be maintained in the first through-holes 21. [a material preheating operation, S220].

The printing ink may be printed in the screen-printing method on the rear surface of the stainless steel plate 27, e.g., a surface opposite to the surface to which the protection film 274 is attached. The first through-holes 21 are filled with the printing ink by the screen-printing using the printing ink, and a part of the rear surface of the stainless steel plate 27 is coated with the printing ink, and thus the hole-filling member 22 is formed.

A forming method of the hole-filling member 22 will be described in detail with reference to the drawings.

Figure 15:
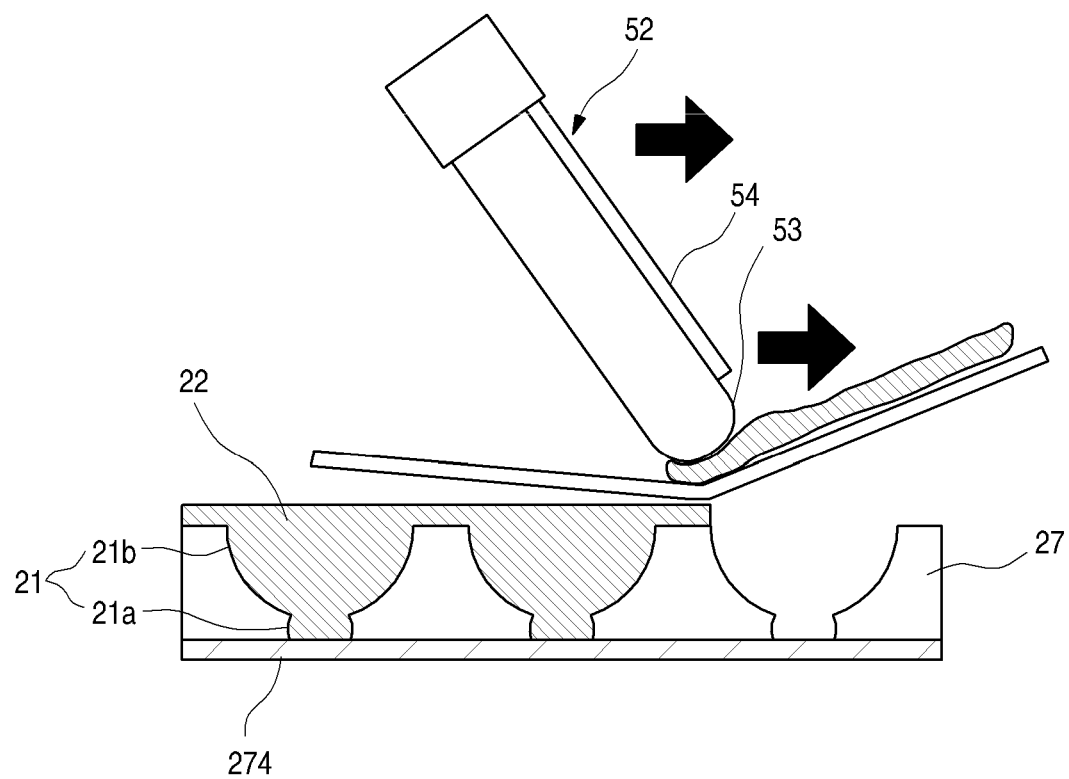
FIG. 15 is a view of a state in which an example screen-printing process is performed at a rear surface of a front panel.
Figure 16:
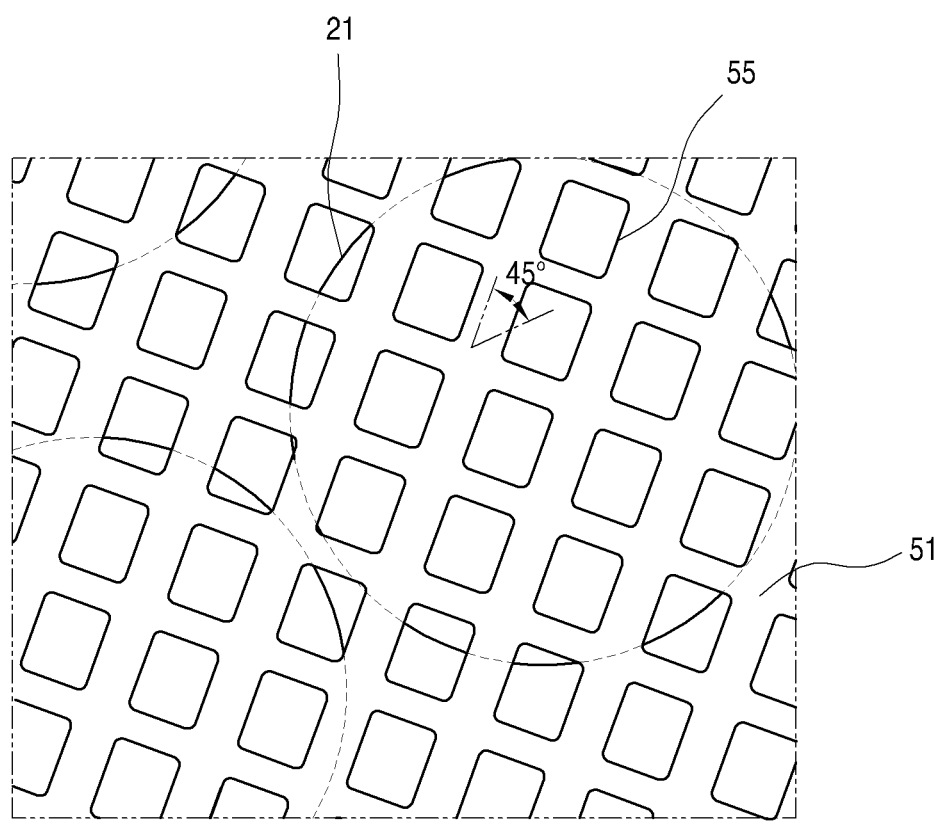
FIG. 16 is a view of a relationship between an example first through-hole and example mesh of an engraved plate for a screen-printing.

FIG. 15 illustrates an example screen-printing process being performed at a rear surface of a front panel. FIG. 16 illustrates an example first through-hole and an example mesh of an engraved plate for the screen-printing.

As illustrated in the drawings, the stainless steel plate 27 in which the preheating is completed is disposed to perform the screen-printing. In some implementations, the stainless steel plate 27 is disposed so that the attaching surface of the protection film 274 is directed downward. In some implementations, the rear surface of the stainless steel plate 27 and an opened rear surface of the first through-hole 21 may be exposed upward.

In this state, an engraved plate 51 for the screen-printing is located at the rear surface of the stainless steel plate 27 corresponding to the displaying part 11. In some implementations, all of the first through-holes 21 are located inside an area of the engraved plate 51, and the overall first through-holes 21 may be filled with the printing ink by the screen printing.

The hole-filling member 22 formed by the screen-printing is screen-printed using the engraved plate 51 of about 100 meshes and may be two-color-printed through two strokes. And the hole-filling member 22 formed by the screen-printing fills the first through-holes 21 and also further forms a printed layer having a predetermined thickness at the rear surface of the stainless steel plate 27. In some implementations, the printed layer may be formed at the area of the displaying part 11 and may be formed to cover the second through-holes 220 of the display cover 200 located at a rear of the stainless steel plate 27.

And the hole-filling member 22 printed by the engraved plate 51 has a shape as illustrated in FIG. 3 when being seen from a rear side. In some implementations, an outline shape of the hole-filling member 22 may be formed along the shielding portion 221 of the display cover 200.

Therefore, all of the first through-holes 21 are disposed within an area of the hole-filling member 22 formed by the screen printing not to interfere with the display cover 200 when the display cover 200 is installed and also not to interfere with the touch operation part 12.

Unlike the screen printing for printing a pattern, the engraved plate 51 for the screen printing is mainly to fill the holes. Accordingly, to effectively fill the first through-holes 21, an engraved plate having a shoulder angle of 45° may be used so that the number of meshes corresponding to one first through-hole 21 is more than that of meshes in a general screen engraved plate 51.

In some implementations, as illustrated in FIG. 16, each of meshes 55 in the engraved plate 51 is formed to have the shoulder angle of 45° so that 13 meshes 55 are arranged in one first through-hole 21 and thus a more number of meshes 55 than that of meshes in the general screen printing are arranged. Accordingly, the printing ink may effectively fill the first through-holes 21.

And the engraved plate 51 is seated close to the rear surface of the stainless steel plate 27 in a distance of about 5 mm or less, may prevent an influence of a tension of the engraved plate 51 by preventing the engraved plate 51 from being raised and minimizing a gap between the rear surface of the stainless steel plate 27 and the engraved plate 51 and may evenly maintain a filling amount in each of the plurality of first through-holes 21.

A squeeze 52 for filling the first through-holes 21 with the printing ink may be provided above the engraved plate 51. While the printing ink is supplied on the engraved plate 51, the squeeze 52 may be moved while pressing the engraved plate 51 and may push the printing ink inside the engraved plate 51 into the first through-holes 21.

And the squeeze 52 may be formed of a rubber material having elasticity, may press the engraved plate 51 when being moved in a contact state with a surface of the engraved plate 51 and may reciprocate in a pressing state.

Also, an end of the squeeze 52, e.g., a lower end thereof which is in direct contact with the meshes 55 of the engraved plate 51 may be formed to be rounded. Therefore, a pressing force applied to the printing ink in the screen printing is further increased than that in a general printing, and the first through-holes 21 may be effectively filled with the printing ink.

In some implementations, in the case of the squeeze 52 used in the general screen printing, the end thereof is formed in a flat shape. However, a rounded portion 53 is formed at the end of the squeeze 52, and a more amount of printing ink on the engraved plate 51 may pass through the meshes 55 of the engraved plate 51 and may fill the first through-hole 21.

A support member 54 may be further provided at the squeeze 52. The support member 54 may be provided at one surface of the squeeze 52 and may extend in a lengthwise direction of the squeeze 52. The support member 54 may be formed of a material having a high strength such as steel to ensure a uniform printing thickness and to prevent a degradation of reproducibility even when the squeeze 52 formed of an elastic material is repeatedly moved in a deformed state due to a high pressure. And the support member 54 is formed not to protrude further than the rounded portion 53 of the end of the squeeze 52 and thus does not interfere with a pressing action of the rounded portion 53 with respect to the printing ink.

Therefore, even when the squeeze 52 is moved in a state in which the pressure is applied thereto, the entire squeeze 52 may be prevented from being bent. In some implementations, the support member 54 may be inserted into the squeeze 52, may be formed of other materials rather than a steel plate and may also be formed in other shapes.

After the forming of the hole-filling member 22 is completed, an additional printed layer may be further formed on a surface of the hole-filling member 22. The additional printed layer may be printed in a black color, may be formed along a border of a unit portion of each of the seven segments formed by the collection of the first through-holes 21 and may prevent the light from leaking to an outside of the first through-hole 21. And the printed layer may be formed by a series of screen-printing processes [a screen-printing operation, S230].

When the printing of the hole-filling member 22 is completed, a drying process is performed at a temperature of 100 to 120° C. for 15 minutes. In the drying process, the bubbles may be removed, and the hole-filling member 22 may be stabilized [a heat-drying operation, S240].

After the heat-drying operation is completed, the anti-fingerprint coating layer 26 may be further formed at the front surface of the front panel 20. In general, the anti-fingerprint coating layer 26 may be formed by a resin coating which prevents a fingerprint and a contaminant from being attached to the metallic surface and allows the fingerprint and the contaminant to be removed. In some implementations, the anti-fingerprint coating layer 26 may be omitted, or may be formed before the forming of the hole-filling member 22.

Then, the front panel 20 is machined to form the exterior of the refrigerator door 10. For example, both of the left and right ends thereof may be bent by a sheet metal working. In some implementations, the machining of the front panel 20 may be performed before the etching operation of the first through-holes 21 or the forming of the hole-filling member 22 by the screen printing.

After the machining of the front panel 20 is completed, the display cover 200 is attached to the front panel 20. In this state, the adhesive member 25 is attached to the display cover 200 and a front surface of a housing cover 510, and the display cover 200 and the touch sensor assembly 500 are simultaneously attached to the rear surface of the front panel 20 using the adhesive member 25.

Before the display cover 200 is attached, the diffusion sheet 250 may be disposed at the area of the displaying part 11 formed at the rear surface of the front panel 20. The diffusion sheet 250 is located between the first through-holes 21 and the second through-holes 220 to diffuse the light emitted from the LED 313, thereby realizing uniform brightness.

When the display cover 200 is completely attached to the front panel 20, the frame 100 may be fixed to and installed at the front panel 20 to accommodate the display cover 200. And the entire exterior of the refrigerator door 10 is formed by assembling the door liner 30 and the decoration member 40. In this state, the foam solution is injected into the refrigerator door 10, and the insulator 24 is formed. The insulator 24 is filled into the entire internal space of the refrigerator door 10 except an internal area of the frame 100 and stably fixes the frame 100.

The touch sensor assembly 500 which is completely assembled is seated in the accommodation portion 210 of the display cover 200. The touch sensor assembly 500 may be maintained in a fixed state to the display cover 200 by coupling a housing coupling portion 511 to the accommodation portion 210.

In a state in which the assembling of the exterior of the refrigerator door 10 and the forming of the insulator 24 are completed, the touch sensor assembly 500 is installed at the frame display 400.

In a state in which the touch sensor assembly 500 is installed at the frame display 400, an operator connects the first cable connector 610 which is connected to the sensor PCB 700 with the second cable connector 620 which is connected to the sensor controller 330 mounted on the display PCB 310.

Since the first cable connector 610 and the second cable connector 620 are connected after the forming of the insulator 24 is completed, the sensor controller 330 may be prevented from being damaged by the static electricity generated upon the filling of the foam solution and the forming of the insulator 24.

After the first cable connector 610 and the second cable connector 620 are connected to each other, the frame display 400 is inserted through the insertion hole 41. The frame display 400 may be completely inserted into the display cover 200 using the frame handle 420.

When the frame display 400 is completely inserted, the display assembly 300 may be in complete contact with the rear surface of the display cover 200, and all of the first through-holes 21, the second through-holes 220 and the third through-holes 321 may be, in turn, aligned and in communication with each other.

After the inserting of the frame display 400 is completed, the insertion hole 41 is closed by installing the insertion hole cover 42 at the insertion hole 41, and then an upper end of the frame handle 420 is fixed, and thus the refrigerator door 10 is completely manufactured.

The exterior member may have various other implementations rather than the above-described implementation.

Hereinafter, an exterior member will be described, and the same elements as those in the above-described implementation will be designated by the same reference numerals.

Figure 17:
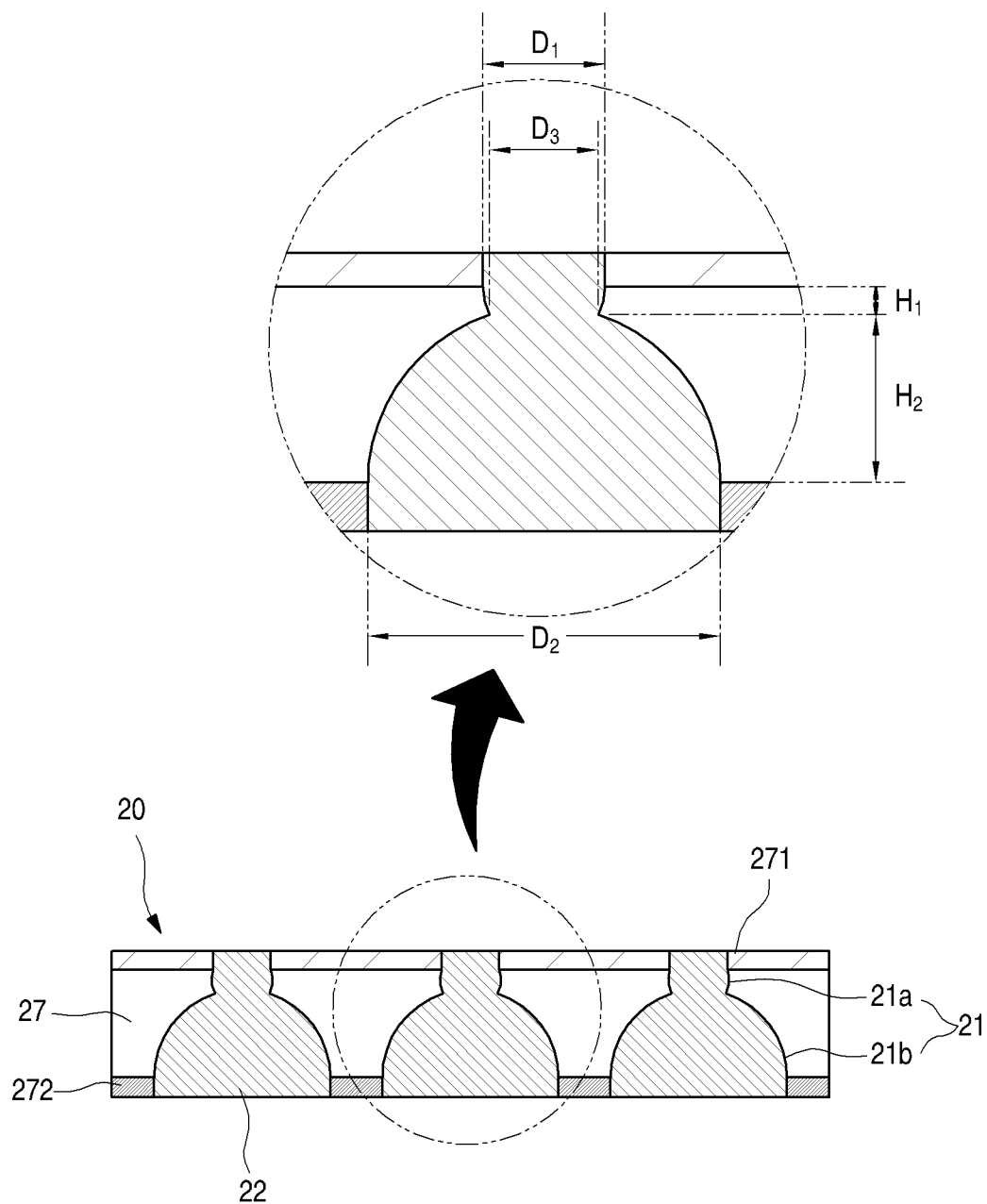
FIG. 17 is a cross-sectional view taken along line 4-4' of FIG. 3.

FIG. 17 is a cross-sectional view taken along line 4-4' of FIG. 3.

As illustrated in the drawing, each of the first through-holes 21 may be configured by the front surface groove 21*a* etched on the front surface and the rear surface groove 21*b* etched on the rear surface. The first through-holes 21 may be formed by that the front surface groove 21*a* and the rear surface groove 21*b* are in contact and communication with each other. In some implementations, the front surface groove 21*a* and the rear surface groove 21*b* may be matched one-to-one with each other, may be in communication with each other in the hole-to-hole method and may form each of the first through-holes 21.

The opening diameter D1 of the front surface groove 21*a* may be formed in a preset size, and the opening diameter D2 of the rear surface groove 21*b* may be formed much larger than the opening diameter D1 of the front surface groove 21a. And the diameter D3 of the portion at which the front surface groove 21a and the rear surface groove 21b are in contact and communication with each other by the etching may be formed smaller than the opening diameter D1 of the front surface groove 21a. And the depth H1 of the front surface groove 21a is remarkably smaller than the depth H2 of the rear surface groove 21b.

A rear surface coating layer 272 is formed at the rear surface of the front panel 20, and the hole-filling member 22 is formed in each of the first through-holes 21.

Figure 18:
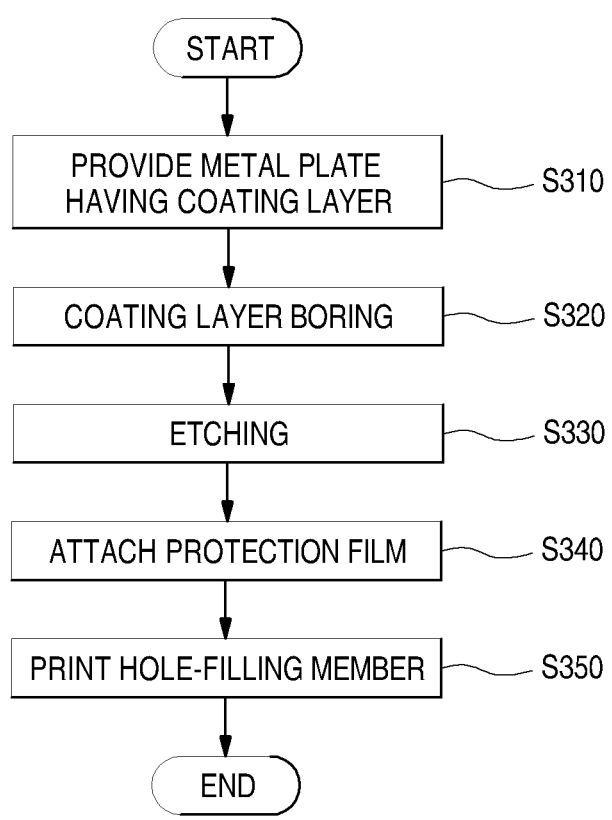
FIG. 18 is a flowchart of an example method of forming a first through-hole at a metal plate in which a coating layer is formed at both surfaces of a metal plate using an etching process.
Figure 19:
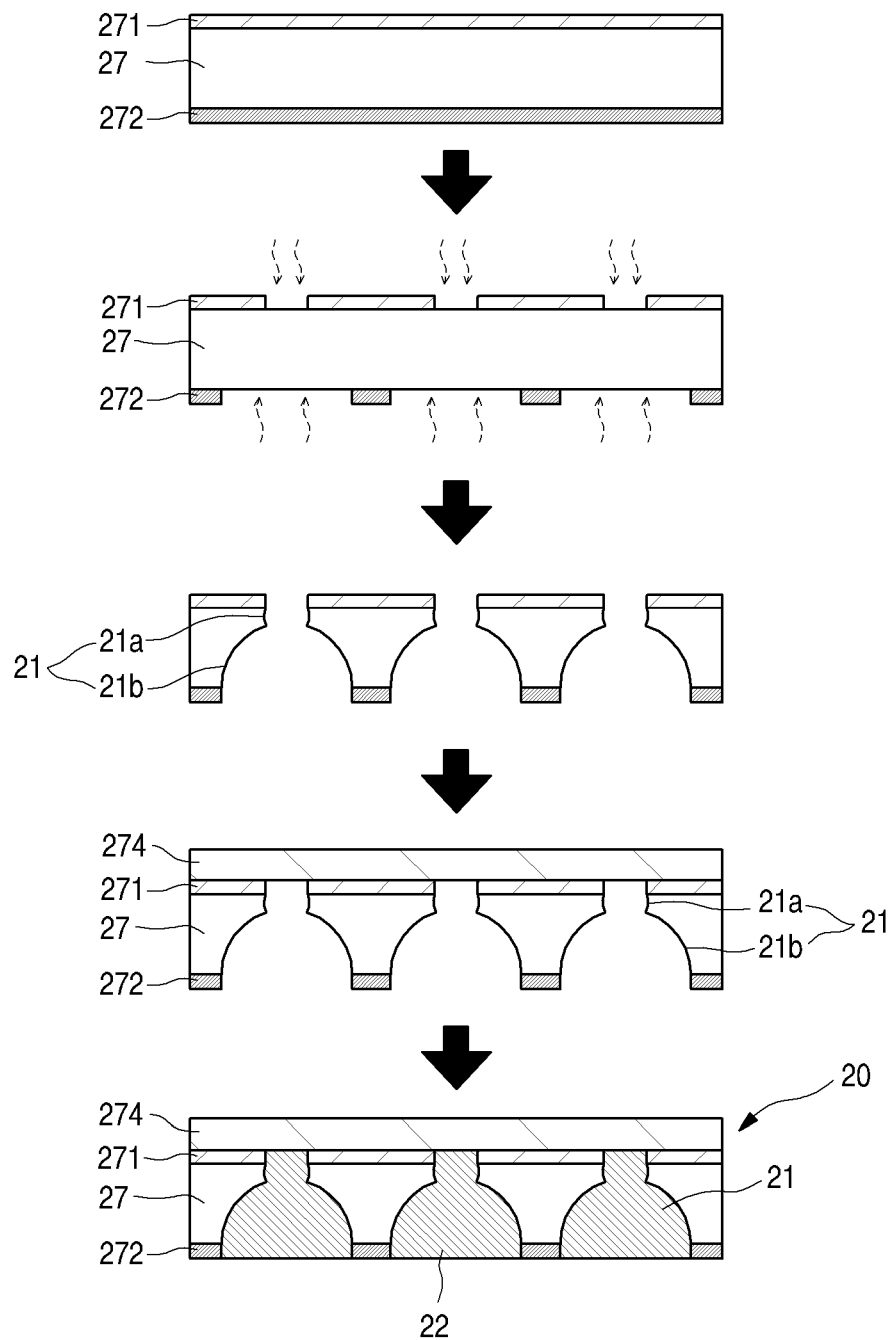
FIG. 19 is a schematic of an example forming process of a first through-hole by an order of FIG. 18.

FIG. 18 illustrates an example method of forming a first through-hole at a metal plate in which a coating layer is formed at both surfaces of a coating layer using an etching process. FIG. 19 illustrates an example forming process of the first through-hole by an order of FIG. 18.

A forming process of the first through-holes will be described sequentially with reference to the drawings. To form the exterior member, e.g., the front panel 20, first, the stainless steel plate 27 used as the material of the front panel 20 is cut and stored in a proper length.

The stainless steel plate 27 may be stored while coating layers 271 and 272 are formed at the front surface and the rear surface thereof, respectively. The coating layers 271 and 272 are formed of a component which does not react with the etching solution and prevents the stainless steel plate 27 from being corroded by the etching solution when the etching process for forming the first through-holes 21 is performed.

The front surface of the stainless steel plate 27 corresponds to the front surface of the front panel 20 which is exposed to the outside, and the front surface coating layer 271 may be an anti-fingerprint coating layer for preventing generation of a fingerprint or stain or a color coating layer for enhancing a sense of external beauty. In some implementations, the front surface coating layer 271 may also be formed by stacking the anti-fingerprint coating layer and the color coating layer, or may be an anti-fingerprint coating layer having a color. And the front surface coating layer 271 may be formed of an acrylic resin or a polyester resin not to react with the etching solution.

The rear surface of the stainless steel plate 27 corresponds to the rear surface of the front panel 20 which is not exposed to the outside and may be exposed to a pipe in which water flows and various electronic members accommodated between the decoration members 40 and 43. Therefore, the rear surface coating layer 272 is formed of an epoxy resin and may have a property which does not react with the etching solution and has high resistance against water, heat or the like.

As a thickness of each of the coating layers 271 and 272 is increased, adhesion thereof is degraded, and interference may occur when the front panel 20 and the decoration members 40 and 43 are assembled, and thus a problem may be raised in assemblability. However, as the thickness is reduced, an effect of protecting the stainless steel plate 27 from the etching solution is lowered. Therefore, each of the coating layers 271 and 272 may be formed to have a thickness of 5 µm or more, in some implementations, 5 µm or more and 10 µm or less so that the thickness is formed as thin as possible and a corrosion of the stainless steel plate 27 due to the etching solution is effectively prevented. In some implementations, since the rear surface coating layer 272 is not exposed to the outside, the rear surface coating layer 272 may be formed to have a thickness less than 5 µm to save a process cost and also to reduce a process time [a metal plate injecting operation, S310].

The stainless steel plate 27 on which the coating layers 271 and 272 are formed is moved to a coating layer boring operation. The coating layer boring operation is an operation which removes the coating layer of a portion, at which the first through-hole 21 is formed, before an etching operation. In some implementations, the coating layer of a portion corresponding to the front surface groove 21a and the rear surface groove 21b is removed from the front surface coating layer 271 and the rear surface coating layer 272, and holes are formed at the coating layers 271 and 272. Accordingly, in the stainless steel plate 27, the portions at which the first through-holes 21 are formed are not protected by the coating layers 271 and 272 but are exposed.

In the coating layer boring operation, the holes in the coating layers 271 and 272 may be formed using a laser, and a marking laser may be used. In some implementations, the laser is radiated with a relative low output of 10 to 20 w to prevent a damage of the surface of the stainless steel plate 27 and also to effectively remove only the portions of the coating layers 271 and 272 corresponding to the first through-holes 21.

The boring of the coating layers 271 and 272 may be simultaneously performed by the laser which is simultaneously radiated to the front surface and the rear surface of the stainless steel plate 27. In some implementations, by the laser radiated to one of the front surface and the rear surface of the stainless steel plate 27, the holes may be formed at one surface, and the stainless steel plate 27 is turned, and then the holes may be also formed at the other surface.

To form each of the front surface groove 21a and the rear surface groove 21b having a predetermined size, an inner diameter of the hole formed in the front surface coating layer 271 may be formed in a size corresponding to an inner diameter of the front surface groove 21a, and an inner diameter of the hole formed in the rear surface coating layer 272 may be formed in a size corresponding to an inner diameter of the rear surface groove 21b.

And to form the first through-holes 21 at exact positions to have a constant size, the front surface groove 21a and the rear surface groove 21b have to be formed at exact positions of the front surface and the rear surface of the stainless steel plate 27 corresponding to each other. In some implementations, the front surface groove 21a and the rear surface groove 21b have to be formed such that centers thereof are arranged on the same extension line. To this end, the holes formed at the front surface coating layer 271 and the rear surface coating layer 272 may be formed at the exact positions corresponding to each other so that centers thereof are arranged on the same extension line.

In order for the holes formed at the front surface coating layer 271 and the rear surface coating layer 272 to be formed at the exact positions corresponding to each other, the stainless steel plate 27 may be subjected to a laser processing process in a fixed state by a separate fixing member and may be prevented from being shaken, and laser processing positions may be aligned. The fixing member for fixing the stainless steel plate 27 may be a metal plate fixing member 800 (in FIG. 13). The metal plate fixing member 800 will be described in detail in description referring to FIG. 13 [a coating layer boring operation, S 320].

After the coating layer boring operation, the stainless steel plate 27 in which a part of the coating layers 271 and 272 is removed is moved to an etching operation. In the etching operation, portions corresponding to the front surface groove 21a and the rear surface groove 21b from which the coating layers 271 and 272 are removed are corroded by the etching solution. The ferric chloride ($FeCl_2$) may be used as the etching solution, and the etching process may be simultaneously performed at the front surface and the rear surface of the stainless steel plate 27. In some implementations, the etching process may be performed twice so that the front surface groove 21a is first processed by the etching and then the rear surface groove 21b is processed by the etching.

The front surface groove 21a is a hole which is exposed to the front surface of the front panel 20 and machined to have a fine and uniform size. And the rear surface groove 21b is a portion which is formed at the rear surface of the front panel 20 and is not exposed to the outside, and may be etched to be in communication with the front surface groove 21a to form the first through-hole 21.

In some implementations, the front surface groove 21a may be etched in a depth relatively shallower than the rear surface groove 21b to satisfy an opening size of the fine and uniform first through-hole 21 which is exposed to the outside. And the rear surface groove 21b may be etched in a depth which is not exposed to the outside but is in communication with the front surface groove 21a so that the light emitted from the LED 313 passes through the first through-holes 21.

In some implementations, as a size of the rear surface groove 21b is increased, the depth of the rear surface groove 21b is increased, and a depth of the first through-hole 21 is also increased, and thus a thickness of the stainless steel plate 27 may be increased. In some implementations, in order to provide the thickness which satisfies a sufficient strength of the front panel 20, the rear surface groove 21b is formed to have an increased diameter and the rear surface groove 21b is formed to be deep. In some implementations, the rear surface groove 21b may be formed to have a size which is not in contact with or overlapped with adjacent rear surface grooves 21b.

And the diameter of the rear surface groove 21b may be increased to increase the thickness of the front panel 20, and an etching process time of the rear surface groove 21b may be longer than that of the front surface groove 21a to increase the depth of the rear surface groove 21b.

The diameters of the front surface groove 21a and the rear surface groove 21b may be determined by a diameter of the coating layer removed in the coating layer boring operation. In the coating layer boring operation, the coating layers 271 and 272 may be removed to correspond to the predetermined diameters of the front surface groove 21a and the rear surface groove 21b. Therefore, in order for the rear surface groove 21b to have the inner diameter larger than that of the front surface groove 21a, the coating layers 271 and 272 may be removed so that the inner diameter of the hole formed in the front surface coating layer 271 is larger than that of the hole formed in the rear surface coating layer 272 [an etching operation, S330].

When the etching process is completed, the protection film 274 may be attached to the stainless steel plate 27. And the protection film 274 may be provided to be bonded to the stainless steel plate 27 by an adhesive and to be removed from the stainless steel plate 27 [a protection film attaching operation, S340].

After the protection film attaching operation, a hole-filling printing is performed through a non-shielded rear surface of the first through-hole 21 corresponding to the rear surface of the stainless steel plate 27. In some implementations, since a front surface of the first through-hole 21 is shielded by the protection film 274, the hole-filling member 22 may not leak through the front surface of the first through-hole 21 but may fill the first through-hole 21. Therefore, the first through-hole 21 is filled with the hole-filling member 22 and completely shielded, and thus the foreign substance is prevented from being introduced therein [a hole-filling printing operation, S350].

When the hole-filling printing operation is completed, the stainless steel plate 27 is processed into the front panel 20 forming the exterior of the refrigerator door 10 through a process in which both of the left and right ends thereof is bent by the sheet metal working, or the like. In some implementations, the machining of the front panel 20 may be performed before the etching operation of the first through-holes 21 or the coating layer boring operation.

Figure 20:
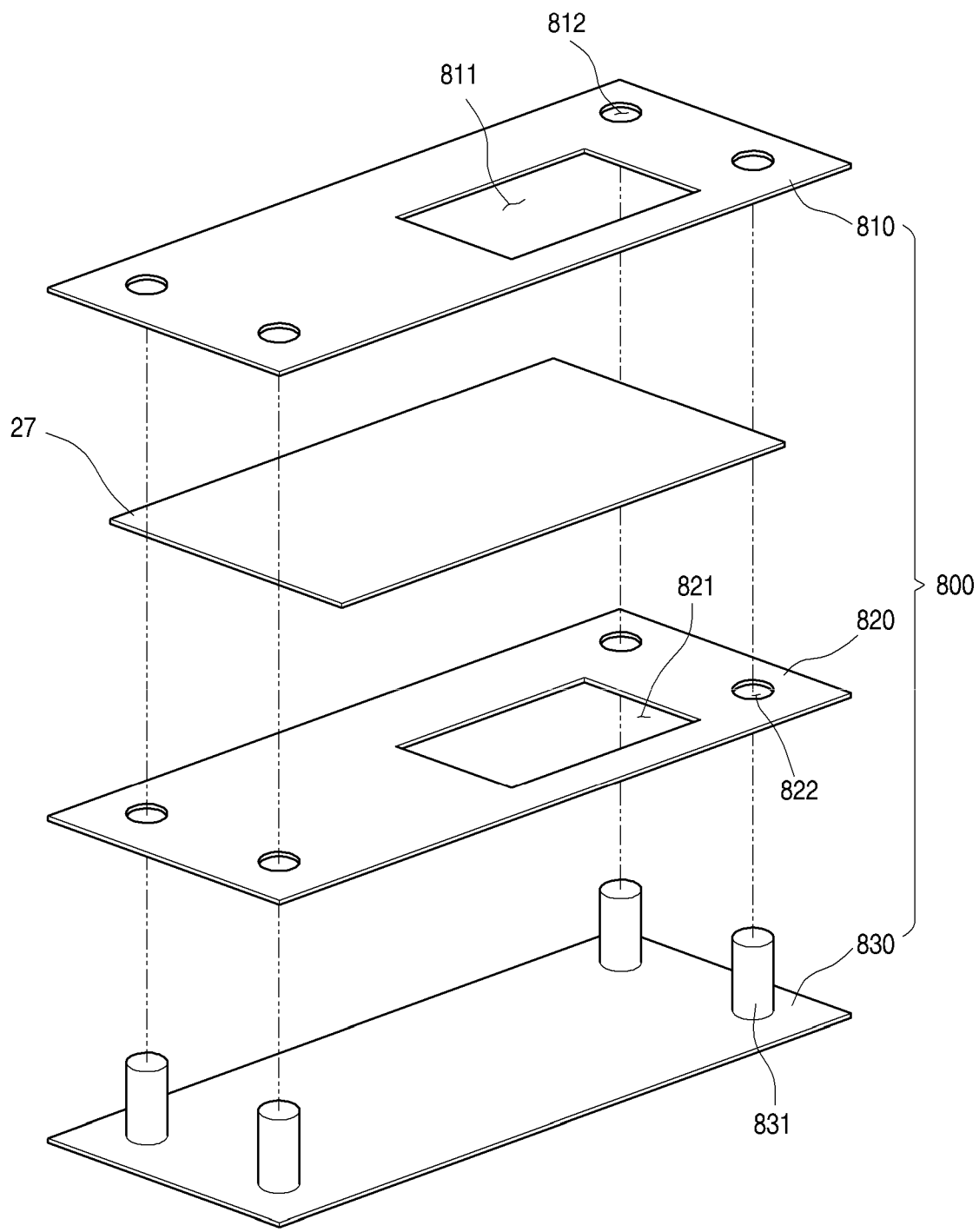
FIG. 20 is a view of an example metal plate fixing member for fixing a metal plate in a coating layer removing process of FIG. 18.

FIG. 20 illustrates an example metal plate fixing member for fixing a metal plate in a coating layer boring operation.

In order for the first through-hole 21 to be formed at an exact position of the stainless steel plate 27 to have an exact size, the coating layer has to be removed in the exact size from the exact position in the coating layer boring operation. Therefore, the stainless steel plate 27 has to be provided in a state of being located at an exact processing position before the coating layer is removed and also to be prevented from being shaken while the coating layers 271 and 272 are removed. To this end, in the coating layer boring operation, the stainless steel plate 27 may be provided in the fixed state by the metal plate fixing member 800.

The metal plate fixing member 800 may include a first fixing jig 810 and a second fixing jig 820 which are in close contact with both surfaces of the stainless steel plate 27 to fix the stainless steel plate 27, and a guide jig 830 for fixing the first fixing jig 810 and the second fixing jig 820 which are in close contact with the stainless steel plate 27 and fix the stainless steel plate 27.

Each of the first fixing jig 810 and the second fixing jig 820 may be provided in a shape corresponding to the stainless steel plate 27, may be formed larger than the stainless steel plate 27 and may extend outward further than the stainless steel plate 27 while the stainless steel plate 27 is located at an approximately center.

And pin fixing holes 812 and 822 are formed at portions of the first fixing jig 810 and the second fixing jig 820 which extend outward further than the stainless steel plate 27, and guide pins 831 which protrude to pass through the pin fixing holes 812 and 822 and to be guided may be formed at positions of the guide jig 830 corresponding to the pin fixing holes 812 and 822.

The guide pins 831 and the pin fixing holes 812 and 822 may be formed to have sizes corresponding to each other, and a plurality of guide pins 831 and a plurality of pin fixing holes 812 and 822 may be formed to be spaced apart from each other. Therefore, when the guide pins 831 pass through the pin fixing holes 812 and 822, respectively, the first and second fixing jigs 810 and 820 may be firmly fixed to the guide jig 830. And the stainless steel plate 27 which is in close contact and fixed between the first and second fixing jigs 810 and 820 may also be firmly fixed, and the coating layers located at the exact positions may be removed by the laser.

The plurality of pin fixing holes 812 and 822 may be formed at corresponding positions of the first fixing jig 810 and the second fixing jig 820, respectively, and may also be formed to be spaced apart from each other. And the plurality of pin fixing holes 812 and 822 are formed at centers of the first and second fixing jigs 810 and 820 to be symmetric to each other, thereby effectively preventing the first and second fixing jigs 810 and 820 and the stainless steel plate 27 from being shaken.

Punched opening portions 811 and 821 may be formed at the first and second fixing jigs 810 and 820, respectively.

The opening portions 811 and 821 are formed at positions corresponding to positions, at which the first through-holes 21 are formed, while the stainless steel plate 27 is in close contact and fixed between the first and second fixing jigs 810 and 820. In some implementations, the portions of the stainless steel plate 27 from which the coating layers 271 and 272 are removed may be exposed to the outside through the opening portions 811 and 821, and thus the coating layers may be removed by the laser.

Figure 21:
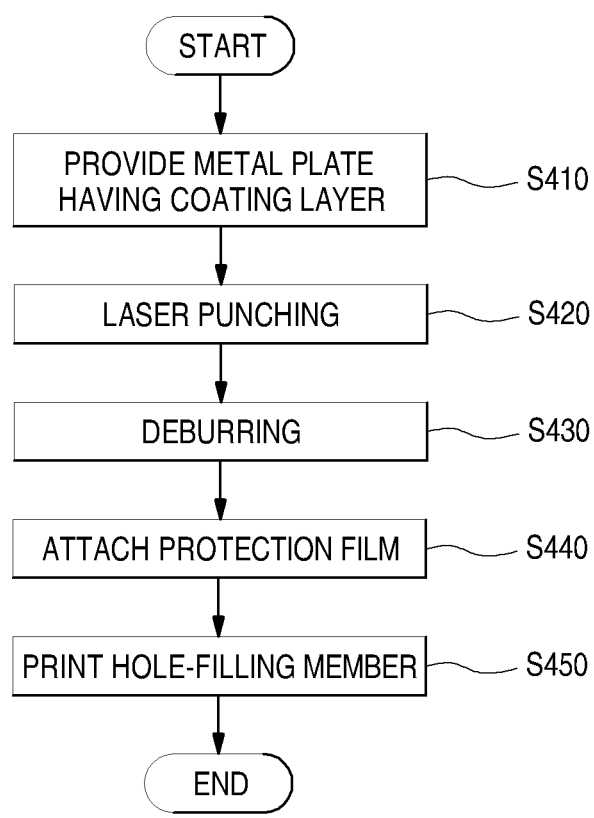
FIG. 21 is a flowchart of an example method of forming a first through-hole at a metal plate in which a coating layer is formed at both surfaces of a metal plate using a laser.
Figure 22:
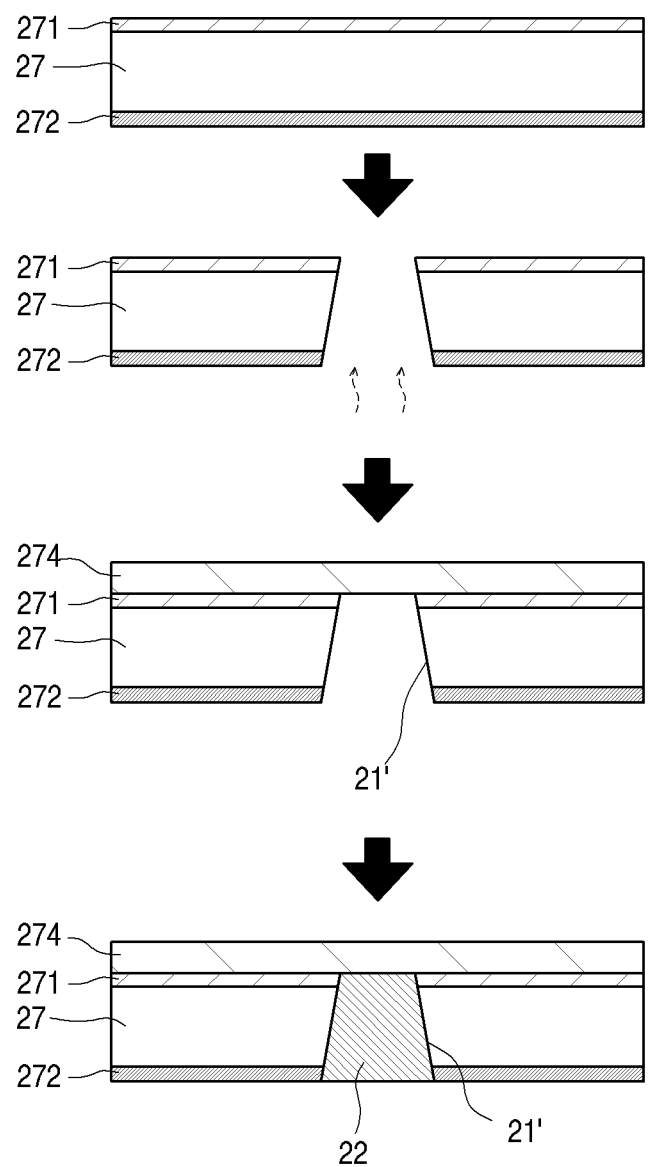
FIG. 22 is a schematic of an example forming process of the first through-hole by an order of FIG. 21.

FIG. 21 illustrates an example method of forming a first through-hole at a metal plate in which a coating layer is formed at both surfaces of a coating layer using laser. FIG. 22 illustrates an example forming process of the first through-hole.

A forming process of the first through-hole will be described sequentially with reference to the drawings. To form the exterior member, e.g., the front panel 20, first, the stainless steel plate 27 used as the material of the front panel 20 is cut and stored in a proper length.

The stainless steel plate 27 may be stored while coating layers 271 and 272 are formed at a front surface and a rear surface thereof, respectively.

The front surface of the stainless steel plate 27 corresponds to the front surface of the front panel 20 which is exposed to the outside, and the front surface coating layer 271 may be an anti-fingerprint coating layer for preventing generation of a fingerprint or stain or a color coating layer for enhancing a sense of external beauty. In some implementations, the front surface coating layer 271 may also be formed by stacking the anti-fingerprint coating layer and the color coating layer, or may be an anti-fingerprint coating layer having a color. And the front surface coating layer 271 may be formed of an acrylic resin or a polyester resin not to react with the etching solution.

The rear surface of the stainless steel plate 27 corresponds to the rear surface of the front panel 20 which is not exposed to the outside and may be exposed to a pipe in which water flows and various electronic members accommodated between the decoration members 40 and 43. Therefore, the rear surface coating layer 272 is formed of an epoxy resin and may have a property which has high resistance against water, heat or the like.

As a thickness of each of the coating layers 271 and 272 is increased, adhesion thereof is degraded, and interference may occur when the front panel 20 and the decoration members 40 and 43 are assembled, and thus a problem may be raised in assemblability. However, as the thickness is reduced, an effect of protecting the stainless steel plate 27 is lowered. Therefore, each of the coating layers 271 and 272 may be formed to have a thickness of 5 μm or more so that the thickness is formed as thin as possible and the stainless steel plate 27 is effectively protected. In some implementations, since the rear surface coating layer 272 is not exposed to the outside, the rear surface coating layer 272 may be formed to have a thickness less than 5 μm to save a process cost and also to reduce a process time [a metal plate injecting operation, S410].

The stainless steel plate 27 on which the coating layers 271 and 272 are formed may be moved to a laser punching operation. In the laser punching operation, the coating layers 271 and 272 and the stainless steel plate 27 are punched at a time using the laser, and thus holes of the coating layers 271 and 272 and a laser through-hole 21' are formed.

The laser through-hole 21' performs the same function as that of the first through-hole 21, e.g., the first through-hole 21 formed by the laser processing.

When the holes of the coating layers 271 and 272 and the laser through-hole 21' are formed at a time using the laser, an output of the laser may be provided to be higher than or the same as that of the laser when only the holes of the coating layers 271 and 272 are formed. In some implementations, when the laser processing is performed at the same level, the laser through-hole 21' may be formed in the stainless steel plate 27 formed of the metallic material by increasing a laser processing time.

And in the laser punching operation, the laser may be emitted to the rear surface of the stainless steel plate 27, and the punching may be performed from the rear surface of the stainless steel plate 27. Therefore, a damage of the front surface coating layer 271 which is exposed to the outside may be relatively smaller than that of the rear surface coating layer 272.

By emitting the laser to the rear surface of the stainless steel plate 27, an inner diameter of a front surface of the laser through-hole 21' may be formed smaller than that of a rear surface thereof. In some implementations, the laser through-hole 21' formed by the laser punching may be formed to be inclined, such that an inner circumferential surface thereof becomes narrower toward the front surface thereof. Therefore, the light emitted from the display assembly 300 may be concentrated by the laser through-hole 21' having the inclined inner circumferential surface and may look brighter when being seen from the outside, and visibility may be enhanced [a laser punching operation, S420].

The stainless steel plate 27 in which the laser punching is completed may be moved to a deburring operation. In the deburring operation, the inner circumferential surface of the laser through-hole 21' formed by the laser punching and an oxide film and burrs formed on the surface of the stainless steel plate 27 are removed. [a deburring operation, S430].

When the deburring operation is completed, the protection film 274 may be attached to the stainless steel plate 27. The protection film 274 serves to protect the surface of the stainless steel plate 27 in which the laser through-hole 21' is formed and may be attached to the entire surfaces of the stainless steel plate 27 to prevent a damage such as a scratch while the stainless steel plate 27 is moved. In some implementations, the front surface of the laser through-hole 21' may be shielded by the protection film 274.

And the protection film 274 may be provided to be bonded to the stainless steel plate 27 by an adhesive and to be removed from the stainless steel plate 27 [a protection film attaching operation, S440].

After the protection film attaching operation, a hole-filling printing is performed through a non-shielded rear surface of the laser through-hole 21' corresponding to the rear surface of the stainless steel plate 27. In some implementations, since the front surface of the laser through-hole 21' is shielded by the protection film 274, the hole-filling member 22 may not leak through the front surface of the laser through-hole 21' but may fill the laser through-hole 21'. Therefore, the laser through-hole 21' is filled with the hole-filling member 22 and completely shielded, and thus the foreign substance is prevented from being introduced therein [a hole-filling printing operation, S450].

When the hole-filling printing operation is completed, the stainless steel plate 27 is processed into the front panel 20 forming the exterior of the refrigerator door 10 through a process in which both of the left and right ends thereof is bent by the sheet metal working, or the like. In some implementations, the machining of the front panel 20 may be performed before the boring operation of the laser through-hole 21'.

The exterior member may have various other implementations rather than the above-described implementation.

Hereinafter, an example exterior member according will be described, and the same elements as those in the above-described implementation will be designated by the same reference numerals.

Figure 23:
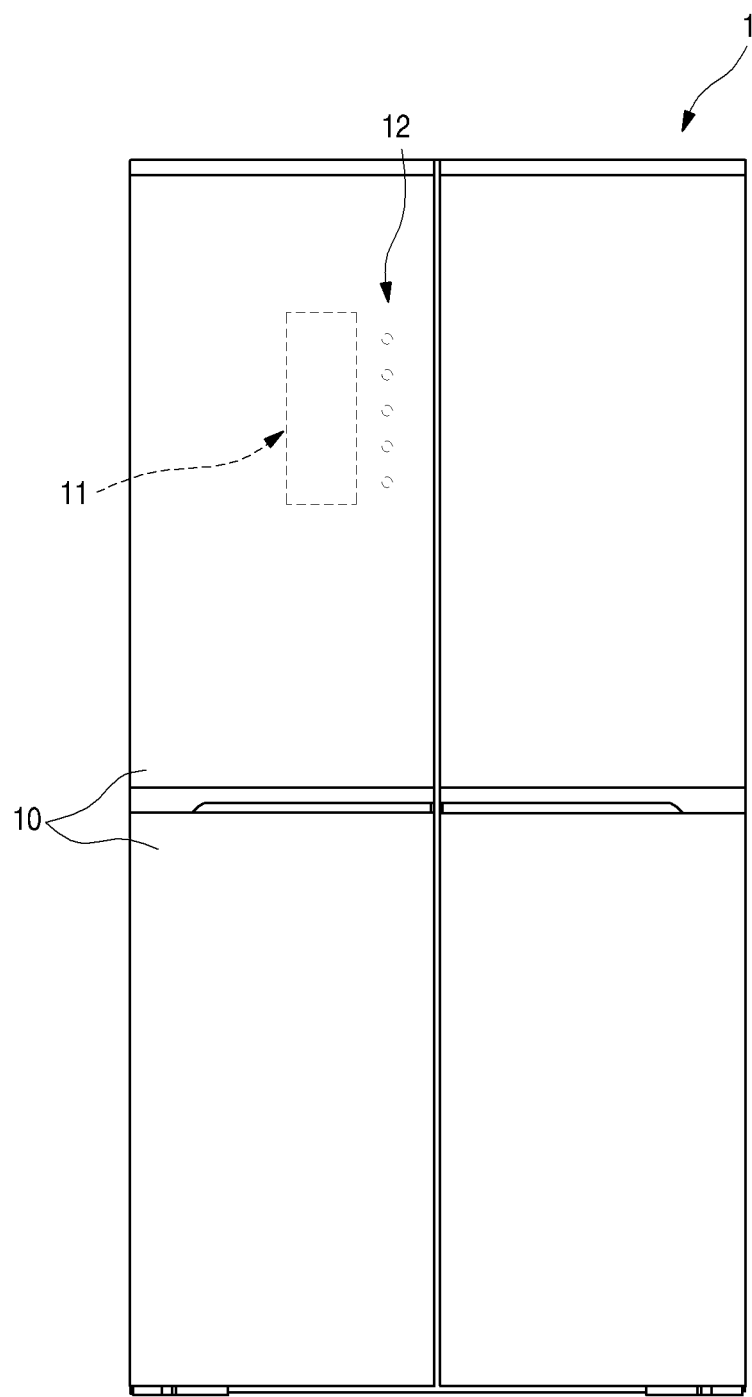
FIG. 23 is a front view of an example refrigerator.

FIG. 23 illustrates an example refrigerator.

As illustrated in the drawing, an exterior of a refrigerator 1 may be formed by the refrigerator door 10. And the displaying part 11 and the touch operation part 12 are provided at the refrigerator door 10.

And when the light is not emitted from an inside of the refrigerator door 10, the displaying part 11 is not indicated to the outside as illustrated in the drawing. And when the light is not emitted from the inside of the refrigerator door 10, the exterior looks as if an element like the displaying part 11 for displaying information is not provided at the refrigerator door 10.

In some implementations, while the LED 313 is not turned on, the first through-holes 21 are shielded by a color layer 235 forming a surface of a colored steel plate, and thus are not exposed to the outside. The user may not see the displaying part 11 and the first through-holes 21 forming the displaying part 11 through the refrigerator door 10. However, when at least a part of the LEDs 313 is turned on, the information may be transmitted to the user in the form of the character, the figure or the like.

Figure 24:
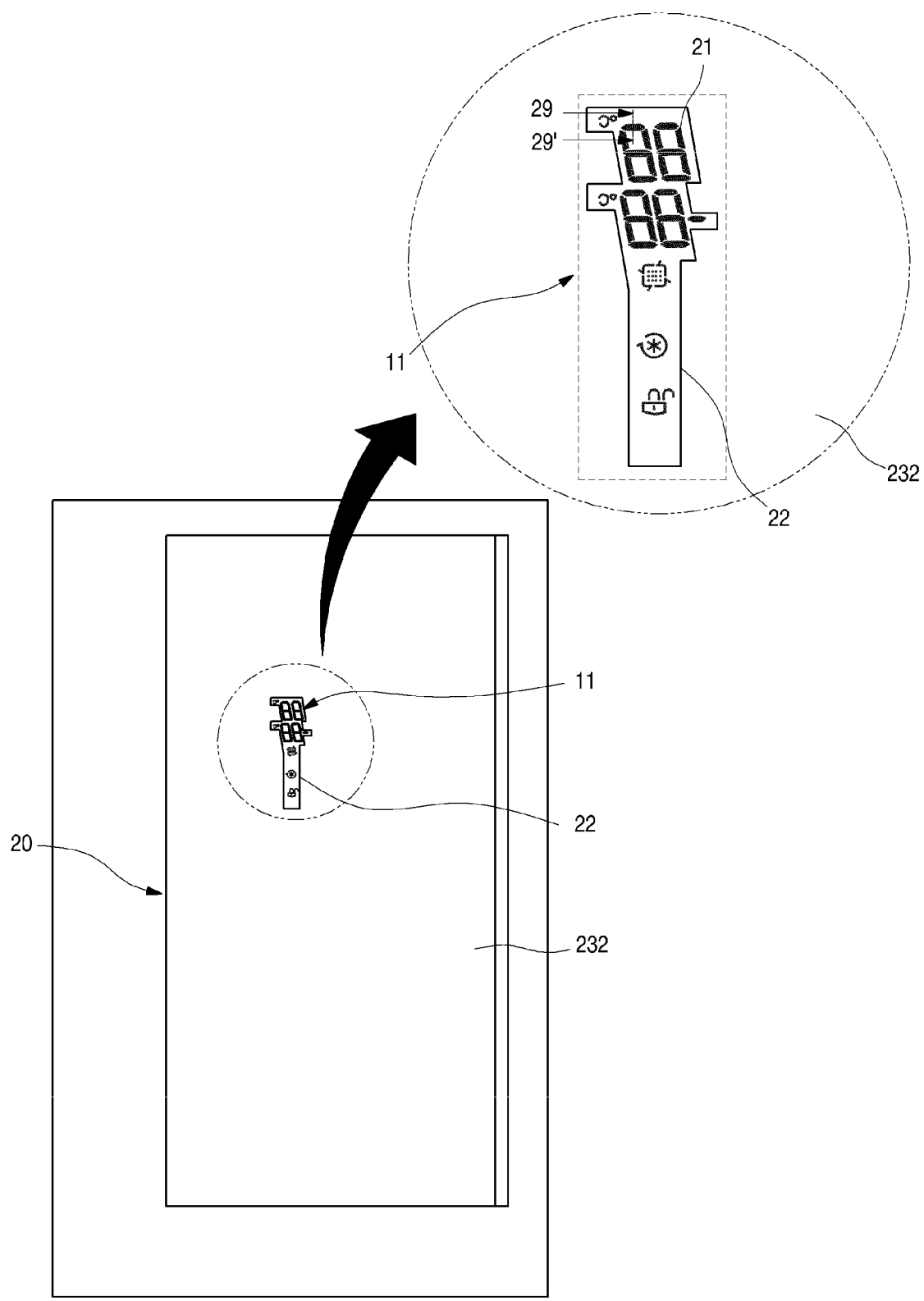
FIG. 24 is a rear view of an example refrigerator door.
Figure 25:
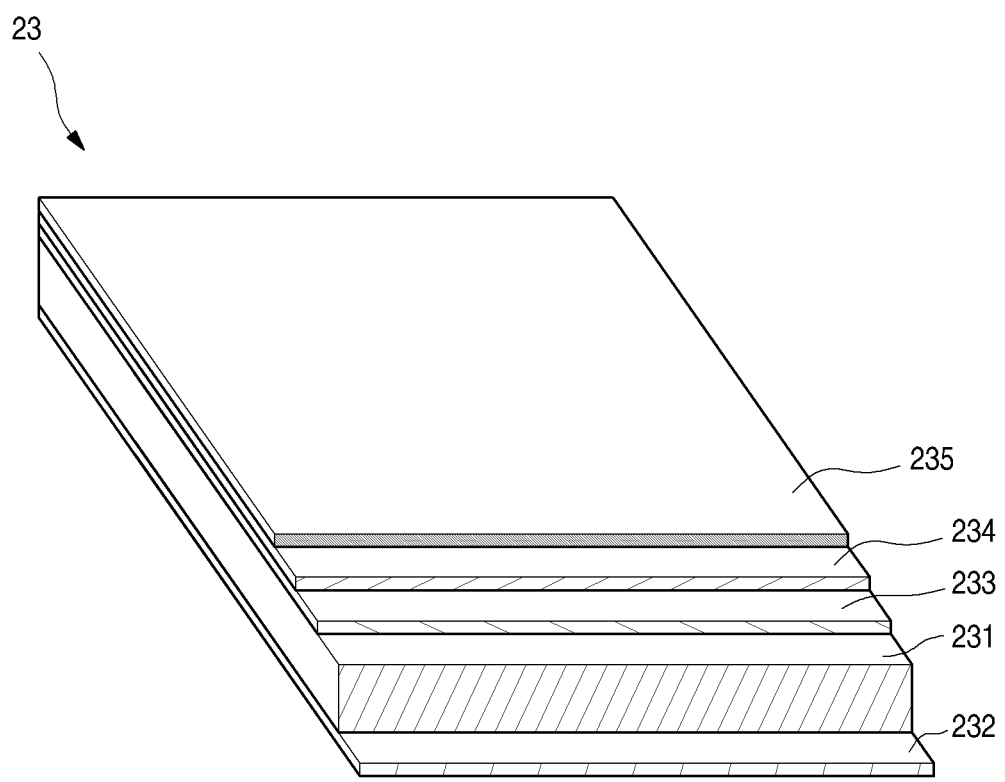
FIGS. 25 and 28 are cut-away perspective views of example colored steel plates forming front panels of refrigerator doors.

FIG. 24 illustrates an example refrigerator door. FIG. 25 illustrates an example colored steel plate forming a front panel of a refrigerator door.

As illustrated in the drawings, the plurality of first through-holes 21 may be formed at the area of the displaying part 11 of the front panel 20. The plurality of first through-holes 21 may be formed to pass through the remaining portions of the colored steel plate forming the front panel 20 except the color layer 235.

When the refrigerator door 10 is seen while the LED 313 of the display assembly 300 is not turned on, the first through-holes 21 are shielded by the color layer 235 and are not visible to the outside. Therefore, the user may recognize as if the entire front surface of the refrigerator door 10 is formed of only a smooth stainless plate without other configurations like a display.

And the plurality of the first through-holes 21 may be arranged to transmit the information in the form of the specific character or symbol when the LED 313 is turned on and may form the displaying part 11. An entire shape of the displaying part 11 may be changed depending on the LED 313 which is turned on. Therefore, the displaying part 11 may be defined as an entire area in which the plurality of first through-holes 21 are arranged.

The hole-filling member 22 is formed at the rear surface of the front panel 20. The hole-filling member 22 may be formed at a portion of the rear surface of the front panel 20, at which the displaying part 11 is formed, in the printing method.

In some implementations, not only all of the plurality of first through-holes 21 but also a part of the rear surface of the front panel 20 corresponding to the area of the displaying part 11 may be covered by the hole-filling member 22 formed at the rear surface of the front panel 20 by the screen-printing method.

The front panel 20 may be formed by the colored steel plate, and one of a vinyl-coated material (VCM) steel plate 23 and a pre-coated material (PCM) steel plate 23' having the color layer 235 through which the light is transmitted may be used as the colored steel plate.

For example, the colored steel plate forming the front panel 20 may be formed of the VCM steel plate 23. As illustrated in FIG. 23, the VCM steel plate 23 may include a base metal layer 231 which is formed of galvanized iron (GI) or electronic galvanized iron (EGI), a preprocessed layer 233 and a primer layer 234 which are processed by a chemical washing or coating and formed in turn on the base metal layer 231, and the color layer 235 which expresses a color and a texture and is formed thereon. And a back coating layer 232 processed to prevent a corrosion of a rear surface of the VCM steel plate 23 which is exposed backward may be formed at a lower surface of the base metal layer 231.

The color layer 235 which forms an uppermost surface of the VCM steel plate 23 may have a film-like structure and may form the exterior of the front surface of the front panel 20. And the back coating layer 232 forms the rear surface of the front panel 20 and may be in contact with the insulator 24 filling the inside of the refrigerator door 10.

To form the first through-holes 21 in the front panel 20, a part of the back coating layer 232 formed at the lower surface of the VCM steel plate 23 is stripped, and then the etching is performed. In some implementations, the first through-holes 21 are formed in the base metal layer 231 exposed by stripping the back coating layer 232 of the VCM steel plate 23.

And after the first through-holes 21 are completely formed, the hole-filling member 22 formed of a material through which the light is transmitted may fill the first through-holes 21. The hole-filling member 22 may prevent a corrosion of an inner surface of the first through-hole and may support the color layer 235 which shields an opening of the first through-hole 21. The hole-filling member 22 may fill the first through-hole 21 and may also cover a portion of the rear surface of the base metal layer 231 from which the back coating layer 232 is stripped to perform the etching, and thus a state as illustrated in FIG. 3 may be formed.

The hole-filling member 22 may be formed in a printing method which will be described below and, in some implementations, may be in various types by coating or attaching the material through which the light is transmitted.

The exterior of the front panel 20, e.g., the exterior of the front surface of the refrigerator door 10 may be formed by the color layer 235. The color layer 235 may realize various colors and textures. The color layer 235 may have the film-like structure, may be formed in a PVC type or a PVC-free type according to a type of the VCM steel plate 23 and may be bonded to the base metal layer 231 on which a primer is coated.

Figure 26:
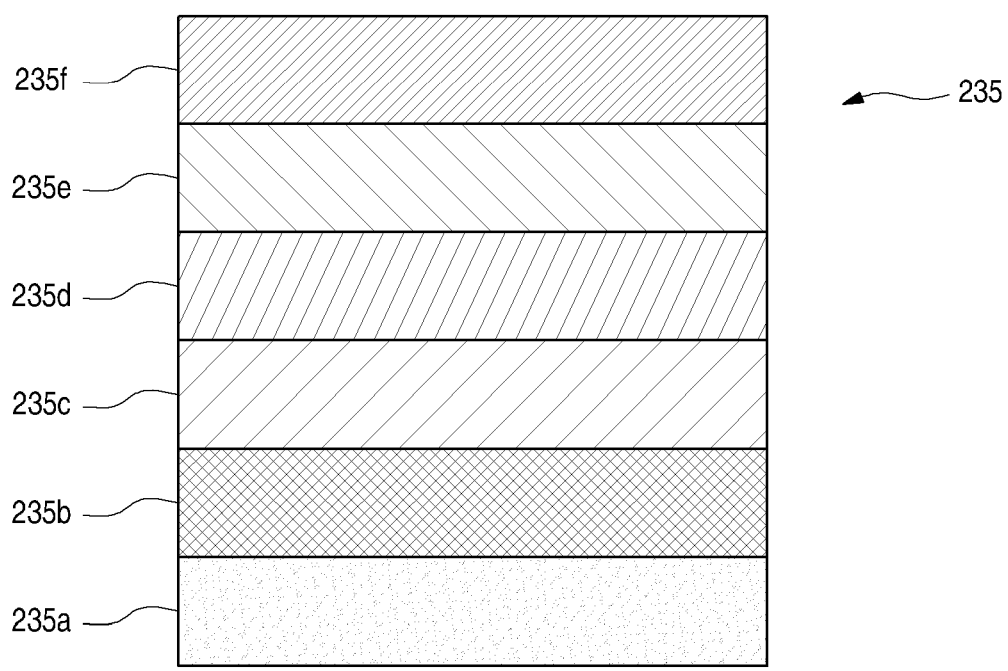
FIGS. 26 and 27 are cross-sectional views of color layers of example colored steel plates.

FIG. 26 illustrates an example color layer of a colored steel plate.

As illustrated in the drawing, the color layer 235 may be formed in the PVC-free type. To this end, in the color layer 235, a hot melt layer 235a is formed at a bottom surface thereof, and a film color layer 235b, a primer layer 235c, a deposition layer 235d, a primer layer 235e and a PET layer 235f may be arranged in turn.

The hot melt layer 235a is bonded to the primer layer 234 of the VCM steel plate 23 so that the color layer 235 is located at an upper portion of the base metal layer 231. And the film color layer 235b may determine a color of the color layer 235 and may have various colors including a transparent color. And the deposition layer 235d serves to allow the color layer 235 to have a certain texture, may be formed to have a metallic texture and may be located above the film color layer 235b. And the PET layer 235f is located at an uppermost surface of the color layer 235 to protect the color layer 235.

Figure 27:
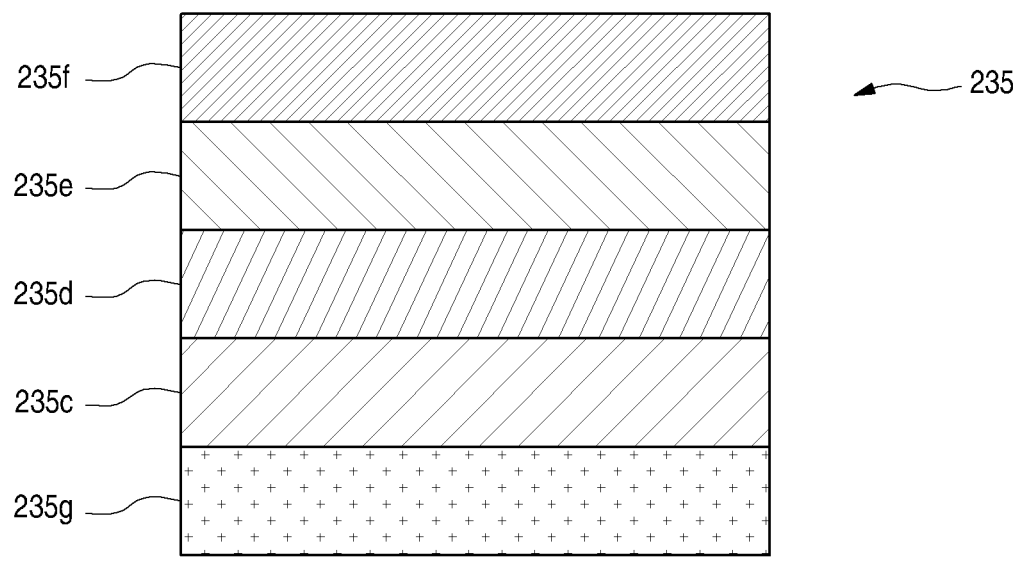

FIG. 27 illustrates an example color layer of a colored steel plate.

The color layer 235 may be formed in the PVC type. To this end, in the color layer 235, a PVC layer 235g having a color as illustrated in FIG. 6 is formed at a bottom surface thereof, and the primer layer 235c, the deposition layer 235d, the primer layer 235e and the PET layer 235f may be arranged in turn.

The PVC layer 235g may be bonded to the primer layer 234 located at the upper portion of the base metal layer 231. And the PVC layer 235g may determine a color of the color layer 235 and may have various colors including a transparent color. And the deposition layer 235d serves to allow the color layer 235 to have a certain texture, may be formed to have a metallic texture and may be located above the film color layer 235b. And the PET layer 235f is located at an uppermost surface of the color layer 235 to protect the color layer 235.

As described above, the color layer 235 of the VCM steel plate 23 may be applied to both of the PVC type and the PVC-free type and may be formed of a film material through which the light is transmitted.

The PCM steel plate 23' other than the VCM steel plate 23 may be used as the colored steel plate forming the front panel 20 of the refrigerator door 10.

Figure 28:
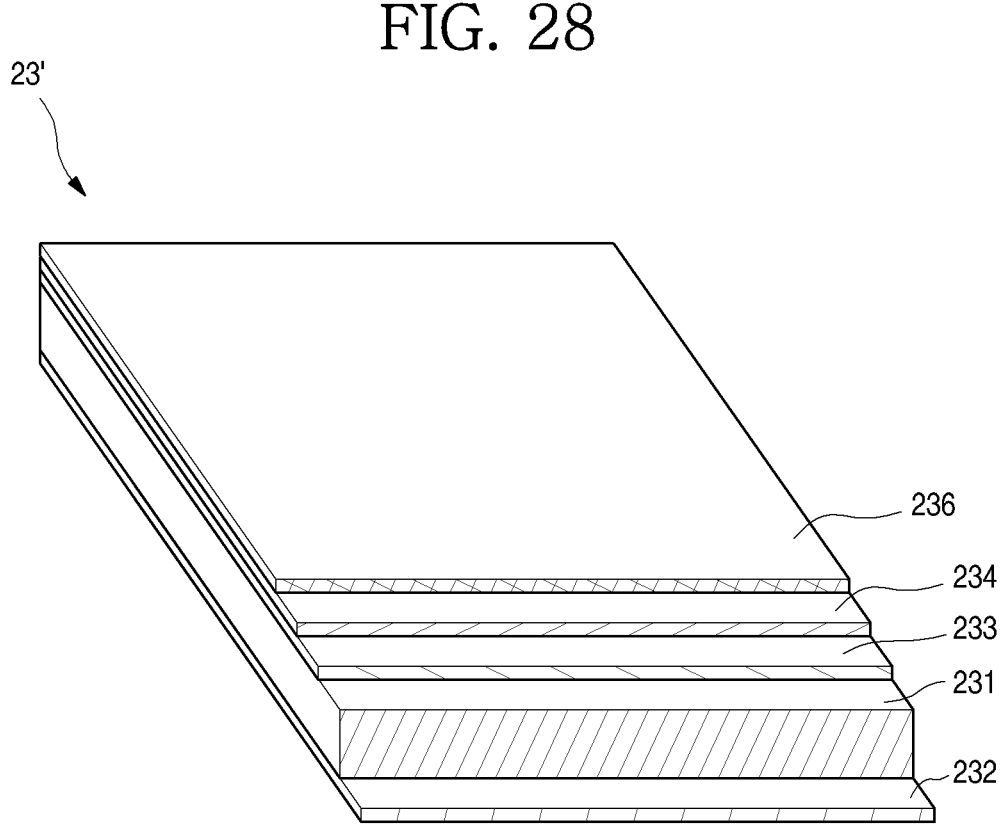

FIG. 28 illustrates an example colored steel plate forming a front panel of a refrigerator door.

As illustrated in the drawing, the PCM steel plate 23' may include the base metal layer 231 which is formed of galvanized iron (GI) or electronic galvanized iron (EGI), the preprocessed layer 233 and the primer layer 234 which are processed by a chemical washing or coating and formed in turn on the base metal layer 231, and a color layer 236 which expresses a color and a texture and is formed thereon. And the back coating layer 232 which is processed to prevent a corrosion of an exposed rear surface of the PCM steel plate 23' may be formed at a lower surface of the base metal layer 231.

In some implementations, the color layer 236 forming an uppermost surface of the PCM steel plate 23' may be formed by painting or coating a paint through which the light is transmitted and may form the exterior of the front surface of the front panel 20. And the back coating layer 232 forms the rear surface of the front panel 20 and may be in contact with the insulator 24 filling the inside of the refrigerator door 10.

The base metal layer 231, the back coating layer 232, the preprocessed layer 233 and the primer layer 234 except the color layer 236 have the same structure as those in the VCM steel plate 23 and thus are indicated by the same reference numerals.

To form the first through-holes 21 in the front panel 20, a part of the back coating layer 232 formed at a lower surface of the PCM steel plate 23' is stripped, and then the etching is performed. In some implementations, the first through-holes 21 are formed in the base metal layer 231 exposed by stripping the back coating layer 232 of the PCM steel plate 23' using the etching solution.

And after the first through-holes 21 are completely formed, the hole-filling member 22 formed of a material through which the light is transmitted may fill the first through-holes 21. In some implementations, the hole-filling member 22 may fill the first through-hole 21 and may also cover a portion of the base metal layer 231 from which the back coating layer 232 is stripped to perform the etching, and thus a state as illustrated in FIG. 3 may be formed.

Figure 29:
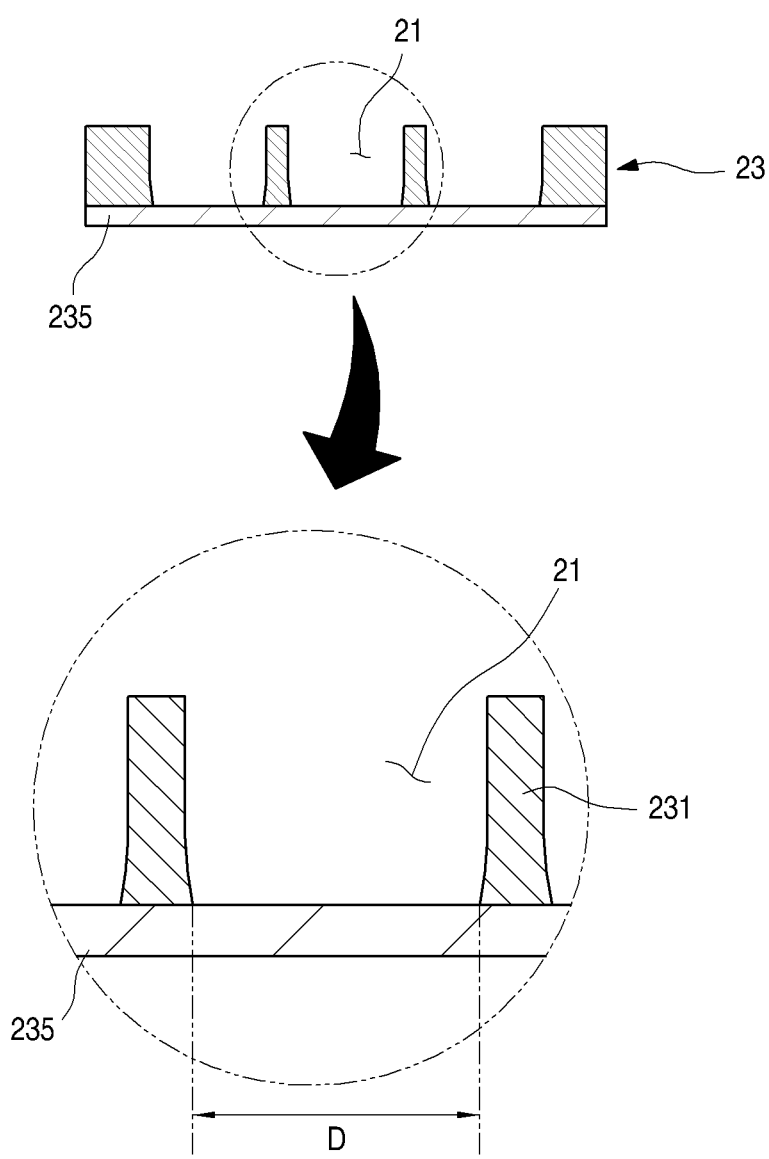
FIG. 29 is a cross-sectional view taken along line 29-29' of FIG. 24.

FIG. 29 is a cross-sectional view taken along line 29-29' of FIG. 24.

As illustrated in the drawing, the plurality of first through-holes 21 may be formed at the front panel 20. Each of the plurality of first through-holes 21 is punched to have a uniform diameter and may be formed to have a design diameter of 0.5 mm by the etching. The first through-holes 21 may be formed by removing a part of the back coating layer 232 of the rear surface of the front panel 20 and etching the exposed base metal layer 231.

In some implementations, the ferric chloride ($FeCl_2$) which reacts with and melts the base metal layer 231 may be used as an etching solution. Therefore, when the portion from which the back coating layer 232 is removed is etched using the etching solution, the first through-hole 21 which completely passes through the base metal layer 231 may be formed. In some implementations, an over-etching may be performed to uniformly keep the opening of the first through-hole 21, and the opening of the first through-hole 21 formed by the over-etching may be formed to have a diameter D of 0.5 to 0.7 mm which is slightly larger than the design diameter.

The size of the first through-hole 21 slightly becomes larger than the design diameter by the over-etching. However, since the base metal layer 231 may be straightly pierced to have the uniform diameter, all of the opening sizes of the first through-holes 21 are uniformly formed, and overlapping or interference between the plurality of the first through-holes 21 does not occur. Also, even when the size of the first through-hole 21 is slightly increased, the first through-hole 21 is shielded by the color layer 235 while the LED 313 is not turned on, is not visible to the outside, and thus does not affect the user.

The hole-filling member 22 filling the first through-hole 21 is formed at the rear surface of the front panel 20 in the screen-printing method. In some implementations, the hole-filling member 22 is formed to cover the area of the displaying part 11 formed by the plurality of the first through-holes 21. Therefore, the plurality of first through-holes 21 are filled with the hole-filling member 22, and the printed layer having a thickness of about 35 to 55 μm is formed at the rear surface of the front panel 20 corresponding to the area of the displaying part 11.

Figure 30A:
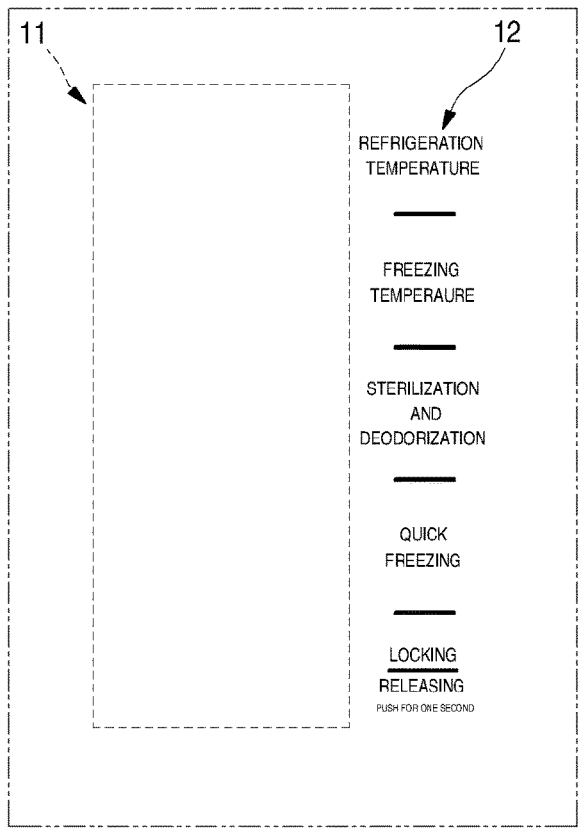
FIGS. 30A and 30B are views showing states of an example displaying part.
Figure 30B:
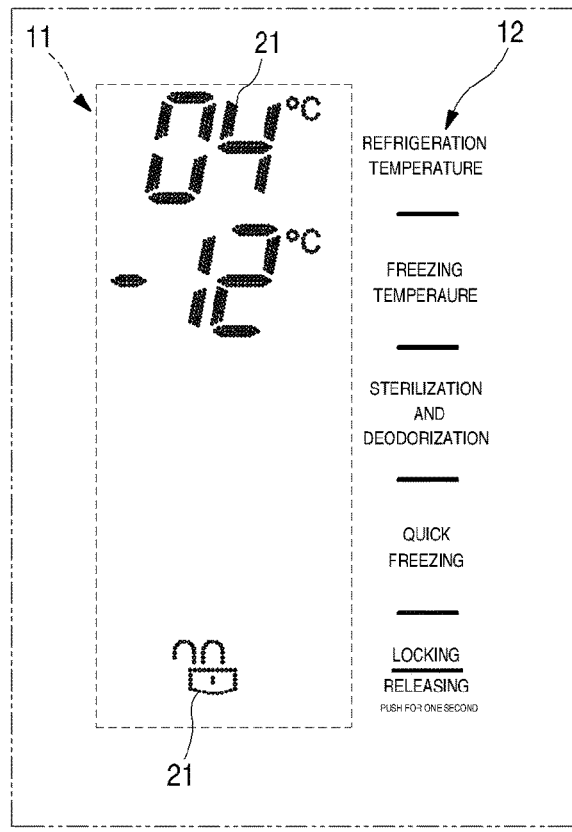

FIGS. 30A and 30B illustrate an example displaying part.

As illustrated in the drawing, the displaying part 11 may be formed by the plurality of first through-holes 21 and may display information in the form of a number or a symbol indicated in the seven segments according to the turned-on LED 313.

In some implementations, in the displaying part 11, the first through-holes 21 are not exposed to the outside while the LED 313 of the display assembly 300 is not turned, as illustrated in FIG. 30A.

In some implementations, the color layer 235 is formed to have a color or a certain texture and has a property in which the light is transmitted therethrough. Therefore, while the light of the LED 313 is not emitted from the inside of the refrigerator door 10, an internal area of the refrigerator door 10 in which the first through-holes 21 are formed becomes relatively darker and is not visible to the outside. In particular, when the color of the color layer 235 is slightly dark or the color layer 235 includes the deposition layer 235d, such a phenomenon occurs more remarkably.

As described above, since the first through-holes 21 are shielded by the color layer 235 of the colored steel plate, the first through-holes 21 are not visible to the outside while the light is not emitted. Accordingly, the front surface of the refrigerator door 10 looks as if the display is not provided thereat.

In this state, when the LED 313 is turned on by a user's touching operation on the touch operation part 12 or a preset certain operation, the light emitted from the LED 313 passes, in turn, through the third through-holes 321, the second through-holes 220 and the first through-holes 21 and is emitted to the outside.

In some implementations, the light is emitted from some of the plurality of first through-holes 21 according to the turned-on state of the LED 313, and the remaining first through-holes 21 do not emit the light and thus are not visible to the user. The first through-holes 21 which emit the light by passing the light of the LED 313 may be combined and may form the specific number, character or symbol shape.

For example, as illustrated in FIG. 30B, when a certain LED 313 of the LEDs 313 is turned on, the light is emitted from a part of the plurality of first through-holes 21 and may display information such as 4° C. and −12° C. in the form of a number. In some implementations, the information may be displayed through the front surface of the refrigerator door 10 in various forms by the combination of the first through-holes 21 which are turned on in a state in which a separate display is not visible on the front surface of the refrigerator door 10.

A manufacture method of the exterior member having the above-described structure will be described.

Figure 31:
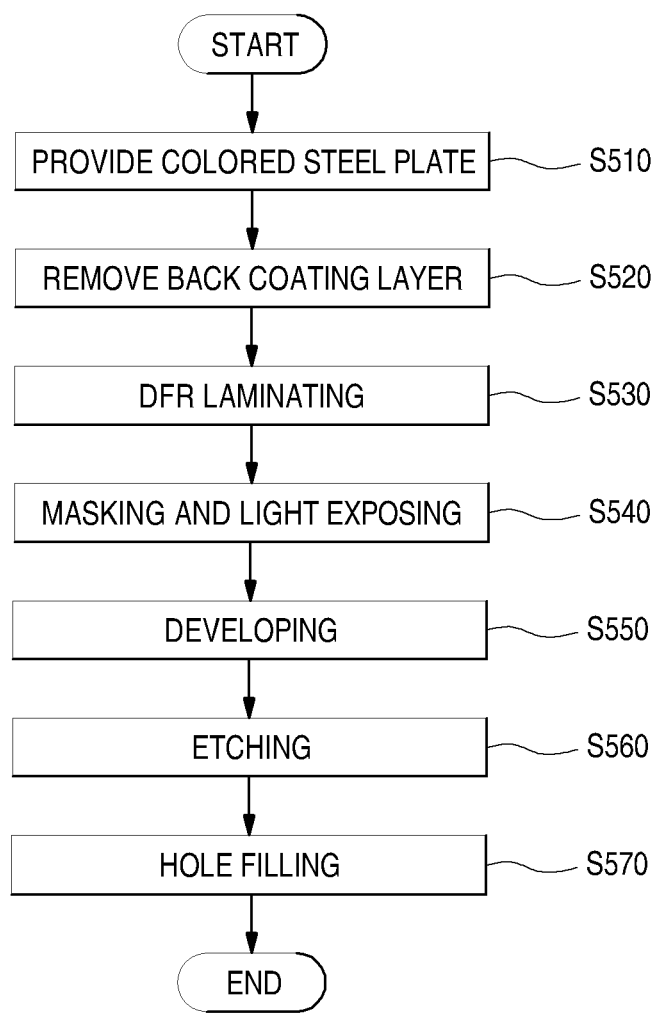
FIG. 31 is a flowchart of an example manufacture method of an exterior member.

FIG. 31 illustrates an example manufacture method of an exterior member.

Figure 32:
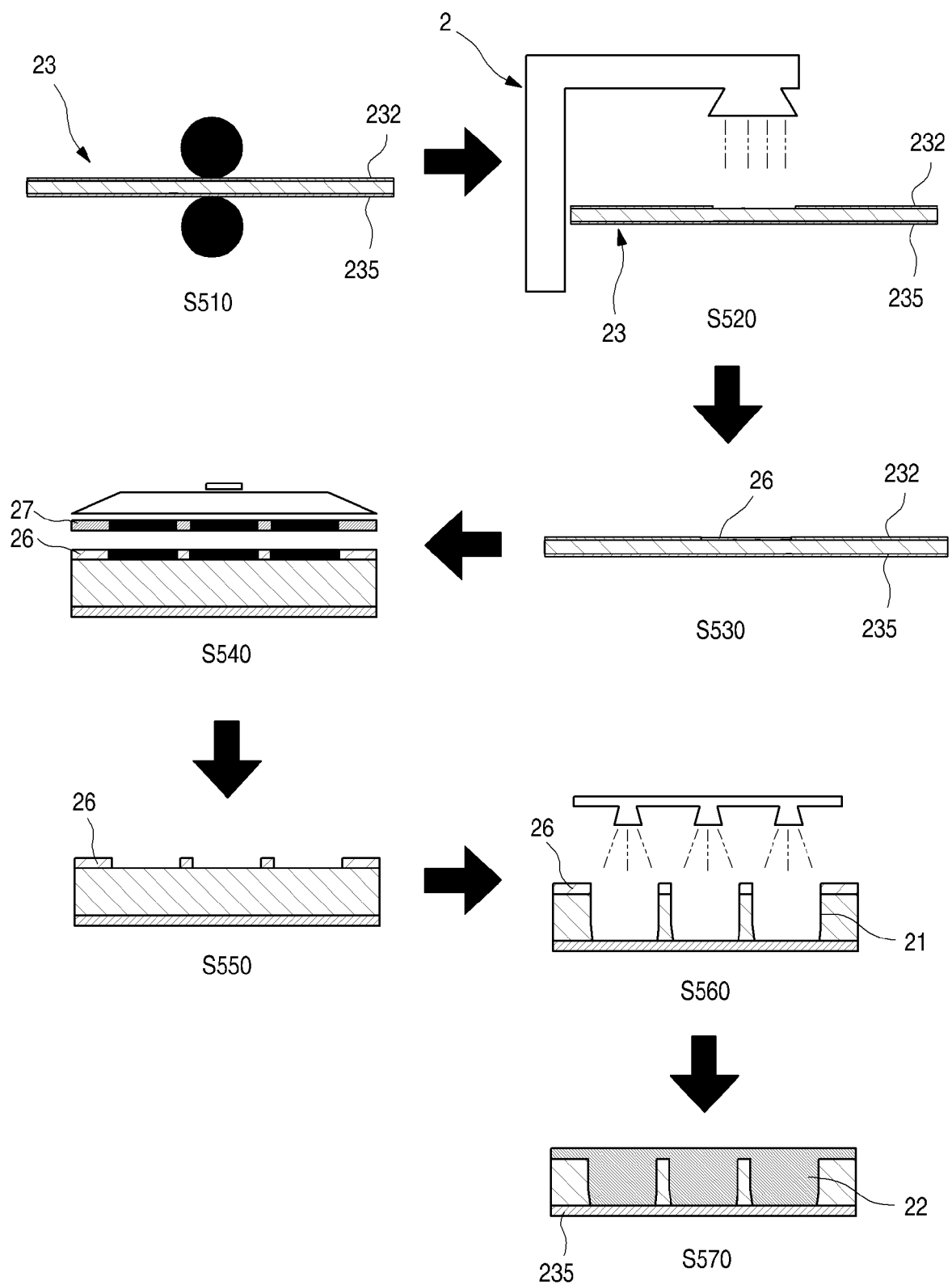
FIG. 32 is a schematic of an example manufacture process of an exterior member.

FIG. 32 illustrates an example manufacture process of an exterior member.

As illustrated in the drawings, to mold the exterior member, e.g., the front panel 20, first, a colored steel plate (e.g., the VCM steel plate 23) used as the material of the front panel 20 is cut and stored in a proper length.

The colored steel plate is one of the VCM steel plate 23 and the PCM steel plate 23' having the color layer 235. A commercially available product may be stored and then directly used in the forming of the front panel 20 of the refrigerator door 10.

And the stored colored steel plate is washed using a solution containing sulfuric acid and caustic soda to remove a foreign substance on a surface thereof. The foreign substance on the surface of the colored steel plate may be completely removed by the washing, and then the colored steel plate may be moved to a next process after the washing and drying process is completed. In some implementations, a preprocessing process for washing the surface of the colored steel plate and removing the foreign substance may be omitted [a steel plate storing operation, S510].

In the colored steel plate which is processed and supplied in a certain size, the back coating layer 232 formed on a rear surface thereof may be removed by a laser emitting unit 2. The back coating layer 232 which forms a lower surface of the colored steel plate, e.g., a lower surface of the base metal layer 231 is removed to perform the etching of the base metal layer 231.

In some implementations, only an area of the back coating layer 232 formed on the entire rear surface of the colored steel plate at which the displaying part 11 is located, e.g., the first through-hole 21 is formed may be removed by the laser emitting unit 2. Therefore, the base metal layer 231 corresponding to a portion of the rear surface of the colored steel plate from which the back coating layer 232 is removed is in an exposed state [a back coating removing operation, S520].

The DFR 28 is attached to a portion, through which the base metal layer 231 is exposed by removing of the back coating layer 232, by a laminating process. Therefore, the entre rear surface of the colored steel plate may be formed by a portion at which the back coating layer 232 is formed and a portion on which the DFR 28 is attached [a DFR laminating operation, S530].

And the masking film 29 is disposed on the DFR 28. In some implementations, the masking film 29 may be aligned to an exact position by automation equipment. And while the masking film 29 is attached, the ultraviolet light is radiated in a vacuum environment, and thus the DFR 28 is hardened [a light exposure operation, S540].

And in a state in which the DFR 28 is completely hardened by the light exposure operation, the colored steel plate in which the masking film 29 is removed and the light exposure operation is completed is put in a developing solution, and the remaining portion except a hardened portion, e.g., a masked portion which does not receive the light is dissolved and removed in the developing solution. Therefore, the remaining portion except the hardened portion may be removed, and the colored steel plate may be washed and then may be moved to a next process [a developing operation, S550].

And both surfaces of the colored steel plate in which the developing operation is completed may be heat-dried to remove microbubbles on the DFR 28 and to enhance an adhesive property of the DFR 28. In some implementations, the heat-drying may be performed at a temperature of about 180 to 200° C. for about 10 minutes. The DFR 28 attached to the colored steel plate from which the microbubbles are removed by such a heat treatment may be in completely close contact with the base metal layer 231. In some implementations, the heating and drying process may be omitted.

When the developing of the portion of the DFR 28 for the etching is completed, the colored steel plate is moved and etched. In some implementations, the ferric chloride (FeCl$_2$) may be used as an etching solution. Therefore, the etching solution does not react with the DFR 28 and the back coating layer 232 but may react with the portion of the base metal layer 231 which is exposed by removing the DFR 28 so that the base metal layer 231 is corroded, and thus the first through-holes 21 may be formed.

In some implementations, the color layer 235 is also formed of a resin material and thus not corroded by the etching solution. Therefore, the first through-holes 21 may be formed to pass through the base metal layer 231. And the color layer 235 shields the first through-holes 21 from a front thereof.

And the over-etching may be performed by increasing an etching time when the etching for forming the first through-holes 21 is performed, and thus each of the first through-holes 21 may be formed to have the uniform diameter from an entrance to an exit by the over-etching. Therefore, a deviation between the diameters of the plurality of first through-holes is not serious, and an interference between the adjacent first through-holes 21 does not occur, and thus all of the first through-holes 21 may be formed to have the uniform sizes and positions [an etching operation, S560].

In a state in which the etching is completed and the first through-holes 21 are formed, the DFR 28 is removed, and only the colored steel plate having the first through-holes 21 is remained by removing the DFR 28. After the DFR 28 is completely removed, an inspection process for checking a state of the formed first through-holes 21 may be performed.

In the colored steel plate in which the forming of the first through-holes 21 is completed, the hole-filling member 22 may be formed in each of the first through-holes 21. The first through-holes 21 are filled with the hole-filling member 22, and thus a corrosion in the first through-holes 21 may be prevented, and the color layer 235 which shields the openings of the first through-holes 21 may be supported.

And the hole-filling member 22 is formed to cover not only the first through-holes 21 but also the back coating layer 232 which is stripped to perform the etching, and the rear surface of the colored steel plate is prevented from being corroded or damaged [a hole-filling operation, S570].

Hereinafter, a forming process of the hole-filling member 22 will be described in detail with reference to the drawings.

Figure 33:
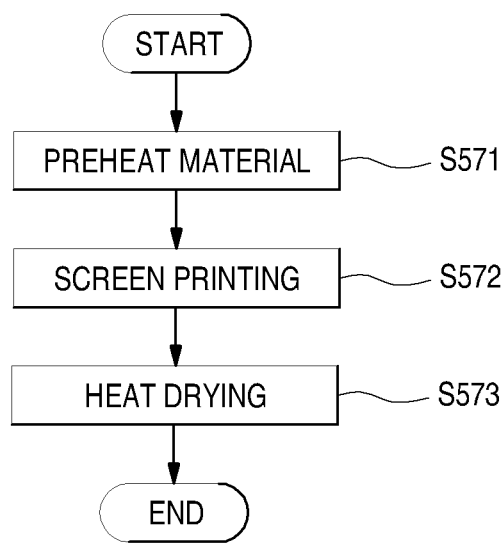
FIG. 33 is a flowchart of an example method of forming a hole-filling member in a first through-hole.
Figure 34:
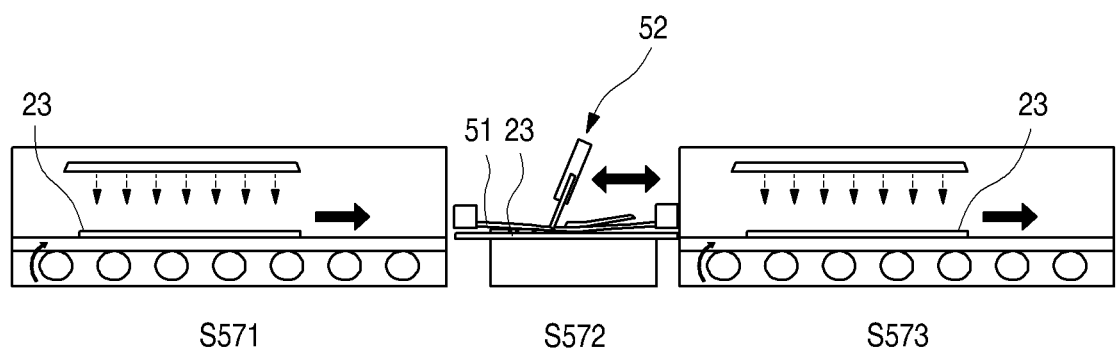
FIG. 34 is schematic of a an example print-forming process of a hole-filling member in a first through-hole.

FIG. 33 illustrates an example method of forming a hole-filling member in a first through-hole. FIG. 34 illustrates an example print-forming process of a hole-filling member in a first through-hole.

As illustrated in the drawings, in the colored steel plate in which the forming of the first through-holes 21 is completed, one opened surface of the first through-holes 21 is shielded by the color layer 235, and the other surface is exposed in an opened state, and thus the printing ink for forming the hole-filling member 22 may be accommodated therein. And the hole-filling member 22 may be formed by the screen-printing using the printing ink.

In a state in which the forming of the first through-holes 21 is completed, the colored steel plate is processed by a preheating process in which the colored steel plate is heated before the screen-printing. When the printing ink is printed on the base metal layer 231 of the colored steel plate while the colored steel plate is in a heated state, surface energy of the base metal layer 231 is reduced, and a surface tension is also lowered, and thus the first through-holes 21 may be effectively filled with the printing ink. In some implementations, a viscosity of the printing ink is temporarily lowered by heat of the heated colored steel plate, and the printing ink may be introduced into the first through-holes 21. When a temperature of the colored steel plate is lowered, the viscosity of the printing ink is increased again, and the printing ink may be maintained in the first through-holes 21. [a material preheating operation, S571].

The printing ink may be printed in the screen-printing method on the rear surface of the colored steel plate, e.g., a surface opposite to the surface on which the color layer 235 is attached. The first through-holes 21 are filled with the printing ink by the screen-printing using the printing ink, and a part of the rear surface of the colored steel plate is coated with the printing ink, and thus the hole-filling member 22 is formed.

A forming method of the hole-filling member 22 will be described in detail with reference to the drawings.

Figure 35:
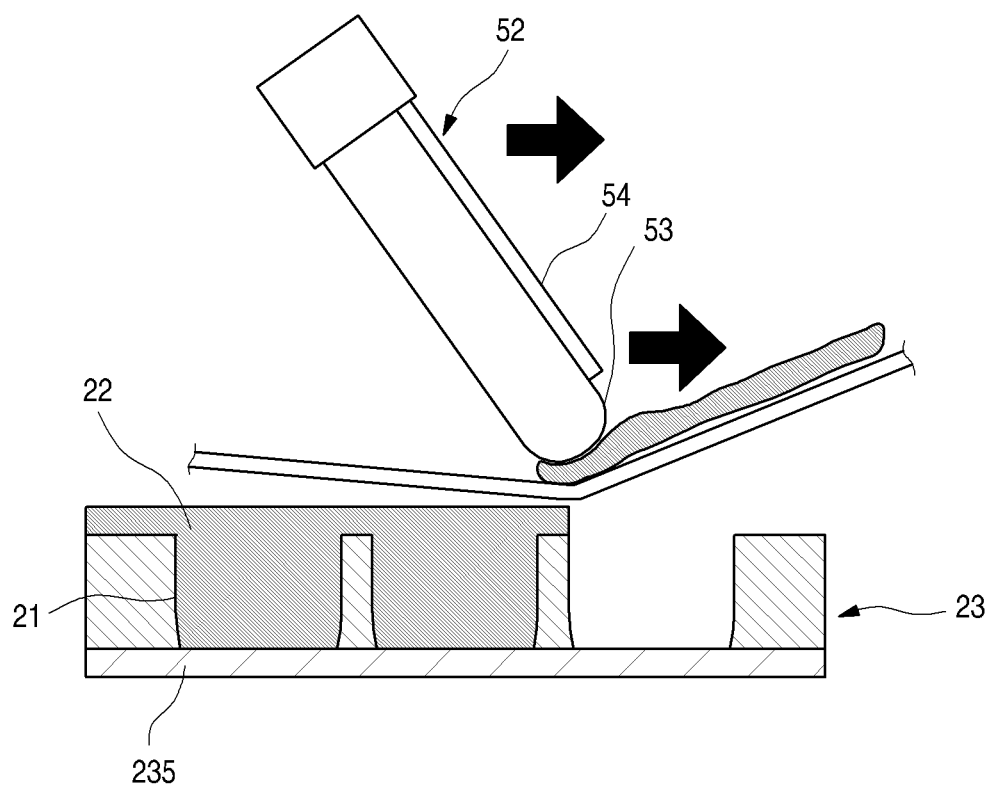
FIG. 35 is a view of a state in which an example screen-printing process is performed on a rear surface of a front panel.

FIG. 35 illustrates an example screen-printing process being performed on a rear surface of a front panel.

As illustrated in the drawings, the colored steel plate in which the preheating is completed is disposed to perform the screen-printing. In some implementations, the colored steel plate is disposed so that the surface thereof to which the color layer 235 is formed is directed downward. In some implementations, the rear surface of the colored steel plate and the opened surface of the first through-hole 21 may be exposed upward.

In this state, the engraved plate 51 for the screen-printing is located at the rear surface of the colored steel plate corresponding to the displaying part 11. In some implementations, all of the first through-holes 21 are located inside the area of the engraved plate 51, and the overall first through-holes 21 may be filled with the printing ink by the screen printing.

The squeeze 52 for filling the first through-holes 21 with the printing ink may be provided above the engraved plate 51. And the support member 54 may be further provided at the squeeze 52. The support member 54 is formed not to protrude further than the rounded portion 53 of the end of the squeeze 52 and thus does not interfere with the pressing action of the rounded portion 53 with respect to the printing ink.

After the forming of the hole-filling member 22 is completed, an additional printed layer may be further formed on the surface of the hole-filling member 22. The additional printed layer may be printed in a black color, may be formed along the border of the unit portion of each of the seven segments formed by the collection of the first through-holes 21 and may prevent the light from leaking to the outside of the first through-hole 21. And the printed layer may be formed by a series of screen-printing processes [a screen-printing operation, S572].

When the printing of the hole-filling member 22 is completed, a drying process is performed at a temperature of 100 to 120° C. for 15 minutes. In the drying process, the bubbles may be removed, and the hole-filling member 22 may be stabilized [a heat-drying operation, S573].

The exterior member may have various other implementations rather than the above-described implementation.

An example exterior member is characterized in that only a portion of the back coating layer corresponding to the first through-hole may be etched by a hole-marking using the laser emitting unit 2.

Therefore, the exterior member is different from that of the above-described implementation in a stripping position and a shape of the back coating layer and the etching process, and other configurations are the same, and thus the same elements as those in the above-described implementation will be designated by the same reference numerals.

Figure 36:
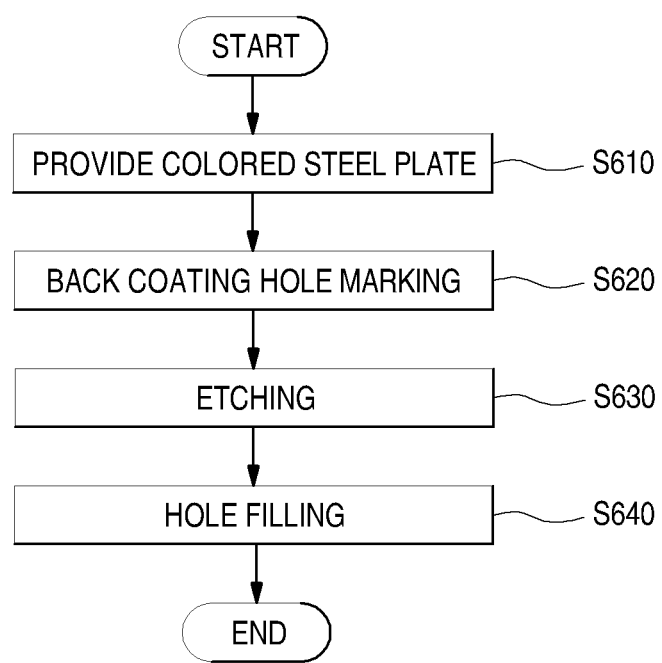
FIG. 36 is a flowchart of an example manufacture method of an exterior member.

FIG. 36 illustrates an example manufacture method of an exterior member.

Figure 37:
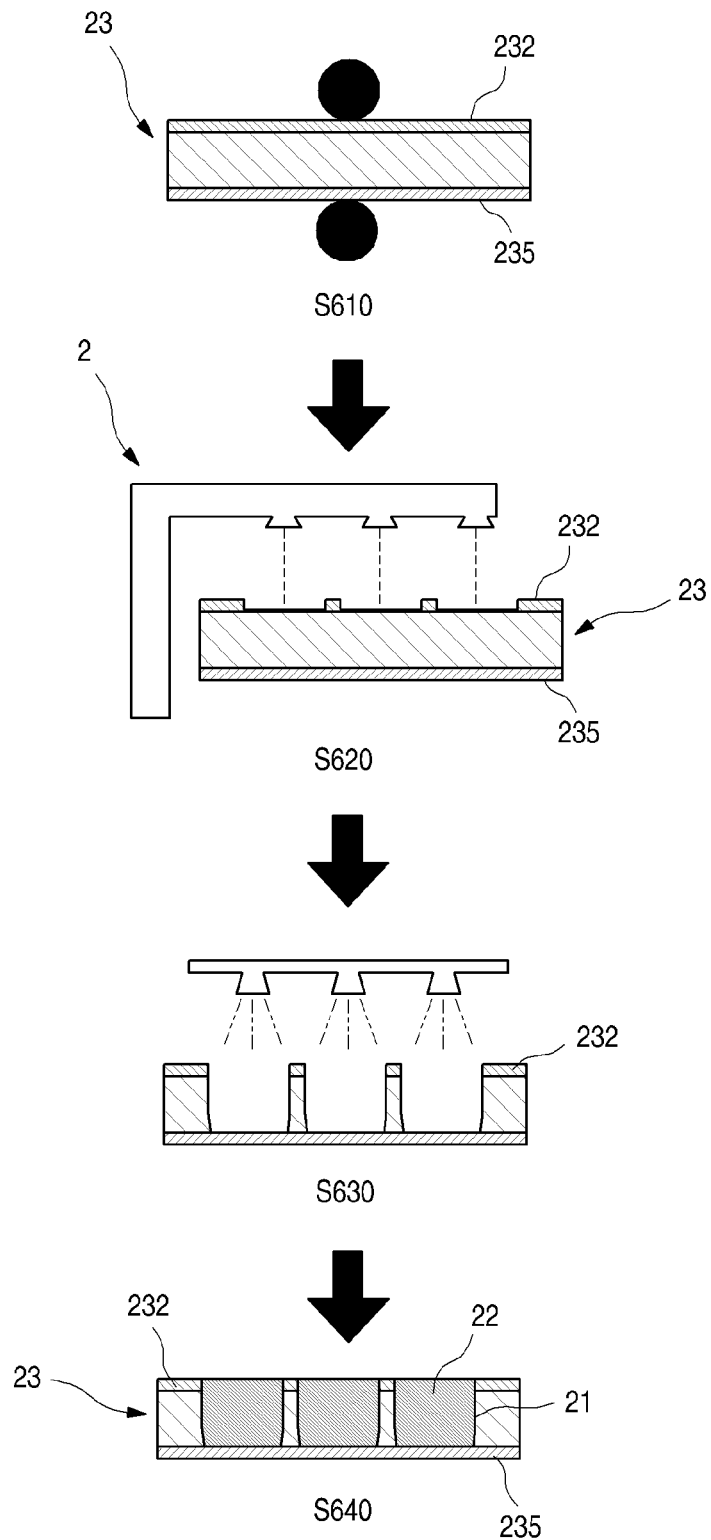
FIG. 37 is schematic of an example manufacture process of an exterior member.

FIG. 37 illustrates an example manufacture process of an exterior member.

As illustrated in the drawings, to mold the exterior member, e.g., the front panel 20, first, the colored steel plate used as the material of the front panel 20 is cut and stored in a proper length.

The colored steel plate is one of the VCM steel plate 23 and the PCM steel plate 23' having the color layer 235. A commercially available product may be stored and then directly used in the forming of the front panel 20 of the refrigerator door 10.

And the stored colored steel plate is washed using a solution containing sulfuric acid and caustic soda to remove a foreign substance on the surface thereof. The foreign substance on the surface of the colored steel plate may be completely removed by the washing, and then the colored steel plate may be moved to a next process after the washing and drying process is completed. In some implementations, a preprocessing process for washing the surface of the colored steel plate and removing the foreign substance may be omitted [a steel plate storing operation, S610].

In the colored steel plate which is processed and supplied in a certain size, the back coating layer 232 formed on the rear surface thereof may be removed by the laser emitting unit 2. The back coating layer 232 which forms the lower surface of the colored steel plate, e.g., the lower surface of the base metal layer 231 is removed to perform the etching of the base metal layer 231.

In some implementations, only a portion of the back coating layer 232 formed at the entire rear surface of the colored steel plate corresponding to the first through-hole may be removed by the laser. In some implementations, the back coating layer 232 corresponding to the entire area of the displaying part 11 including all of the plurality of first through-holes 21 is removed. In some implementations, each of portions of the back coating layer 232 corresponding to the first through-holes 21 is removed by a hole-marking method.

In some implementations, the back coating layer 232 may be removed in a plurality of hole shapes corresponding to the plurality of the first through-holes 21. And a diameter of each of holes from which the back coating layer 232 is removed corresponds to a diameter of each of the first through-holes 21.

Therefore, when the back coating layer 232 is removed by the laser emitting unit 2, the base metal layer 231 may be exposed through the opened holes. And the remaining back coating layer 232 may serve as a mask for distinguishing between a processing portion and a non-processing portion in the etching process which will be performed [a back coating removing operation, S620].

When the removing of the back coating layer 232 is completed, the colored steel plate is moved and etched. In some implementations, the ferric chloride ($FeCl_2$) may be used as an etching solution. Therefore, the etching solution does not react with the back coating layer 232 covered on the rear surface of the colored steel plate but may react with only the portion of the base metal layer 231 which is exposed by removing the back coating layer 232 so that the base metal layer 231 is corroded, and thus the first through-holes 21 may be formed.

In some implementations, the color layer 235 is also formed of a resin material and thus not corroded by the etching solution. Therefore, the first through-holes 21 may be formed to pass through the base metal layer 231. And the color layer 235 shields the first through-holes 21 from a front thereof.

And the over-etching may be performed by increasing the etching time when the etching for forming the first through-holes 21, and thus each of the first through-holes 21 may be formed to have the uniform diameter from an entrance to an exit by the over-etching. Therefore, a deviation between the diameters of the plurality of first through-holes is not serious, and an interference between the adjacent first through-holes 21 does not occur, and thus all of the first through-holes 21 may be formed to have the uniform sizes and positions [an etching operation, S630].

In the colored steel plate in which the forming of the first through-holes 21 is completed, the hole-filling member 22 may be formed in each of the first through-holes 21. The first through-holes 21 are filled with the hole-filling member 22, and thus a corrosion in the first through-holes 21 may be prevented, and the color layer 235 which shields the openings of the first through-holes 21 may be supported.

And the hole-filling member 22 is formed to cover not only the first through-holes 21 but also the back coating layer 232 which is stripped to perform the etching, and the rear surface of the colored steel plate is prevented from being corroded or damaged [a hole-filling operation, S640].

The touch sensor assembly is not provided only at the refrigerator door in the above-described implementation, but may be provided at various types of home appliances. Since the exterior member and the display assembly which will be described below have the same structures as those in the above-described implementation.

Figure 38:
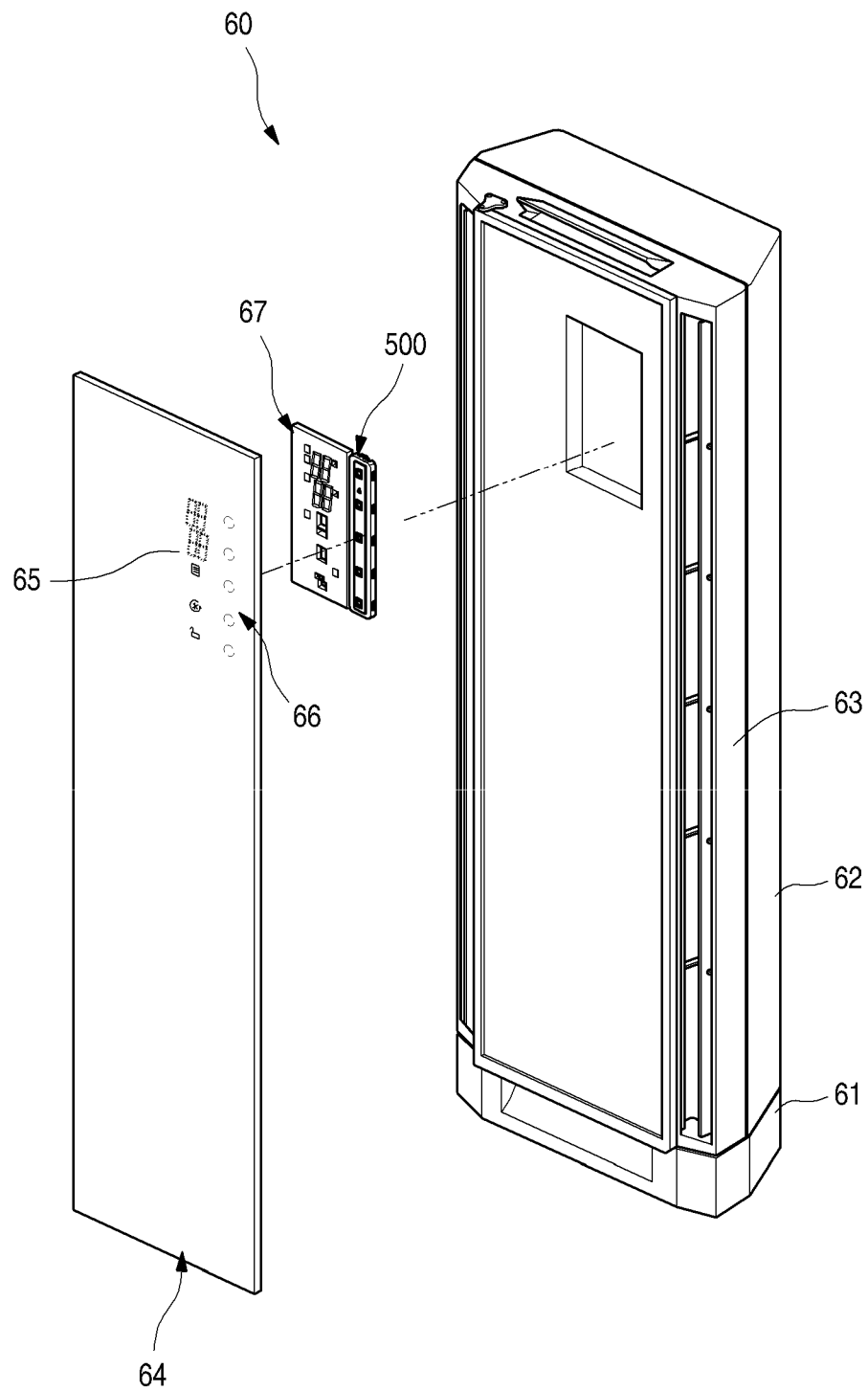
FIG. 38 is an exploded perspective view of an example air conditioner equipped with an exterior member with a displaying part.

FIG. 38 illustrates an example displaying part located at an air conditioner.

As illustrated in the drawing, an entire exterior of an indoor unit 60 of an air conditioner is formed by a case. The case may include a base 61, a rear cabinet 62 which is disposed at an upper side of a second half portion of the base 61, and a front cabinet 63 which is disposed at an upper side of a first half portion of the base 61. An exterior member 64 may be disposed at a front surface of the front cabinet 63.

A predetermined space is formed therein by coupling the base 61, the rear cabinet 62 and the front cabinet 63. A fan and a passage for suctioning and discharging air, a filter assembly for filtering suctioned air, a heat exchanger for heat-exchanging of the suctioned air and a configuration for driving a refrigeration cycle are provided and accommodated inside the space. And a plurality of inlet holes through which external air is suctioned and a plurality of outlet holes through which heat-exchanged air is discharged are formed at the base 61, the rear cabinet 62 and the front cabinet 63.

The exterior member 64 is rotatably and detachably installed at the front cabinet 63. Therefore, the front surface of the front cabinet 63 may be opened by rotating or installing and separating the exterior member 64, and thus elements provided inside and outside the front cabinet 63 are allowed to be operated and maintained. In some implementations, the exterior member 64 is one element for forming an exterior of the indoor unit 60 and may be formed to be fixed to and installed at one side of the case.

A displaying part 65 for displaying an operation state of the air conditioner may be formed at the exterior member 64. The displaying part 65 may be formed by a collection of fine through-holes, like the above-described implementation, and the through-holes may form a hole-filling coating layer by the hole-forming method through the etching and the screen-printing described above. In some implementations, a touch operation part 66 may be formed at one side of the displaying part 65 by a printing process or a surface working process.

And a display assembly 67 is provided at a rear of the displaying part 65, and operating information of the air conditioner may be displayed by emitting light to the displaying part 65 by the display assembly 67. The display assembly 67 is formed by a collection of LEDs and may provide information in the form of a number or a symbol.

Also, a touch sensor assembly 500 may be attached to a rear surface of the exterior member 64 corresponding to the touch operation part 66. The touch sensor assembly 500 is bonded by an adhesive member such as the adhesive and the double-sided tape. The touch sensor assembly 500 may be in close contact with the touch operation part 66 and may recognize a user's touch operation.

Figure 39:
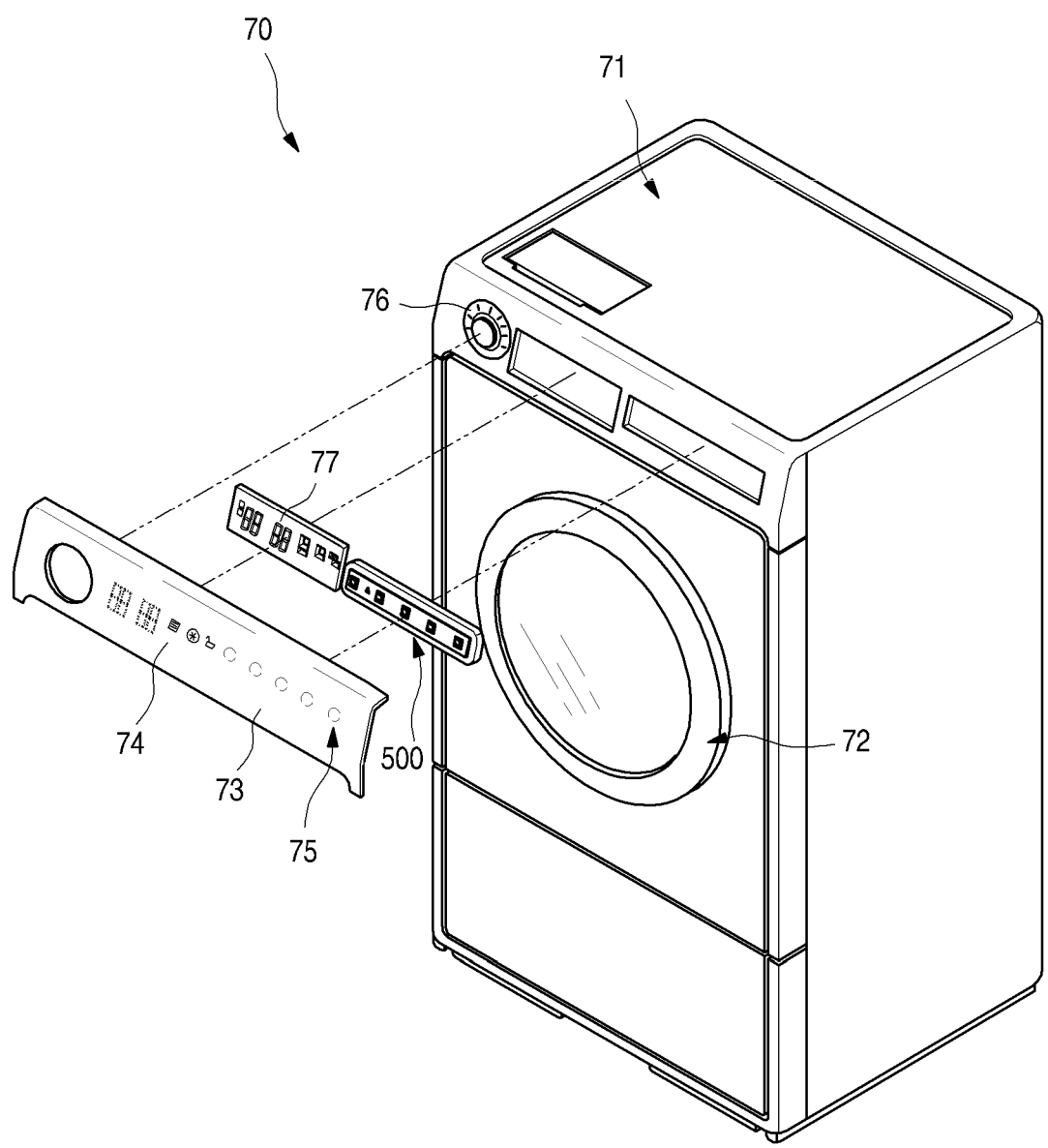
FIG. 39 is an exploded perspective view of an example washing machine equipped with an exterior member with a displaying part.

FIG. 39 illustrates an example displaying part located at a washing machine.

As illustrated in the drawing, a washing machine 70 may include a main body 71 which forms an exterior, a tub in which a washing water is stored, a drum which is rotatably disposed inside the tub, a driving unit which transmits a rotating force for rotating the drum, a washing water supplying unit which supplies the washing water to the tub, and a discharging unit through which the washing water is discharged.

A part of a front surface of the main body 71 is formed to be opened such that laundry is put into the drum therethrough, and an opening of the main body 71 may be opened and closed by a door 72. To this end, the door 72 is rotatably installed at the main body 71.

A plate-shaped exterior member 73 may be provided at the front surface and an upper surface of the main body 71 except the door 72. And a displaying part 74 and a touch operation part 75 may be formed at least a part of the exterior member 73.

The displaying part 74 serves to display an operating state of the washing machine 70 and may be formed by a collection of fine through-holes, like the above-described implementation. And the displaying part 74 may be formed by the collection of the fine through-holes, like the above-described implementation, and the through-holes may form the hole-filling coating layer by the hole-forming method through the etching and the screen-printing described above.

And the touch operation part 75 may operate the washing machine 70 or may select an operation of the washing machine 70 by a user's touch operation. In some implementations, a dial type knob 76 for operating the washing machine 70 may be provided.

And a display assembly 77 is provided at a rear of the displaying part 74, and operating information of the washing machine 70 may be displayed by emitting light to the displaying part 74 by the display assembly 77. The display assembly 77 is formed by a collection of LEDs and may provide information in the form of a number or a symbol.

Also, the touch sensor assembly 500 may be attached to a rear surface of the exterior member 73 corresponding to the touch operation part 75. The touch sensor assembly 500 is bonded by an adhesive member such as the adhesive and the double-sided tape. The touch sensor assembly 500 may be in close contact with the touch operation part 75 and may recognize the user's touch operation.

Figure 40:
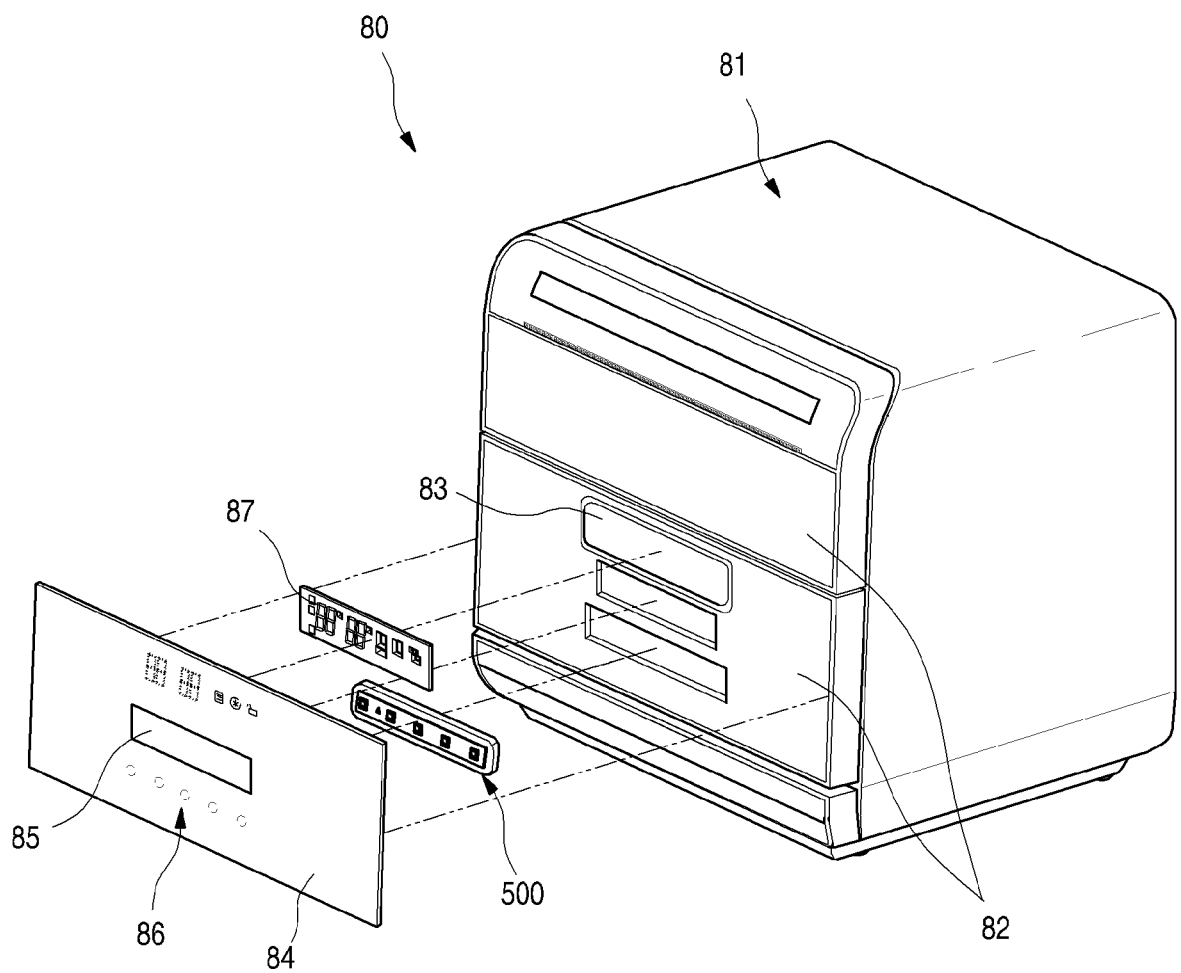
FIG. 40 is an exploded perspective view of an example dish washer equipped with an exterior member with a displaying part.

FIG. 40 illustrates an example displaying part located at a dish washer.

As illustrated in the drawings, an exterior of a dish washer 80 equipped with the touch sensor assembly 500 is formed by a main body 81 which is formed in an approximately rectangular parallelepiped shape.

The main body 81 may include and accommodate a cavity in which a dish to be washed is accommodated, a rack member which is inserted into and withdrawn from the cavity and on which the dish is seated, a water supplying unit which supplies washing water into the cavity and a discharging unit through which washed water is discharged.

And a door 82 is provided at the main body 81. The door 82 is formed to selectively shield an opened front surface of the main body 81, and forms an exterior of a front surface of the dish washer 80 while the door 82 is closed.

The door 82 includes an upper door and a lower door and may be formed to have a structure in which the upper door is interlocked with the lower door to be opened and closed when the lower door is operated. And a handle 83 for opening and closing the door 82 may be provided at the lower door.

An exterior member 84 which forms an exterior is attached to a front surface of the door 82, e.g., front surfaces of the upper door and the lower door.

A displaying part 85 for displaying an operating state of the dish washer 80 may be formed at the exterior member 84. The displaying part 85 may be formed by a collection of fine through-holes, like the above-described implementation. And the displaying part 85 may be formed by the collection of the fine through-holes, like the above-described implementation, and the through-holes may form the hole-filling coating layer by the hole-forming method through the etching and the screen-printing described above.

And a display assembly 87 is provided at a rear of the displaying part 85, and operating information of the dish washer 80 may be displayed by emitting light to the displaying part 85 by the display assembly 87. The display assembly 87 is formed by a collection of LEDs and may provide information in the form of a number or a symbol.

A touch operation part 86 may be formed at one side of the displaying part 85 by the printing process or the surface working process. And a touch sensor assembly 500 may be attached to a rear surface of the exterior member 84 corresponding to the touch operation part 86. The touch sensor assembly 500 is bonded by an adhesive member such as the adhesive and the double-sided tape. The touch sensor assembly 500 may be in close contact with the touch operation part 86 and may recognize a user's touch operation.

Figure 41:
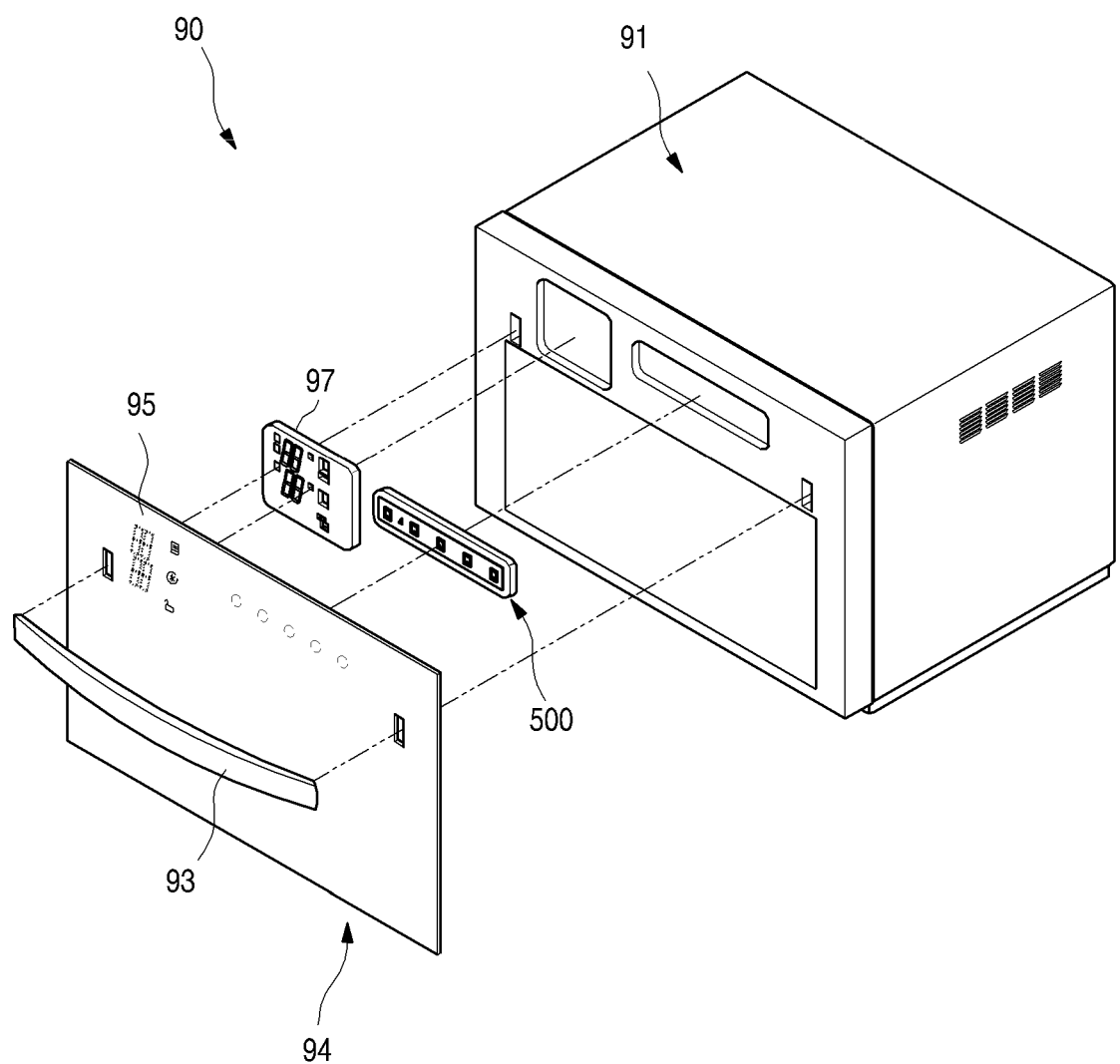
FIG. 41 is an exploded perspective view of an example cooking device equipped with an exterior member with a displaying part.

FIG. 41 illustrates an example displaying part located at a cooking device.

As illustrated in the drawings, an exterior of a cooking device 90 equipped with the touch sensor assembly 500 is formed by a main body 91 which is formed in an approximately rectangular parallelepiped shape.

The main body 91 may include a cavity in which food to be cooked is accommodated, a heating means or a magnetron for cooking the food inside the cavity, a fan assembly for convection in the cavity and so on.

And a door 92 is provided at the main body 91. The door 92 is formed to selectively shield an opened front surface of the main body 91 and forms an exterior of a front surface of the cooking device 90 while the door 92 is closed.

The door 92 is rotatably hinge-coupled to the main body 91, and is rotated left and right or upward and downward, thereby selectively opening and closing the opened front surface of the cooking device 90.

And a handle 93 for opening and closing the door 92 is provided at the door 92. And an exterior member 94 which forms an exterior of a front surface of the door 92 may be provided at the front surface of the door 92. The exterior member 94 may also form one side of the main body 91 other than the door 92.

A displaying part 95 for displaying an operating state of the cooking device 90 may be formed at the exterior member 94. The displaying part 95 may be formed by the collection of the fine through-holes, like the above-described implementation. And the displaying part 95 may be formed by the collection of the fine through-holes, like the above-described implementation, and the through-holes may form the hole-filling coating layer by the hole-forming method through the etching and the screen-printing described above. And a touch operation part 96 may be formed at one side of the displaying part 95 by the printing process or the surface working process.

And a display assembly 97 may be attached to a rear of the displaying part 95, and operating information of the cooking device 90 may be displayed by emitting light to the displaying part 95 by the display assembly 97. The display assembly 97 is formed by a collection of LEDs and may provide information in the form of a number or a symbol.

Also, a touch sensor assembly 500 may be attached to a rear surface of the exterior member 94 corresponding to the touch operation part 96. The touch sensor assembly 500 is bonded by an adhesive member such as the adhesive and the double-sided tape. The touch sensor assembly 500 may be in close contact with the touch operation part 96 and may recognize a user's touch operation.

In accordance with the exterior member for a home appliance and the manufacture method thereof, the following effects may be expected.

The fine through-holes for forming the displaying part is formed by the etching process of the front surface groove and the rear surface groove. In particular, the fine openings of the through-holes having the uniform sizes are formed by the front surface groove. The openings can be formed to be in communication with the front surface groove by the rear surface groove which is machined to correspond to the thickness of the stainless steel plate. Therefore, even when a thick stainless steel plate is used to ensure the strength of the exterior member, the through-holes having the fine and uniform sizes can be formed by the front surface groove and the rear surface groove.

The diameter of the rear surface groove is formed larger than that of the front surface groove according to the thickness of the stainless steel plate, and the diameters are formed to become narrower in the recessed directions and to be rounded so that the light emitted from the LED are concentrated and radiated through the through-holes. Therefore, the light transmitted through the through-holes can look brighter when being seen from an outside, and thus the visibility of the displaying part can be enhanced.

A process for removing the burrs is not required by etching both surfaces of the stainless steel plate.

Since the hole-filling member can be formed in the screen-printing method using the printing ink hardened by the heat-drying, the processes can be changed more than the hole-filling process using the coating and ultraviolet hardening method and can be performed rapidly, and thus the productivity is enhanced.

Since the printing ink has the excellent kinematic viscosity by adding fumed silica, the printing ink can effectively fill the through-holes by the screen-printing, and also an excellent adhesive property can be provided.

By increasing the shoulder angle of the engraved plate in the screen-printing, the number of meshes disposed at one through-hole is more than that of meshes in a general screen-printing, and thus hole-filling ability can be enhanced.

The end of the squeeze used in the screen-printing is formed to be rounded, such that a pressing force is increased, and thus an amount of the printing ink passing through the engraved plate can be increased.

The squeeze can be formed of the elastic material, and the support member for preventing the deformation is further provided to keep the constant pressing pressure, and thus the printing can be performed in a uniform thickness.

And the holes are formed at positions of the metal plate, in which the coating layer is formed at both surfaces thereof, corresponding to the through-holes, and the coating layer is formed of the material which does not react with the etching solution, and the through-holes are formed by performing the etching through the holes of the coating layer. Therefore, a separate surface treatment for protecting the metal plate before the etching process and a surface treatment after the etching process are not required, and thus the process can be changed, and the manufacturing cost can be reduced.

Since the holes in the coating layer are formed by the laser processing, a portion of the coating layer at a predetermined position can be removed in a predetermined size by controlling the laser output.

While the metal plate is fixed to the metal plate fixing jig, the holes in the coating layer are formed by the laser processing. Therefore, the metal plate is prevented from being shaken during the laser processing, and the processing positions are aligned, and thus the portion of the coating layer at the predetermined position can be removed in the predetermined size.

Since the front surface coating layer is provided by the color coating having a color and the portion of the coating layer at the positions corresponding to the through-hole is removed, various esthetic exteriors can be displayed by applying various colors. Since the light emitted from the LED is not shielded by the coating layer, the visibility of the displaying part can also be ensured.

By filling the through-holes with the hole-filling member, clogging of the through-holes or contamination of built-in members due to introduction of the foreign substance through the through-holes can be prevented.

In the metal plate in which the coating layer is formed at both surfaces thereof, since the through-holes are formed by the laser emitted to the rear surface of the metal plate, a damage of the front surface coating layer which is exposed to the outside can be minimized. Also, due to the laser processing, the manufacturing cost and the manufacturing time can be reduced.

Upon the laser processing, a protective vinyl formed of a PET material is bonded to the front surface coating layer by an adhesive of a silicon component. Therefore, a damage of the front surface coating layer can be prevented, and the spreading of the adhesive of the silicon component having the excellent heat resistance can be minimized.

The exterior member has a structure in which the first through-holes are shielded by the color layer forming the front surface of the colored steel plate. And when the LED is turned on, the light can be transmitted due to the structural characteristic, and thus the displaying part can be indicated to the outside. And when the LED is turned off, the first through-holes are not visible to the outside. Therefore, since the first through-holes are not visible through the front surface of the exterior member when the LED is turned off, the exterior can be further improved, and the luxurious exterior can be provided.

When the first through-holes are formed, the etching solution of the ferric chloride component which reacts with the base metal of the colored steel plate is used. Therefore, after the back coating layer is removed, the first through-holes can be formed by the etching. In some implementations, the first through-holes can be formed while a damage of the color layer which shields the first through-holes is prevented.

The VCM steel plate or the PCM steel plate can be used as the colored steel plate, and by removing the back coating from the colored steel plate which is supplied as a finished product, the first through-holes can be formed in a method, and thus the productivity can be enhanced, and the manufacturing cost can be reduced.

Since the back coating layer removed upon the forming of the first through-holes can be covered by the hole-filling member which fills the first through-holes, the corrosion of the colored steel plate can be prevented, and also the color layer can be supported.

When the first through-holes are formed, the hole of the back coating layer can be formed in a size corresponding to the size of the through-hole by the laser marking. The first through-holes can be formed in the base metal layer exposed by removing the back coating layer using the etching solution of the ferric chloride component which reacts with the base metal.

In some implementations, the back coating layer serves as a mask for the etching. Therefore, since a separate film laminating process for the etching or a developing process is not required, workability and productivity can be remarkably enhanced, and the manufacturing cost can also be considerably reduced.

What is claimed is:

1. An exterior member of a home appliance, the home appliance comprising a display assembly comprising a plurality of light emitting diodes (LEDs), the exterior member comprising:
   a steel plate that covers the display assembly, the steel plate comprising:
      a color layer that is disposed on a front surface of the steel plate and that defines a color and a texture of the home appliance, and
      a back coating layer disposed on a rear surface of the steel plate and configured to prevent corrosion of the steel plate;
   a plurality of first through-holes that are defined in the steel plate at positions corresponding to the plurality of LEDs, the plurality of first through-holes extending from the rear surface of the steel plate to the color layer; and
   a hole-filling member provided in the plurality of first through-holes and configured to transmit light emitted from the LEDs,
   wherein the color layer is configured to:
      based on the LEDs being turned on, transmit light emitted from the LEDs through the plurality of first through-holes to thereby allow display of operating information of the home appliance to an outside of the steel plate, and
      based on the LEDs being turned off, make the plurality of first through-holes not visible from the outside of the steel plate.

2. The exterior member according to claim 1, wherein the steel plate comprises a vinyl-coated material (VCM) steel plate or a pre-coated material (PCM) steel plate.

3. The exterior member according to claim 2, wherein the back coating layer defines a plurality of apertures at positions corresponding to the plurality of first through-holes, an opening width of each of the plurality of apertures corresponding to a width of each of the plurality of first through-holes.

4. The exterior member according to claim 2, wherein the back coating layer defines an open area that spans an overall width of the plurality of first through-holes.

5. The exterior member according to claim 4, wherein the hole-filling member covers the open area of the back coating layer.

6. The exterior member according to claim 4, wherein each of the plurality of first through-holes has a first end facing a rear side of the color layer and a second end connected to the open area of the back coating layer.

7. The exterior member according to claim 2, wherein the color layer is a film type layer attached to the steel plate.

8. The exterior member according to claim 2, wherein the color layer is applied to the steel plate by painting.

9. The exterior member according to claim 1, wherein the back coating layer defines a plurality of apertures at positions corresponding to the plurality of first through-holes, and
   wherein the plurality of first through-holes are defined by etching the rear surface of the steel plate through the plurality of apertures of the back coating layer.

10. The exterior member according to claim 1, wherein the steel plate comprises a vinyl-coated material (VCM) steel plate, and
    wherein the color layer comprises:
       a film color layer that defines the color of the home appliance; and
       a deposition layer that is disposed on a rear side of the film color layer and that defines a metal texture.

11. The exterior member according to claim 1, wherein the steel plate comprises a vinyl-coated material (VCM) steel plate, and
    wherein the color layer comprises a VCM type layer that defines the color of the home appliance.

12. The exterior member according to claim 11, wherein the color layer further comprises a polyethylene terephthalate (PET) layer disposed on a frontmost surface of the color layer and configured to protect the color layer.

13. The exterior member according to claim 1, wherein the hole-filling member is applied to the rear surface of the steel plate by screen printing, and covers a portion of the steel plate corresponding to an entire area of the display assembly.

14. The exterior member according to claim 1, wherein a rear surface of the exterior member is in contact with a display cover of the home appliance, the display cover accommodating the display assembly, and
    wherein the plurality of first through-holes are configured to receive and transmit light emitted from the LEDs through a plurality of second through-holes defined in the display cover.

15. The exterior member according to claim 14, wherein a width of each of the first through-holes is less than a width of one of the plurality of second through-holes, and
    wherein the plurality of first through-holes are configured to communicate with the plurality of second through-holes.

16. The exterior member according to claim 15, further comprising a diffusion sheet that is disposed on the rear surface of the steel plate, that covers a portion of the steel plate corresponding to an entire area of the display assembly, and that is configured to diffuse light emitted from the LEDs.

17. The exterior member according to claim 1, further comprising an insulator that is in contact with the back coating layer and that is filled by a foam solution.

18. The exterior member according to claim 1, further comprising:
    a base metal layer that is made of galvanized iron and that contacts a rear side of the color layer; and
    one or more preprocessed layers that contact a front side of the back coating layer,
    wherein the base metal layer and the one or more preprocessed layers are disposed between the color layer and the back coating layer.

19. A refrigerator comprising:
    a display assembly comprising a plurality of light emitting diodes (LEDs); and
    an exterior member that defines an appearance of the refrigerator, the exterior member comprising:
       a steel plate that covers the display assembly, the steel plate comprising:
          a color layer that is disposed on a front surface of the steel plate and that defines a color and a texture of the refrigerator, and
          a back coating layer disposed on a rear surface of the steel plate and configured to prevent corrosion of the steel plate,
       a plurality of first through-holes that are defined in the steel plate at positions corresponding to the plurality of LEDs, the plurality of first through-holes extending from the rear surface of the steel plate to the color layer, and a hole-filling member provided in the plurality of first through-holes and configured to transmit light emitted from the LEDs, wherein the color layer is configured to:
based on the LEDs being turned on, transmit light emitted from the LEDs through the plurality of first through-holes to thereby allow display of operating information of the refrigerator to an outside of the steel plate, and based on the LEDs being turned off, make the plurality of first through-holes not visible from the outside of the steel plate.

20. The refrigerator according to claim 19, wherein the steel plate further comprises:
a base metal layer that is made of galvanized iron and that contacts a rear side of the color layer; and
one or more preprocessed layers that contact a front side of the back coating layer, and
wherein the base metal layer and the one or more preprocessed layers are disposed between the color layer and the back coating layer.

* * * * *